(12) United States Patent
Stewart et al.

(10) Patent No.: US 7,177,486 B2
(45) Date of Patent: Feb. 13, 2007

(54) DUAL BOOTSTRAP ITERATIVE CLOSEST POINT METHOD AND ALGORITHM FOR IMAGE REGISTRATION

(75) Inventors: Charles V. Stewart, Clifton Park, NY (US); Chia-Ling Tsai, Troy, NY (US); Badri Roysam, Clifton Park, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 851 days.

(21) Appl. No.: 10/408,927

(22) Filed: Apr. 7, 2003

(65) Prior Publication Data
US 2003/0190091 A1 Oct. 9, 2003

Related U.S. Application Data

(60) Provisional application No. 60/370,603, filed on Apr. 8, 2002.

(51) Int. Cl.
G06K 9/32 (2006.01)
(52) U.S. Cl. .................................................. 382/294
(58) Field of Classification Search ................ 382/293, 382/295
See application file for complete search history.

(56) References Cited

U.S. PATENT DOCUMENTS 5,793,901 A * 8/1998 Matsutake et al. .......... 382/294
5,956,435 A * 9/1999 Buzug et al. ................ 382/283
6,266,452 B1 * 7/2001 McGuire ..................... 382/294

OTHER PUBLICATIONS

S. Aylward and E. Bullitt. Initialization, noise, singularities, and scale in height-ridge traversal for tubular object centerline extraction. *IEEE Transactions on Medical Imaging*, 21:61-75, 2002.
S. Aylward, J. Jomeir, S. Weeks, and E. Bullitt. Registration and analysis of vascular images. *Internation Journal of Computer Vision*, (to appear) 2003; 30 pages.
R. Benjemaa and F. Schmitt. Fast global registration of 3D sampled surfaces using a multi-z-buffer technique. *Image and Vision Computing*, 17(2):113-123, 1999.
J. Bergen. P. Anandan, K. Hanna, and R. Hingorani. Hierarchical model-based motion estimation. In *Proceedings Second European Conference on Computer Vision*, pp. 237-252, 1992.
J. Berkow, R. Flower, D. Orth, and J. Kelley. *Fluorescein and Indocyanine Green Angiography, Technique and Interpretation*. American Academy of Ophthalmology, 2nd edition, 1997.

(Continued)

*Primary Examiner*—Joseph Mancuso
*Assistant Examiner*—Alex Liew
(74) *Attorney, Agent, or Firm*—Schmeiser, Olsen & Watts

(57) ABSTRACT

An iterative method and associated algorithm for performing image registration to map features in a first image to corresponding features in a second image in accordance with a transformation model. Upon convergence of a parameter vector associated with the model, a current bootstrap region includes and exceeds an initial bootstrap region that is initially established. During the iterations, the parameter vector is estimated by minimizing an objective function with respect to the parameter vector. Each iteration generates a next bootstrap region that minimally includes the current bootstrap region and may exceed the current bootstrap region. The model may change in successive iterations.

50 Claims, 26 Drawing Sheets

OTHER PUBLICATIONS

P. Besl and N. McKay. A method for registration of 3-D shapes. *IEEE Transactions on Pattern Analysis and Machine Intelligence*, 14(2):239-256, 1992.

T.Binford and T. Levitt. Quasi-Invariants: Theory and exploitation. In *Proceedings of the DARPA Image Understanding Workshop*, pp. 819-829, 1993.

G. Borgefors. Distance transformations in 5 digital images. *Computer Vision, Graphics, and Image Processing*, 34(3):344-371, Jun. 1986.

L. Brown. A survey of image registration techniques. *Computing Surveys*, 24(4):325-376, 1992.

K. Bubna and C.V. Stewart. Model selection techniques and merging rules for range data sementation algorithms. *Computer Vision and Image Understanding*, 80: 215-245, 2000.

A. Can, H. Shen, J.N. Turner, H.L. Tanenbaum, and B. Roysam. Rapid automated tracing and feature extraction from live high-resolution retinal fundus images using direct exploratory algorithms. *IEEE Trans. on Info. Tech. for Biomedicine*, 3(2):125-138, 1999.

A. Can, C. Stewart, and B. Roysam. Robust hierarchical algorithm for constructing a mosaic from images of the curved human retina. In *Proceedings IEEE Conference on Computer Vision and Pattern Recognition*, pp. 286-292, 1999.

A. Can, C. Stewart, B. Roysam, and H. Tanenbaum. A feature-based algorithm for joint, linear estimation of high-order image-to-mosaic transformations: Mosaicing the curved human retina. *IEEE Transactions on Pattern Analysis and Machine Intelligence*, 24(3):412-419, 2002.

A. Can, C. Stewart, B. Roysam, and H. Tanenbaum. A feature-based, robust, hierarchical algorithm for registering pairs of images of the curved human retina. *IEEE Transactions on Pattern Analysis and Machine Intelligence*, 24(3):347-364, 2002.

G. Champleboux, S. Lavalee, R. Szeliski, and L. Brunie. From accurate range imaging sensor calibration to accurate model-based 3-D object localization. In *Proceedings IEEE Conference on Computer Vision and Pattern Recognition*, pp. 83-89, 1992.

Y. Chen and G. Medioni. Object modeling by registration of multiple range images. *Image and Vision Computing*, 10(3):145-155, 1992.

C. Chua and R. Jarvis. 3-D free-form surface registration and object recognition. *International Journal of Computer Vision*, 17(1):77-99, 1996.

H. Chui and A. Rangarajan. A new algorithm for non-rigid point matching. In *Proceedings IEEE Conference on Computer Vision and Pattern Recognition*, pp. II:44-51, 2000.

M. DeGrezia and M. Robinson. Opthalmic manifestations of HIV: an update. *The Journal of the Association of Nurses in AIDS Care: JANAC.*, 12(3):22-32, May-Jun. 2001.

J. S. Duncan and N. Ayache. Medical image and analysis: progress over two decades and the challenges ahead. *IEEE Transactions on Pattern Analysis and Machine Intelligence*, 22(1):85-105, 2000.

B. Ege, T. Dahl, T. Sondergaard, O. Larsen, T. Bek, and O. Hejlesen. Automatic registration of ocular fundus images. In *Workshop on Computer Assisted Fundus Image Analysis*, May 2000.

J. Feldmar, J. Declerck, G. Malandain, and N. Ayache. Extension of the ICP algorithm to nonrigid intensity-based registration of 3-D volumes. *Computer Vision and Image Understanding*, 66(2):193-206, May 1997.

M.A. Fischler and R.C. Bolles. Random Sample Consensus: A paradigm for model fitting with applications to image analysis and automated cartography. *CACM*, 24:381-395, 1981.

K. Fritzsche, A. Can, H. Shen, C. Tsai, J. Turner, H. Tanenbaum, C. Stewart, and B. Roysam. Automated model based segmentation, tracing and analysis of retinal vasculature from digital fundus images. In J.S. Suri and S. Laxminarayan, editors, *State-of-the-Art Angiography, Applications and Plaque Imaging Using MR, CT, Ultrasound and X-rays*. Academic Press, 2002.

W. Grimson, T. Lozano-Perez, W. Wells, G. Ettinger, and S. White. An automatic registration method from frameless stereotaxy, image, guided surgery and enhanced reality visualization. In *Proceedings IEEE Conference on Computer Vision and Pattern Recognition*, pp. 430-436, 1994.

W. Hart and M. Goldbaum. Registering retinal images using automatically selected control point pairs. In *Proceedings IEEE Conference on Image Processing*, vol. 3, pp. 576-581, 1994.

R. Hartley and A. Zisserman. *Multiple View Geometry*, Chapter 3.7 and 4 Cambridge University Press, 2000.

C. Heneghan, P. Maguire, N. Ryan, and P. de Chazal. Retinal image registration using control points. *IEEE International Symposium on Biomedical Imaging*, pp. 349-352, Jul. 2002.

K. Higuchi, M. Hebert, and K. Ikeuchi. Building 3-d'models from unregistered range images. *Graphical Models and Image Processing*, 57(4):315-333, 1995.

P.W. Holland and R.E. Welsch. Robust regression using iteratively reweighted least-squares. *Commun. Statist.-Theor. Meth.*, A6:813-827, 1977.

A. Johnson and M. Hebert. Surface matching for object recognition in complex 3-dimensional scenes. *Image and Vision Computing*, 16(9-10):635-651, Jul. 1998.

H. Lester and S. Arridge. A survey of hierarchical non-linear medical image registration. *Pattern Recognition*, 32(1):129-149, 1999.

D. Lowe. Three-dimensional object recognition from single two-dimensional images. *Artificial Intelligence*, 31(3):355-395, 1987.

F. Maes, A. Collignon, D. Vandermeulen, G. Marchal, and P. Suetens. Multimodality image registration by maximization of mutual information. *IEEE Transactioins on Medical Imaging*, 16(2):187-198, 1997.

A.A. Mahurkar, M.A. Vivino, B.L. Trus, E.M. Kuehl, M.B. Datiles, and M.I. Kaiser-Kupfer. Constructing retinal fundus photomontages. *Investigative Ophthalmology and Visual Science*, 37(8):1675-1683, Jul. 1996.

J.A. Maintz and M.A. Viergever. A survey of medical image registration. *Medical Image Analysis*, 2(1):1-36, 1998.

G.K. Matsopoulos, N.A. Mouravliansky, K.K. Delibasis, and K.S. Nakita. Automatic retinal image registration scheme using global optimization techniques. *IEEE Transactions on Information Technology in Biomedicine*, 3(1):47-60, 1999.

T. McInerney and D. Terzopoulos. Deformable models in medical image analysis: a survey. *Medical Image Analysis*, 1(2):91-108, 1996.

A. Mendonca and J. Campilho, A. Nunes. A new similarity criterion for retinal image registration. In *Proceedings IEEE International Conference on Image Processing*, pp. 696-700, 1994.

C.-H. Menq, H.-T. Yau, and G.-Y. Lai. Automated precision measurement of surface profile in CAD-directed inspection. *IEEE Transactions on Robotics and Automation*, 8(2):268-278, 1992.

J.V. Miller and C.V. Stewart. MUSE: Robust surface fitting using unbiased scale estimates. In *Proceedings IEEE Conference on Computer Vision and Pattern Recognition*, pp. 300-306, 1996.

J. Mundy and A. Zisserman, editors. *Geometric Invariance in Computer Vision*. MIT Press, 1992.

V.-D. Nguyen, V. Nzomigni, and C. Stewart. Fast and robust registration of 3d surfaces using low curvature patches. In *Proc. 2nd Int. Conf. on 3D Digital Imaging and Modeling*, pp. 201-208, 1999.

P.J. Rousseeuw. Least median of squares regression. *Journal of the American Statisitcal Association*, 79:871-880, 1984.

P.J. Rousseeuw and C. Croux. Alternatives to the median absolute deviation. *Journal of the American Statistical Association*, 88:1273-1283, 1993.

S. Rusinkiewicz and M. Levoy. Efficient variants of the ICP algorithm. In *Proc. Third Int. Conf. on 3-D Digital Imaging and Modeling*, pp. 224-231, 2001.

P.J. Saine and M.E. Tyler. *Opthalmic Photography*. Butterworth Heinemann, 2002.

H. Sawhney and R. Kumar. True multi-image alignment and its application to mosaicing and lens distortion correction. *IEEE Transactions on Pattern Analysis and Machine Intelligence*, 21(3):235-243, 1999.

C. Schmid, R. Mohr, and C. Bauckhage. Comparing and evaluating interest points. In *Proceedings IEEE International Conference on Computer Vision*, pp. 230-235, 1998.

G. Sharp, S. Lee, and D. Wehe. ICP registration using invariant features. *IEEE Transactions on Pattern Analysis and Machine Intelligence*, 24(1):90-102, 2002.

H. Shen, B. Roysam, C. Stewart, J. Turner, and H. Tanenbaum. Optimal scheduling of tracing computations for real-time vascular landmark extraction from retinal fundus images. *IEEE Transactions on Information Technology in Biomedicine*, 5(1):77-91, Mar. 2001.

H. Shen, C. Stewart, B. Roysam, G. Lin, and H. Tanenbaum. Frame-rate spatial referencing based on invariant indexing and alignment with application to laser retinal surgery. In *Proceedings IEEE Conference on Computer Vision and Pattern Recognition*, vol. 1, pp. 79-86, 2001.

H. Shen, C. Stewart, B. Roysam, G. Lin, and H. Tanenbaum. Frame-reate spatial referencing based on invariant indexing and alignment with application to laser retinal surgery. *IEEE Transactions on Pattern Analysis and Machine Intelligence*, 25(3), Mar. 2003.

C.V. Stewart. Robust parameter estimation in computer vision. *SIAM Reviews*, 41(3), Sep. 1999.

A. Stoddart, S. Lemke, A. Hilton, and T. Renn. Estimating pose uncertainty for surface registration. *Image and Vision Computing*, 16(2):111-120, 1998.

R. Szeliski and S. Lavallee. Matching 3-d anatomical surfaces with non-rigid deformations using octree-splines. *International Journal of Computer Vision*, 18(2):171-186, 1996.

J. Thirion. New feature points based on geometric invariants for 3d image registration. *International Journal of Computer Vision*, 18(2):121-137, 1996.

P. Torr. An assessment of information criteria for motion model selection. In *Proceedings IEEE Conference on Computer Vision and Pattern Recognition*, pp. 47-52, 1997.

P. Torr and D. Murray. The development and comparison of robust methods for estimating the fundamental matrix. *International Journal of Computer Vision*, 24(3):217-300, 1997.

P. Torr and A. Zisserman. MLESAC: A new robust estimator with application to estimating image geometry. *Computer Vision and Image Understanding*, 78(1):138-156, Apr. 2000.

P. Viola and W.M. Wells III. Alignment by maximization of mutual information. *International Journal of Computer Vision*, 24(2):137-154, 1997.

Z. Zhang. Iterative point matching for registration of free-form curves and surfaces. *International Journal of Computer Vision*, 13(2):119-152, 1994.

Z. Zhang. Determining the epipolar geometry and its uncertainty: A review. *International Journal of Computer Vision*, 27(2):161-195, 1998.

A. Pinz, S. Bernogger, P. Datlinger, and A. Kruger. Mapping the Human Retina *IEEE Transactions on Medical Imaging*, 17(4):606-619, Aug. 1998.

* cited by examiner

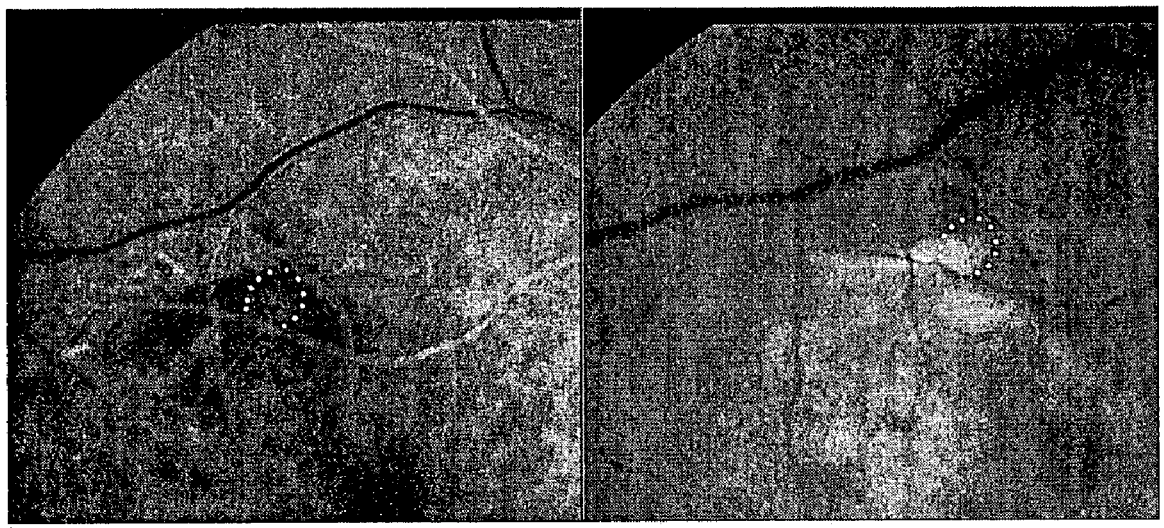
FIG. 2 (Related Art)

Iteration 0 of Sample Dual-Bootstrap ICP Iterations

| Item | Value |
|---|---|
| Initial Model | similarity |
| Initial Estimate For Model Parameters | 266.39    1.03137    -0.013507    0    0    0<br>26.0796   0.013507    1.03137     0    0    0 |
| Initial Error Scale | 0.49971 |
| Bootstrap Region | (364.114, 194.318 ) to (443.582, 273.786) |
| Bootstrap Region Size | 79.5 x 79.5 |
| Model Selection | none (bootstrap region too small) |
| Objective Function | 5.79 |
| Transfer Error on Bootstrap Region | right: 0.129751,  left: 0.229904,  top: 0.171329, down: 0.108851 |
| Region Growth ($\beta$) | 2 |
| Covariance Matrix | 0.0903778     0.0491476     -0.000504375    0.000619116<br>0.0491476     0.0562165     0.000425188     0.000475191<br>-0.000504375  0.000425188   5.46426e-005    3.68727e-006<br>0.000619116   0.000475191   3.68727e-006    3.04537e-005<br>0.000619116   0.000475191   3.68727e-006    3.04537e-005 |

FIG. 16

Iteration 1 of Sample Dual-Bootstrap ICP Iterations

| Item | Value |
|---|---|
| Initial Model | similarity |
| Initial Estimate For Model Parameters | 287.843    0.981229    -0.0185348    0    0    0<br>35.9854    0.0185348    0.981229    0    0    0 |
| Initial Error Scale | 0.460696 |
| Bootstrap Region | (347.655 177.859 ) to (460.041 290.245) |
| Bootstrap Region Size | 112.386 x 112.386 |
| Model Selection | none (bootstrap region too small) |
| Objective Function | 12.2356 |
| Transfer Error on Bootstrap Region | right: 0.0810305, left: 0.155654, top: 0.109438, down: 0.0830184 |
| Region Growth ($\beta$) | 2 |
| Covariance Matrix | 0.0607536    0.0426283    -0.000168787    0.00014654<br>0.0426283    0.042362    -1.07982e-005    0.000149709<br>-0.00016878    -1.07982e-005    1.74559e-005    1.82491e-006<br>0.00014654    0.000149709    1.82491e-006    7.44514e-006 |

FIG. 17

Iteration 2 of Sample Dual-Bootstrap ICP Iterations

| Item | Value |
|---|---|
| Initial Model | similarity |
| Initial Estimate For Model Parameters | 286.697   0.97753   -0.00932075   0   0   0<br>40.4305   0.00932075   0.97753   0   0   0 |
| Initial Error Scale | 1.01673 |
| Bootstrap Region | (324.379 154.583 ) to (483.317 313.521) |
| Bootstrap Region Size | 158.94 x 158.94 |
| Model Selection | none (bootstrap region too small) |
| Objective Function | 23 |
| Transfer Error on Bootstrap Region | right: 0.0786691, left: 0.169627, top: 0.0661901, down: 0.1237 |
| Region Growth ($\beta$) | 2 |
| Covariance Matrix | 0.0673051   0.0358447   -0.0002429   -1.05182e-005<br>0.0358447   0.0400279   -0.000157156   9.49852e-006<br>-0.0002429   -0.000157156   8.56519e-006   7.85881e-007<br>-1.05182e-005   9.49852e-006   7.85881e-007   5.10518e-006 |

FIG. 18

Iteration 3 of Sample Dual-Bootstrap ICP Iterations

| Item | Value |
|---|---|
| Initial Model | similarity |
| Initial Estimate For Model Parameters | 277.652   0.999046   -0.0106497   0   0   0<br>34.944   0.0106497   0.999046   0   0   0 |
| Initial Error Scale | 1.36727 |
| Bootstrap Region | (291.462 121.666 ) to (516.234 346.438) |
| Bootstrap Region Size | 224.772 x 224.772 |
| Model Selection | similarity (-67.2566 for similarity, -84.9008 for reduced quadratic, -98.6116 for quad) |
| Objective Function | 77.8436 |
| Transfer Error on Bootstrap Region | right: 0.0838212, left: 0.122212, top: 0.0892093, down: 0.100242 |
| Region Growth ($\beta$) | 2 |
| Covariance Matrix | 0.0394515   0.0187936   -7.81294e-005   8.12394e-005<br>0.0187936   0.0325252   4.81711e-006   7.41747e-005<br>-7.81294e-005   4.81711e-006   4.93099e-006   -9.10786e-008<br>8.12394e-005   7.41747e-005   -9.10786e-008   2.47671e-006 |

FIG. 19

Iteration 4 of Sample Dual-Bootstrap ICP Iterations

| Item | Value |
|---|---|
| Initial Model | similarity |
| Initial Estimate For Model Parameters | 277.7       0.995825     -0.00457081  0    0    0<br>38.0998    0.00457081   0.995825     0    0    0 |
| Initial Error Scale | 2.42439 |
| Bootstrap Region | (244.91 86.5621 ) to (562.786 392.99) |
| Bootstrap Region Size | 317.876 x 304.43 |
| Model Selection | similarity (-89.9289 for similarity, -110.356 for reduced quadratic, -123.773 for quad) |
| Objective Function | 77.8436 |
| Transfer Error on Bootstrap Region | right: 0.140657, left: 0.171685, top: 0.128155, down: 0.169473 |
| Region Growth ($\beta$) | 2 |
| Covariance Matrix | 0.0488369    0.016789     -5.74485e-005    8.75021e-005<br>0.016789     0.0517199    2.78966e-005     0.000104909<br>-5.74485e-005  2.78966e-005  4.05394e-006     -4.00739e-007<br>8.75021e-005   0.000104909   -4.00739e-007    2.62631e-006 |

FIG. 20

Iteration 5 of Sample Dual-Bootstrap ICP Iterations

| Item | Value |
|---|---|
| Initial Model | similarity |
| Initial Estimate For Model Parameters | 275.865   0.998651   -0.00173591   0   0   0<br>38.532    0.00173591   0.998651     0   0   0 |
| Initial Error Scale | 3.03037 |
| Bootstrap Region | (179.076 86.5621 ) to (628.62 456.453) |
| Bootstrap Region Size | 449.54 x 369.891 |
| Model Selection | similarity (-129.862 for similarity, -144.764 for reduced quadratic, -154.231 for quad) |
| Objective Function | 117.072 |
| Transfer Error on Bootstrap Region | right: 0.109498, left: 0.160186, top: 0.0851769, down: 0.132127 |
| Region Growth ($\beta$) | 2 |
| Covariance Matrix | 0.0405521    0.00784098    -4.46573e-005    4.59599e-005<br>0.00784098    0.0448261    -2.20833e-005    7.40428e-005<br>-4.46573e-005   -2.20833e-005   1.80661e-006    -5.57259e-007<br>4.59599e-005    7.40428e-005    -5.57259e-007    1.9047e-006 |

FIG. 21

Iteration 6 of Sample Dual-Bootstrap ICP Iterations

| Item | Value |
|---|---|
| Initial Model | similarity |
| Initial Estimate For Model Parameters | 274.187    1.00339    -0.00383499    0    0    0<br>36.5029    0.00383499    1.00339    0    0    0 |
| Initial Error Scale | 3.71728 |
| Bootstrap Region | (85.9728 86.5621 ) to (721.723 533.06) |
| Bootstrap Region Size | 635.75 x 446.5 |
| Model Selection | similarity (-185.856 for similarity, -195.88 for reduced quadratic, -201.476 for quad) |
| Objective Function | 172.512 |
| Transfer Error on Bootstrap Region | right: 0.139695, left: 0.165249, top: 0.0716708, down: 0.121417 |
| Region Growth ($\beta$) | 2 |
| Covariance Matrix | 0.0381809    0.000149684    1.24122e-005    -1.68307e-005<br>0.000149684    0.0388061    -2.85521e-005    3.4847e-005<br>1.24122e-005    -2.85521e-005    1.12603e-006    -5.19124e-007<br>-1.68307e-005    3.4847e-005    -5.19124e-007    1.26362e-006 |

FIG. 22

Iteration 7 of Sample Dual-Bootstrap ICP Iterations

| Item | Value | | |
|---|---|---|---|
| Initial Model | similarity | | |
| Initial Estimate For Model Parameters | 274.062    1.0064    -0.00842869  0  0  0<br>34.046     0.00842869  1.0064        0  0  0 | | |
| Initial Error Scale | 3.66794 | | |
| Bootstrap Region | (23.9827 86.5621 ) to (756.577 625.532) | | |
| Bootstrap Region Size | 732.6 x 538.97 | | |
| Model Selection | reduced quadratic (-242.058 for similarity, -224.866 for reduced quadratic, -228.372 for quad) | | |
| Objective Function | 187.744 | | |
| Transfer Error on Bootstrap Region | right:0.368925, left:0.244703, top: 1.04318, down: 0.141618 | | |
| Region Growth (β) | 1.98788 | | |
| Covariance Matrix (columns 1-3) | 0.0981361<br>0.0125362<br>-4.81019e-005<br>6.14229e-006<br>-1.30481e-006<br>-1.84753e-007 | 0.0125362<br>0.0717003<br>-1.54294e-006<br>-4.51173e-006<br>-1.8744e-007<br>-9.44389e-007 | -4.81019e-005<br>-1.54294e-006<br>5.85689e-007<br>-1.818e-007<br>1.1428e-009<br>-2.13738e-010 |
| (columns 4-6) | 6.14229e-006<br>-4.51173e-006<br>-1.818e-007<br>6.07948e-007<br>-3.16684e-010<br>2.26476e-010 | -1.30481e-006<br>-1.8744e-007<br>1.1428e-009<br>-3.16684e-010<br>2.39457e-011<br>2.84905e-012 | -1.84753e-007<br>-9.44389e-007<br>-2.13738e-010<br>2.26476e-010<br>2.84905e-012<br>1.97032e-011 |

FIG. 23

Iteration 8 of Sample Dual-Bootstrap ICP Iterations (Excluding Covariance Matrix)

| Item | Value |
|---|---|
| Initial Model | reduced quadratic |
| Initial Estimate For Model Parameters | 256.798   1.06532 0.0479104   -7.80579e-005 0   -7.80579e-005<br>26.9907   0.0330083 1.02155   -2.36425e-005 0   -2.36425e-005 |
| Initial Error Scale | 2.68457 |
| Bootstrap Region | (23.9827 86.5621 ) to (756.577 910.818) |
| Bootstrap Region Size | 732.6 x 824.256 |
| Model Selection | switched to full quadratic (since bootstrap region is the entire overlap region) |
| Objective Function | 442.693 |
| Transfer Error on Bootstrap Region | right: 0.0529027, left: 0.0650301, top: 0.095336, down: 0.116513 |
| Region Growth ($\beta$) | 2 |

FIG. 24A

Iteration 8 of Sample Dual-Bootstrap ICP Iterations (Covariance Matrix)

| Item | Value | | | |
|---|---|---|---|---|
| Covariance Matrix (columns 1-4) | 0.00281832 | 2.17947e-007 | 2.15208e-007 | -3.59948e-008 |
| | 2.17947e-007 | 2.02768e-008 | 1.15305e-009 | 1.09186e-011 |
| | 2.15208e-007 | 1.15305e-009 | 1.61828e-008 | -5.50042e-012 |
| | -3.59948e-008 | 1.09186e-011 | -5.50042e-012 | 8.43101e-013 |
| | -3.63578e-009 | -6.10947e-012 | -2.16607e-011 | 7.85605e-014 |
| | -2.25152e-008 | -1.36846e-011 | -1.16672e-014 | 1.65879e-013 |
| | 0.000128243 | 7.67042e-008 | 1.3844e-007 | -2.17721e-009 |
| | -4.56639e-008 | -1.32258e-009 | -1.90263e-009 | 1.42604e-012 |
| | -6.93743e-007 | 2.02821e-009 | 4.58099e-010 | 2.92578e-011 |
| | -2.32739e-009 | 2.50582e-012 | 1.14472e-011 | 3.46889e-014 |
| | -8.34963e-009 | 3.56941e-011 | -6.49882e-012 | 2.15367e-013 |
| | -5.33928e-010 | -6.77574e-012 | -1.51792e-011 | -1.28238e-015 |
| (columns 5-8) | -3.63578e-009 | -2.25152e-008 | 0.000128243 | -4.56639e-008 |
| | -6.10947e-012 | -1.36846e-011 | 7.67042e-008 | -1.32258e-009 |
| | -2.16607e-011 | -1.16672e-014 | 1.3844e-007 | -1.90263e-009 |
| | 7.85605e-014 | 1.65879e-013 | -2.17721e-009 | 1.42604e-012 |
| | 6.80363e-013 | 5.67419e-014 | -4.34996e-009 | 2.78205e-011 |
| | 5.67419e-014 | 3.96326e-013 | -8.5357e-010 | -9.76579e-013 |
| | -4.34996e-009 | -8.5357e-010 | 0.00205716 | -5.89782e-007 |
| | 2.78205e-011 | -9.76579e-013 | -5.89782e-007 | 2.3599e-008 |
| | -1.01321e-011 | -1.08197e-011 | 3.35226e-008 | -5.60996e-011 |
| | 5.08848e-014 | 1.15656e-014 | -2.22545e-008 | -5.24748e-012 |
| | -3.04697e-014 | 6.30926e-015 | -2.21872e-009 | -3.55689e-012 |
| | 7.16582e-014 | 1.62394e-014 | -2.04705e-008 | 1.87512e-011 |
| (columns 9-12) | -6.93743e-007 | -2.32739e-009 | -8.34963e-009 | -5.33928e-010 |
| | 2.02821e-009 | 2.50582e-012 | 3.56941e-011 | -6.77574e-012 |
| | 4.58099e-010 | 1.14472e-011 | -6.49882e-012 | -1.51792e-011 |
| | 2.92578e-011 | 3.46889e-014 | 2.15367e-013 | -1.28238e-015 |
| | -1.01321e-011 | 5.08848e-014 | -3.04697e-014 | 7.16582e-014 |
| | -1.08197e-011 | 1.15656e-014 | 6.30926e-015 | 1.62394e-014 |
| | 3.35226e-008 | -2.22545e-008 | -2.21872e-009 | -2.04705e-008 |
| | -5.60996e-011 | -5.24748e-012 | -3.55689e-012 | 1.87512e-011 |
| | 1.9801e-008 | 3.9313e-012 | 3.84263e-011 | -7.78349e-012 |
| | 3.9313e-012 | 6.01833e-013 | 9.07999e-014 | 1.20034e-013 |
| | 3.84263e-011 | 9.07999e-014 | 1.02874e-012 | -1.94008e-015 |
| | -7.78349e-012 | 1.20034e-013 | -1.94008e-015 | 4.54564e-013 |

FIG. 24B

Iteration 9 of Sample Dual-Bootstrap ICP Iterations (Excluding Covariance Matrix)

| Initial Model | full quadratic |
|---|---|
| Initial Estimate For Model Parameters | 243.518 1.08727  0.08522 -0.000103205 -9.87043e-006 -0.000101181<br>20.1457 0.0416426 1.0288 -1.9797e-005 -1.89973e-006 -2.32224e-005 |
| Initial Error Scale | 0.467807 |
| Bootstrap Region | (23.9827 86.5621 ) to (756.577 910.818) |
| Bootstrap Region Size | 732.6 x 824.258 |
| Objective Function | 442.693 |
| Model Selection | none (since bootstrap region is the entire overlap region) |
| Transfer Error on Bootstrap Region | right: 0.0395772, left: 0.0284771, top: 0.0296053, down: 0.0373404 |
| Region Growth ($\beta$) | 2 |

FIG. 25A

Iteration 9 of Sample Dual-Bootstrap ICP Iterations (Covariance Matrix)

| Item | Value | | | |
|---|---|---|---|---|
| Covariance Matrix (columns 1-4) | 0.00281832 | 2.17947e-007 | 2.15208e-007 | -3.59948e-008 |
| | 2.17947e-007 | 2.02768e-008 | 1.15305e-009 | 1.09186e-011 |
| | 2.15208e-007 | 1.15305e-009 | 1.61828e-008 | -5.50042e-012 |
| | -3.59948e-008 | 1.09186e-011 | -5.50042e-012 | 8.43101e-013 |
| | -3.63578e-009 | -6.10947e-012 | -2.16607e-011 | 7.85605e-014 |
| | -2.25152e-008 | -1.36846e-011 | -1.16672e-014 | 1.65879e-013 |
| | 0.000128243 | 7.67042e-008 | 1.3844e-007 | -2.17721e-009 |
| | -4.56639e-008 | -1.32258e-009 | -1.90263e-009 | 1.42604e-012 |
| | -6.93743e-007 | 2.02821e-009 | 4.58099e-010 | 2.92578e-011 |
| | -2.32739e-009 | 2.50582e-012 | 1.14472e-011 | 3.46889e-014 |
| | -8.34963e-009 | 3.56941e-011 | -6.49882e-012 | 2.15367e-013 |
| | -5.33928e-010 | -6.77574e-012 | -1.51792e-011 | -1.28238e-015 |
| (columns 5-8) | -3.63578e-009 | -2.25152e-008 | 0.000128243 | -4.56639e-008 |
| | -6.10947e-012 | -1.36846e-011 | 7.67042e-008 | -1.32258e-009 |
| | -2.16607e-011 | -1.16672e-014 | 1.3844e-007 | -1.90263e-009 |
| | 7.85605e-014 | 1.65879e-013 | -2.17721e-009 | 1.42604e-012 |
| | 6.80363e-013 | 5.67419e-014 | -4.34996e-009 | 2.78205e-011 |
| | 5.67419e-014 | 3.96326e-013 | -8.5357e-010 | -9.76579e-013 |
| | -4.34996e-009 | -8.5357e-010 | 0.00205716 | -5.89782e-007 |
| | 2.78205e-011 | -9.76579e-013 | -5.89782e-007 | 2.3599e-008 |
| | -1.01321e-011 | -1.08197e-011 | 3.35226e-008 | -5.60996e-011 |
| | 5.08848e-014 | 1.15656e-014 | -2.22545e-008 | -5.24748e-012 |
| | -3.04697e-014 | 6.30926e-015 | -2.21872e-009 | -3.55689e-012 |
| | 7.16582e-014 | 1.62394e-014 | -2.04705e-008 | 1.87512e-011 |
| (columns 9-12) | -6.93743e-007 | -2.32739e-009 | -8.34963e-009 | -5.33928e-010 |
| | 2.02821e-009 | 2.50582e-012 | 3.56941e-011 | -6.77574e-012 |
| | 4.58099e-010 | 1.14472e-011 | -6.49882e-012 | -1.51792e-011 |
| | 2.92578e-011 | 3.46889e-014 | 2.15367e-013 | -1.28238e-015 |
| | -1.01321e-011 | 5.08848e-014 | -3.04697e-014 | 7.16582e-014 |
| | -1.08197e-011 | 1.15656e-014 | 6.30926e-015 | 1.62394e-014 |
| | 3.35226e-008 | -2.22545e-008 | -2.21872e-009 | -2.04705e-008 |
| | -5.60996e-011 | -5.24748e-012 | -3.55689e-012 | 1.87512e-011 |
| | 1.9801e-008 | 3.9313e-012 | 3.84263e-011 | -7.78349e-012 |
| | 3.9313e-012 | 6.01833e-013 | 9.07999e-014 | 1.20034e-013 |
| | 3.84263e-011 | 9.07999e-014 | 1.02874e-012 | -1.94008e-015 |
| | -7.78349e-012 | 1.20034e-013 | -1.94008e-015 | 4.54564e-013 |

FIG. 25B

DUAL BOOTSTRAP ITERATIVE CLOSEST POINT METHOD AND ALGORITHM FOR IMAGE REGISTRATION

RELATED APPLICATION

The present invention claims priority to U.S. Provisional No. 60/370,603, filed on Apr. 8, 2002, which incorporated herein by reference in its entirety.

The U.S. Government has a paid-up license in this invention and the right in limited circumstances to require the patent owner to license others on reasonable terms as provided for by the terms of Grant No. EIA-0000417 awarded by National Science Foundation. The U.S. Government has a paid-up license in this invention and the right in limited circumstances to require the patent owner to license others on reasonable terms as provided for by the terms of Grant No. RR14038 awarded by National Institutes of Health.

BACKGROUND OF THE INVENTION

1. Technical Field

The present invention relates to an iterative method and associated algorithm for performing image registration to determine a set of transformation parameters that maps features in a first image to corresponding features in a second image in accordance with a transformation model that depends on the transformation parameters.

2. Related Art

Images of the retina are used to diagnose and monitor the progress of a variety of diseases, including such leading causes of blindness as diabetic retinopathy, age-related macular degeneration, and glaucoma. These images, as illustrated in FIGS. 1A–1C in accordance with the related art, are usually acquired by fundus cameras looking through the lens of the eye, and are taken in both the visible spectrum and, using fluorescein and indocyanine green angiography, in the near infrared. FIG. 1A shows a red-free image of a patient's retina, and FIG. 1B shows the red-free image of the patient's retina 3 years later. Differences between the images in FIGS. 1A and 1B are caused by the progression of non-exudative Age-related Macular Degeneration (AMD). The image in FIG. 1C is a fluorescien angiogram image of the same patient taken on the same date as FIG. 1B.

A variety of imaging protocols are used to produce images showing various parts of the retina. Angiography sequences reveal the flow of blood through the retina and are therefore used to highlight blockages and weak, leaking vessels.

Retinal image registration has a variety of applications as shown in FIG. 2, in accordance with the related art. In FIG. 2, the top image pair shows cropped regions of an aligned fluorescein angiogram (left) and red-free image (right). On the angiogram, an ophthalmologist has highlighted leakage of the fluorescein dye. The same region is automatically highlighted on the red-free image, which shows what the ophthalmologist sees when looking through the lens of the eye at the retina. The bottom panel in FIG. 2 shows the alignment of two images of a patient having exudative AMD. The images in FIG. 2 were taken 2.5 years apart. Shifts in the position of the vasculature of more than 4 pixels are highlighted with line segments.

Registering a set of images taken during a single session with a patient can be used to form a single, composite (mosaic) view of the entire retina. Multimodal registration can reveal the relationship between events seen on the surface of the retina and the blood flow shown in the angiography. Registering images taken weeks, months or years apart can be used to reveal changes in the retina at the level of small regions and individual blood vessels.

Retinal image registration is challenging. The images are projections of a curved surface taken from a wide range of viewpoints using an uncalibrated camera. The non-vascular surface of the retina is homogeneous in healthy retinas, and exhibits a variety of pathologies in unhealthy retinas. Unfortunately (for the purposes of registration), these pathologies can appear and disappear over time, making them poor choices for longitudinal registration. Only the vasculature covers the entire retina and is relatively stable over time.

Thus, it appears that a solution to the retinal image registration problem requires an approach driven by the vascular structure. This can include both the vessels themselves and their branching and cross-over points. Choosing to use the vasculature does not make the problem easy, however. There are many vessels and many of these locally appear similar to each other. The effects of disease and poor image quality can obscure the vasculature. Moreover, in different stages of an angiography sequence, different blood vessels can be bright, while others are dark. Finally, the range of viewpoints dictated by some imaging protocols implies the need to register image pairs having small amounts of overlap. Together, these observations imply that (1) initialization is important, (2) minimization will require avoiding local minima caused by misalignments between vessels, and (3) minimization must also be robust to missing structures. These problems are common to many registration problems. Thus, there is a need for a retinal image registration method and associated algorithm that addresses these problems.

SUMMARY OF THE INVENTION

The present invention provides an iterative method for performing image registration to map features in a first image to corresponding features in a second image in accordance with a transformation model that includes a parameter vector, said method comprising the steps of:

establishing an initial bootstrap region as a current bootstrap region in the first image;

estimating the parameter vector by minimizing an objective function with respect to the parameter vector, wherein the objective function depends on a loss function $\rho(d/\sigma)$ of $d/\sigma$ summed over selected features in the current bootstrap region, wherein d is a distance measure between $q_1$ and $q_2$, wherein $q_1$ is a feature of the selected features after having been mapped into the second image by the transformation model, wherein $q_2$ is a feature in the second image closest to $q_1$ in accordance with the distance measure, and wherein $\sigma$ is an error scale associated with the distance measures;

calculating a covariance matrix of the estimate of the parameter vector; and testing for convergence of the iterative method, wherein upon convergence the current bootstrap region includes and exceeds the initial bootstrap region, wherein if the testing determines that the iterative method has not converged then performing a generating step followed by a repeating step, wherein the generating step comprises generating a next bootstrap region in the first image, wherein the next bootstrap region minimally includes the current bootstrap region and may exceed the current bootstrap region, wherein the repeating step comprises executing a next iteration that includes again executing the estimating, calculating, and testing steps, and wherein the next bootstrap region becomes the current bootstrap region in the next iteration.

The present invention provides a computer program product, comprising a computer usable medium having a computer readable program code embodied therein, wherein the computer readable program code comprises an algorithm adapted execute a method of performing image registration to map features in a first image to corresponding features in a second image in accordance with a transformation model that includes a parameter vector, said method comprising the steps of:

establishing an initial bootstrap region as a current bootstrap region in the first image;

estimating the parameter vector by minimizing an objective function with respect to the parameter vector, wherein the objective function depends on a loss function $\rho(d/\sigma)$ of $d/\sigma$ summed over selected features in the current bootstrap region, wherein d is a distance measure between $q_1$ and $q_2$, wherein $q_1$ is a feature of the selected features after having been mapped into the second image by the transformation model, wherein $q_2$ is a feature in the second image closest to $q_1$ in accordance with the distance measure, and wherein $\sigma$ is an error scale associated with the distance measures;

calculating a covariance matrix of the estimate of the parameter vector; and testing for convergence of the iterative method, wherein upon convergence the current bootstrap region includes and exceeds the initial bootstrap region, wherein if the testing determines that the iterative method has not converged then performing a generating step followed by a repeating step, wherein the generating step comprises generating a next bootstrap region in the first image, wherein the next bootstrap region minimally includes the current bootstrap region and may exceed the current bootstrap region, wherein the repeating step comprises executing a next iteration that includes again executing the estimating, calculating, and testing steps, and wherein the next bootstrap region becomes the current bootstrap region in the next iteration.

The present invention advantageously provides a highly accurate and efficient method and algorithm, namely the Dual-Bootstrap Iterative Closest Point (ICP) algorithm, for performing image registration generally and retinal image registration in particular. Specific advantages of the present invention include:

The Dual-Bootstrap ICP has the major advantage requiring fewer initial correspondences than with existing methods. This is because Dual-Bootstrap ICP starts from an initial low-order transformation that need be accurate in only small initial regions.

Instead of matching globally, which could require simultaneous consideration of multiple matches, Dual-Bootstrap ICP uses region and model bootstrapping to resolve matching ambiguities.

Dual-Bootstrap ICP improves upon current landmark-based retinal image registration algorithms by requiring many fewer landmark correspondences. Compared to intensity-based methods, it uses the dual-bootstrapping procedure to avoid the ambiguities that cause other algorithm to use expensive global search techniques.

BRIEF DESCRIPTION OF THE DRAWINGS

FIG. 2 depicts applications of retinal image registration, in accordance with the related art.

FIGS. 16–25 are tables depicting iterations until convergence of the sample problem of FIGS. 15A–15B, in accordance with embodiments of the present invention.

DETAILED DESCRIPTION OF THE INVENTION

1. Dual-Bootstrap Iterative Closest Point (ICP)

Figure 1A:
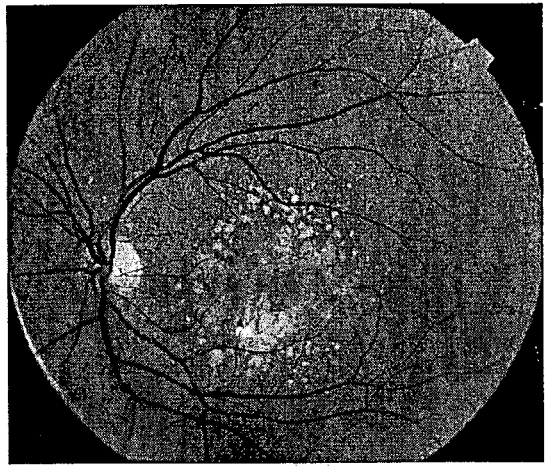
FIGS. 1A–1C each shows an image of a patient's retina, in accordance with the related art.
Figure 1B:
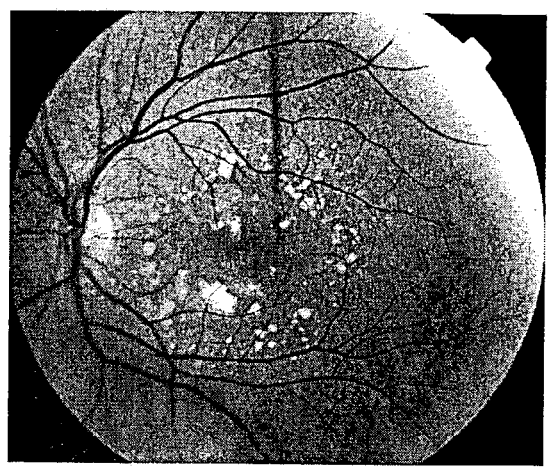
Figure 1C:
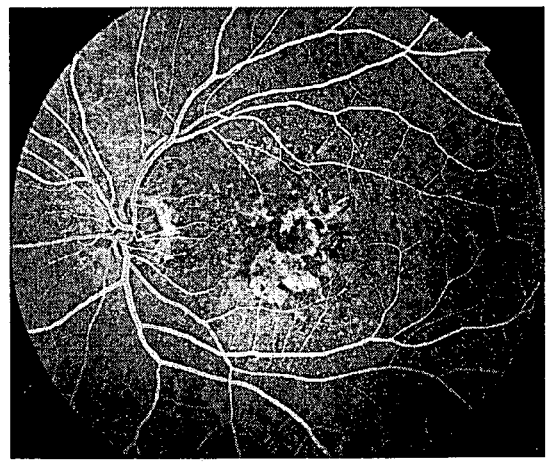
Figure 3A:
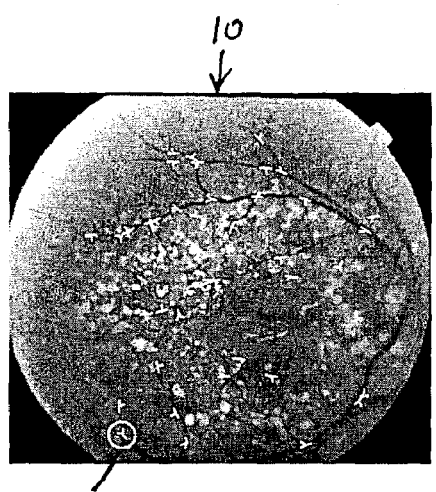
FIGS. 3A–3D and 4A depict fundus images of an unhealthy eye (nonexudative AMD) together with image features used in Dual-Bootstrap ICP registration procedure, in accordance with embodiments of the present invention.
Figure 3B:
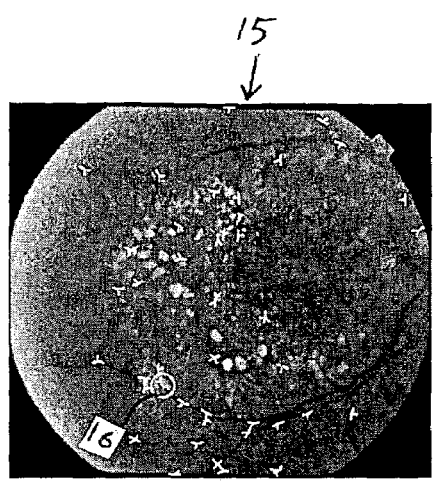
Figure 3C:
Figure 3D:
Figures 4A, 4B:
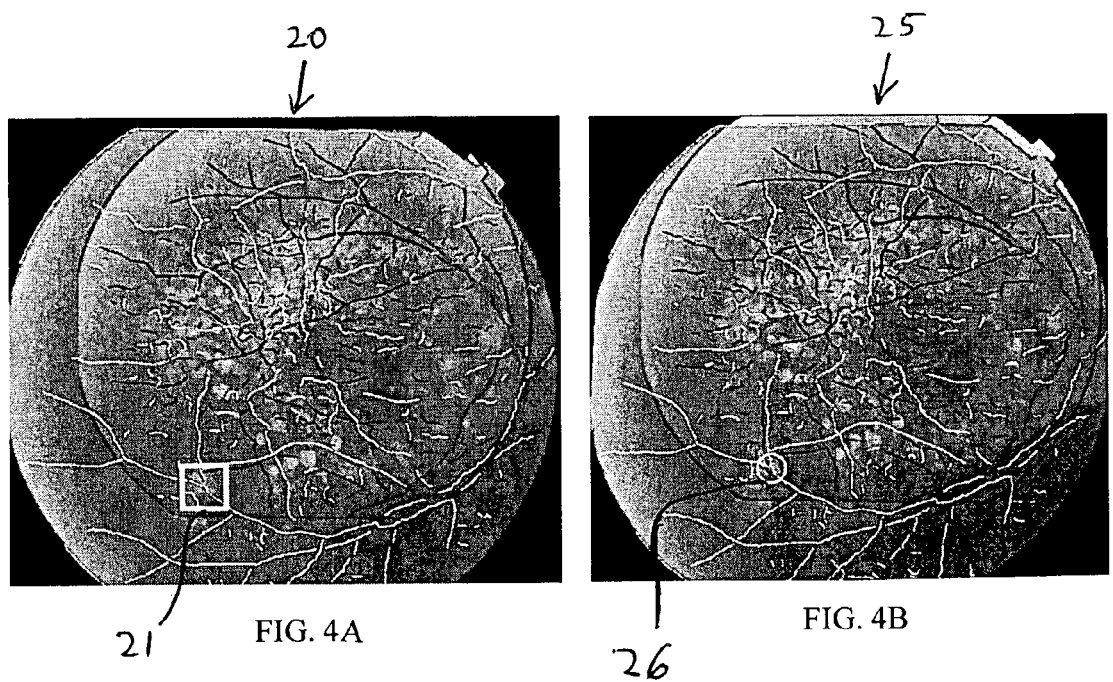
FIG. 4B depicts the alignment result after convergence of the robust ICP alignment process that does not use the dual bootstrap methodology of the present invention.

FIGS. 3A–3D and 4A depict fundus images of an unhealthy eye (nonexudative AMD) together with image features used in Dual-Bootstrap ICP registration and the iterative alignment of the images, in accordance with embodiments of the present invention. FIG. 3A and FIG. 3B show the images 10 and 15, with landmarks extracted by the retinal image-tracing algorithm used by the present invention. The landmarks are branching and cross over points of the retinal vasculature. The only landmark that is common to the images 10 and 15 is circled and denoted as landmarks 11 and 16, respectively, in the images 10 and 15. FIG. 3C and FIG. 3D show the centerline points obtained by the tracing algorithm. Many inconsistencies in the two sets of traces may be observed. Automatic detection of vascular landmarks (branching and cross-over points in the vessel) produces just one landmark in common between these two images. Aligning the images 10 and 15 based on the common landmark and then running an iterative minimization algorithm results in substantially misaligned images, as shown in FIGS. 4A–4B which depicts the results of iteratively aligning the images of FIGS. 3A–3B.

FIG. 4A depicts the initial alignment based on the single common landmark shown in images 20 and 25 in FIGS. 3A and 3B, respectively. Trace points from FIG. 3C are shown in black and trace points from FIG. 3D are shown in white.

The white square 21 on the bottom left of image 20 in FIG. 4A depicts the accurate alignment surrounding the initial correspondence. FIG. 4B depicts the alignment result after convergence of the robust ICP alignment process that does not use the dual bootstrap methodology of the present invention, as shown by the white circle 26 in the image 25. The alignment is extremely poor due to the mismatches in the upper region. Although locally accurate, the initialization is too poor globally (image-wide) for the minimization to correctly align the complex vascular structure. However, the alignment in the small initial region (i.e., the white square 21 in images 20 in FIG. 4A) is reasonably accurate. The Dual-Bootstrap ICP algorithm expands this locally accurate initial alignment into a globally accurate final alignment.

The Dual-Bootstrap ICP algorithm starts from an initial transformation estimate that is accurate only in a small region, R, (the "bootstrap region") of the mapped image, and expands it into a globally accurate final transformation estimate. This expansion iteratively refines and extends the transformation. This process, illustrated for the above retina image registration example in FIGS. 5A–5E and described infra, is accomplished by iteratively repeating three major steps: estimating the transformation, region bootstrapping, and model bootstrapping. The step of estimating the transformation estimates only in the bootstrap region. Dual-Bootstrap ICP uses a robust form of ICP, but other transformation estimation algorithms could be used, especially in different application domains. The region bootstrapping step, based on the uncertainty in the transformation estimate, expands the bootstrap region. This is governed by the transformation parameter estimate covariance matrix. Stable, accurate estimates cause rapid growth, while unstable, inaccurate estimates cause slow growth. The model bootstrapping step utilizes different models as the bootstrap region expands, starting from a simple model for the initial bootstrap region and gradually evolving to a higher-order model as the bootstrap region grows to cover the entire image overlap region. Model selection techniques, which depend fundamentally on the parameter estimate covariance matrix, are used to automatically select the transformation model for each bootstrap region. The set of transformations used in retinal image registration is shown in Table 1.

TABLE 1

Transformation Models. DoF stands for Degrees of Freedom

| Transformation | Equation | DoF | Accuracy |
|---|---|---|---|
| Similarity | $q = \begin{pmatrix} \theta_{11} & \theta_{12} & \theta_{13} & 0 & 0 & 0 \\ \theta_{21} & -\theta_{13} & \theta_{12} & 0 & 0 & 0 \end{pmatrix} \times (p - p_0)$ | 4 | 5.05 pixels |
| Affine | $q = \begin{pmatrix} \theta_{11} & \theta_{12} & \theta_{13} & 0 & 0 & 0 \\ \theta_{21} & \theta_{22} & \theta_{23} & 0 & 0 & 0 \end{pmatrix} \times (p - p_0)$ | 6 | 4.58 pixels |
| Reduced quadratic | $q = \begin{pmatrix} \theta_{11} & \theta_{12} & \theta_{13} & \theta_{14} & 0 & \theta_{14} \\ \theta_{21} & \theta_{13} & \theta_{12} & \theta_{24} & 0 & \theta_{24} \end{pmatrix} \times (p - p_0)$ | 6 | 2.41 pixels |
| Full quadratic | $q = \begin{pmatrix} \theta_{11} & \theta_{12} & \theta_{13} & \theta_{14} & \theta_{15} & \theta_{16} \\ \theta_{21} & \theta_{22} & \theta_{23} & \theta_{24} & \theta_{25} & \theta_{26} \end{pmatrix} \times (p - p_0)$ | 12 | 0.64 pixels |

Figure 5A:
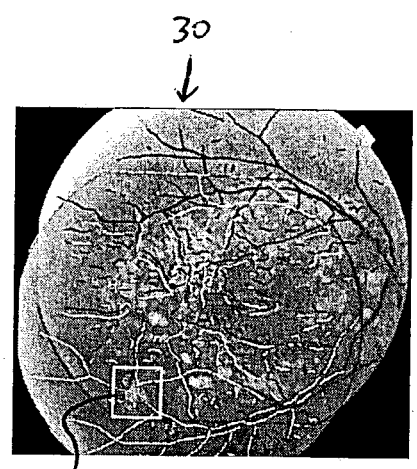
FIGS. 5A–5E illustrates the Dual Bootstrap ICP algorithm in retinal image registration using the images and feature points shown in FIGS. 3A–3D and the initial alignment shown in FIG. 4A, in accordance with embodiments of the present invention.
Figure 5B:
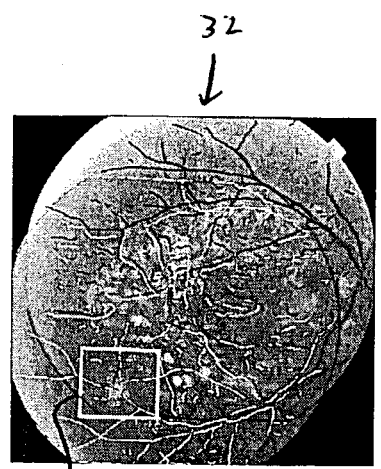
Figure 5C:
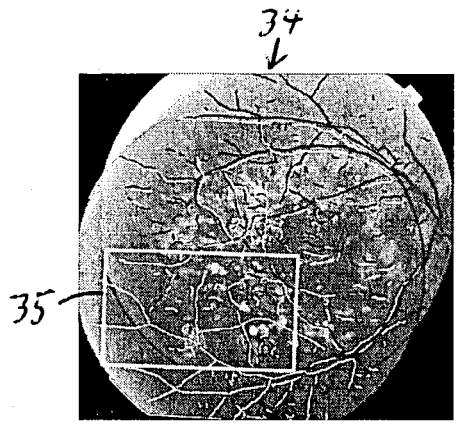
Figure 5D:
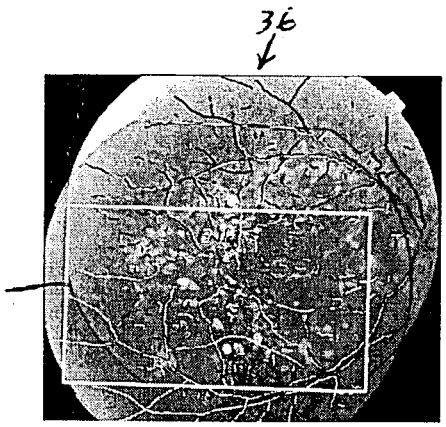
Figure 5E:
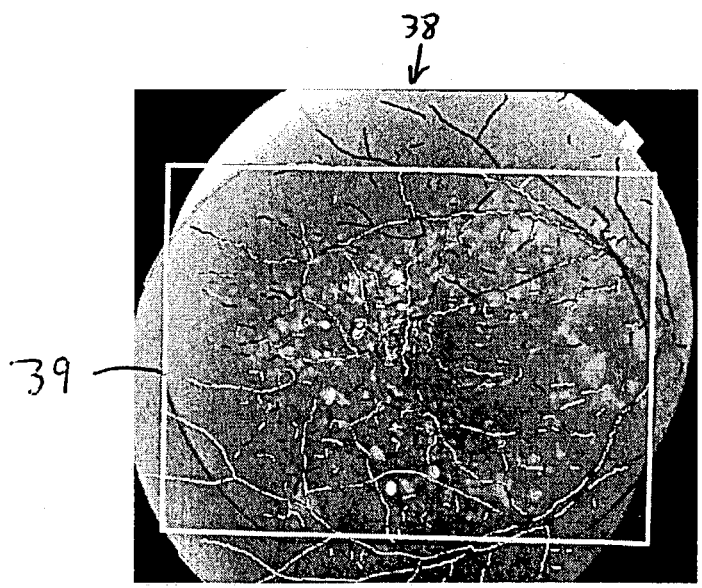

FIGS. 5A–5B illustrates the Dual Bootstrap ICP algorithm in retinal image registration using the images and feature points shown in FIGS. 3A–3D and the initial alignment shown in FIGS. 4A, in accordance with embodiments of the present invention. FIGS. 5A–5E depict image 30, 32, 34, 36, and 38, respectively. In each iteration, a robust version of ICP is applied only in the bootstrap region R, indicated by the white rectangles 31, 33, 35, 37, and 39 in FIGS. 5A–5E, respectively. The transformation is required to be accurate only in this bootstrap region. Also in each iteration, the best transformation model (in this case, similarity, reduced quadratic, or full quadratic—see Table 1) is automatically selected and the bootstrap region is grown. Several increments of this process are shown in FIGS. 5A–5E. In FIG. 5D, the algorithm selected a reduced quadratic transformation. FIG. 5E shows the final alignment using a full quadratic model having 12 parameters.

Thus, the term "dual-bootstrap" refers to simultaneous growth in the bootstrap region and the transformation model order. Initialization of the bootstrap region can be accomplished in many ways, ranging from external specification of common landmarks by a clinician to automatic matching of distinctive structures. Multiple bootstrap regions may be tested and the results compared. In the retina application, Dual-Bootstrap ICP is applied to one or more initial bootstrap regions independently, ending with success when one bootstrap region R is expanded to a sufficiently accurate, image-wide transformation.

The dual-bootstrap procedure starts from a key-hole view on the registration, with this key-hole being the initial bootstrap region. This key-hole view provides a toe-hold on the alignment. If this toe-hold is reasonably accurate, the procedure is designed to expand it into an accurate, image-wide alignment.

The Dual-Bootstrap ICP algorithm solves, inter alia, the retinal image registration problem. The ICP algorithm used by Dual-Bootstrap ICP contains innovations in the twin problems of robustness and scale estimation. In the context of retinal image registration, Dual-Bootstrap ICP works almost flawlessly, accurately aligning 100% of the tested image pairs having at least one common landmark and at least 35% overlap.

2. Image Registration

Image registration is a fundamental problem in automatic image analysis, with a wide range of applications. In many applications such as retinal image registration, the most important issues are initialization, convergence, and robustness to missing and misaligned structures. Initialization can be handled in a variety of ways, including image-wide measurements, multiresolution, indexing and initial matching of distinctive features or sets of features, and minimal-subset (of possible correspondences) random-sampling techniques.

The present invention utilizes a feature-based approach to image registration. A feature-based technique performs image alignment based on correspondences between automatically detected features. In the retina application, the stable and prominent vascular structure may drive the minimization. This may be done using a feature-based method; however, other methods are certainly possible. Of particular interest is the idea of aligning vascular features of one image with the intensity structure of another. We can think of this as a partial feature-based approach. The feature-based method of the present invention minimizes an objective function of, inter alia, the distances between vascular landmark correspondences.

The Dual-Bootstrap ICP algorithm is described in Sections 3, 4, and 5. Section 3 describes the dual-bootstrapping idea. Section 4 describes the robust ICP objective function and minimization technique. Section 5 gives implementation details for the retina application. Experimental analysis results are described in Section 6.

3. The Dual-Bootstrap ICP Algorithm

3.1 Notation

The following notation will be used:

Let $I_1$ be the image being mapped and $I_2$ be the fixed image that $I_1$ is being mapped onto. The terms "image" and "image plane" have the same meaning herein.

$R_t$ denotes the bootstrap region at iteration t of the dual-bootstrap procedure. Bootstrap regions are defined in the coordinate system of image $I_1$. The initial bootstrap region is $R_1$.

M(θ; p) is a transformation function mapping image location (or feature vector) p from the coordinate system of $I_1$ onto the coordinate system of $I_2$. Here θ is the set of transformation parameters to be estimated.

Let M be a sequence of such transformation functions or "models". The model set may or may not form a nested hierarchy. In the retina application, M is {similarity, affine, reduced-quadratic, full quadratic} (Table 1).

$M_t$ denotes the model selected in bootstrap region $R_t$ during iteration t. $\hat{\theta}_t$ is the estimated vector of parameters instantiating the model $M_t$.

$\Sigma_t$ is the covariance matrix of the estimated parameter vector $\hat{\theta}_t$.

$E(R_t, M_t, \theta_t)$ is the registration objective function that measures the transformation error between $I_1$ and $I_2$ in region $R_t$ using model $M_t$ and parameter vector $\theta_t$.

3.2 Procedure

The description of the Dual-Bootstrap ICP procedure is based on a single initial transformation estimate and associated bootstrap region. Generally, one or more initial estimates will be evaluated, each triggering a separate application of the procedure.

1. Establish the initial bootstrap region $R_1$ in a small area around where the initial estimate is computed, and initialize model $M_1$ to be the lowest order model.
2. Set iteration index t=1;
3. While the estimate has not converged:
   (a) Estimate parameter vector $\hat{\theta}_t$ by minimizing $E(R_t, M_t, \theta_t)$. Calculate the covariance matrix $\Sigma_t$ of the estimate $\hat{\theta}_t$.
   (b) Bootstrap the model: apply a model selection technique to choose the new model $M_{t+1}$. If the model selection technique chooses a new model—that is, $M_t \neq M_{t+1}$—then $\hat{\theta}_t$ and $\Sigma_t$ must be replaced by the estimate and covariance computed for $M_{t+1}$ during model selection.
   (c) Bootstrap the region: use the covariance matrix $\Sigma_t$, and the new model $M_{t+1}$, to expand the region based on the "transfer error". The growth rate is inversely related to this error.
   (d) Check for convergence. This occurs when $R_t$ reaches the apparent region of overlap between images and minimization of $E(R_t, M_t, \theta_t)$ converges within $R_t$.
   (e) Increment iteration index t by 1 (t=t+1)

Note that the covariance matrix of the parameter vector estimate is needed in both model selection and region growth. The covariance matrix is approximated by the inverse Hessian of the objective function at the minimizing parameter estimate:

$$\Sigma_t = \hat{\sigma}^2 H^{-1}(E(R_t, M_t, \hat{\theta}_t)) \quad (1)$$

wherein $\hat{\sigma}^2$ is the estimated variance of the alignment error.

Figure 9A:
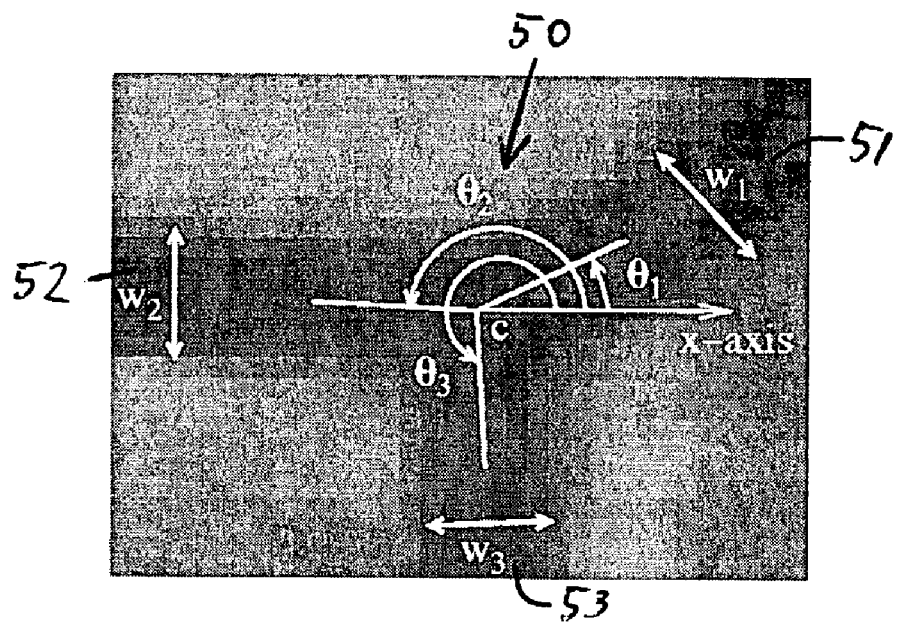
FIG. 9A depicts a vascular landmark, in accordance with embodiments of the present invention.
Figure 9B:
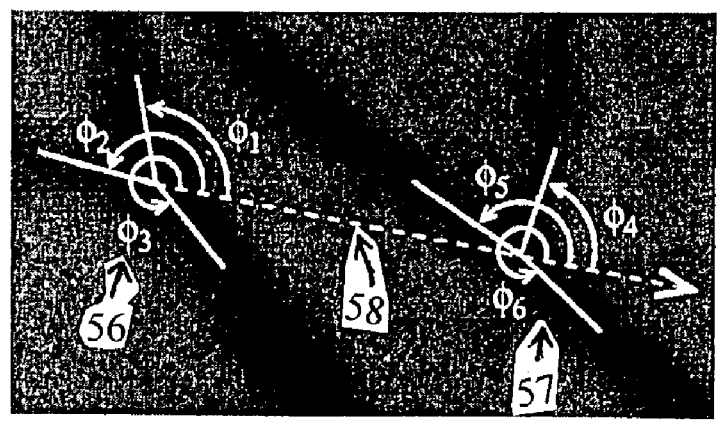
FIG. 9B depicts a set of two vascular landmarks, in accordance with embodiments of the present invention.
Figure 12:
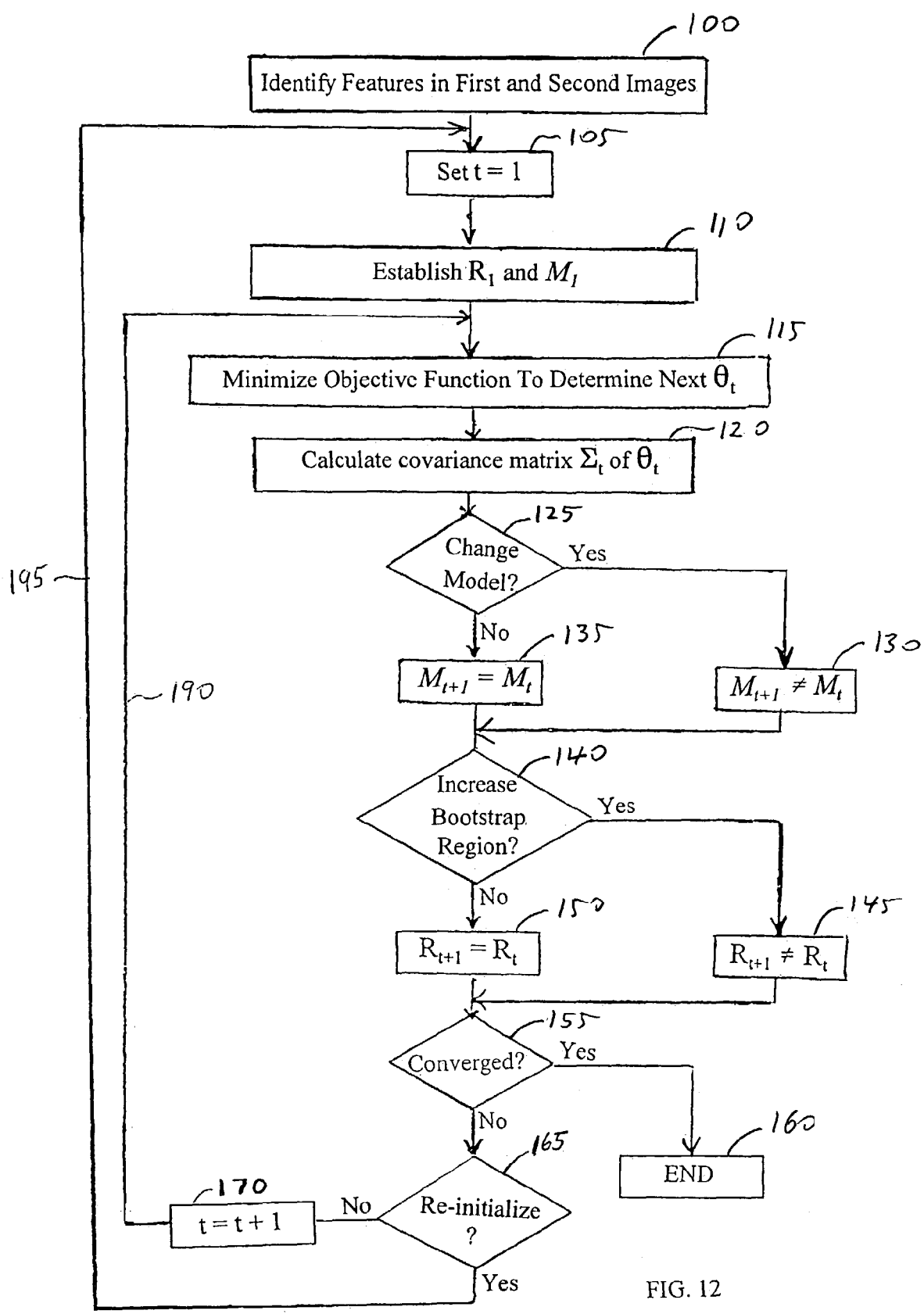
FIGS. 12 and 13 are flow charts illustrating the Dual-Bootstrap ICP methodology, in accordance with embodiments of the present invention.

The preceding description of the Dual-Bootstrap ICP procedure is depicted in the flow chart of FIG. 12, in accordance with embodiments of the present invention. Given a first image ($I_1$) and a second image ($I_2$), step 100 identifies $F_1$ features in the first image $I_1$ and $F_2$ features in the second image $I_2$. The images $I_1$ and $I_2$ may each be expressed as, inter alia, an array of pixels (e.g., a 1024×1024 array of pixels) with an accompanying brightness or intensity level at each pixel. Any operational relationship between $F_1$ and $F_2$ is within the scope of the present invention; i.e., $F_1 < F_2$, $F_1 = F_2$, $F_1 > F_2$, are each permitted. A "feature" in an image is defined herein as any geometric characteristic of the image. A first example of a feature is a location (e.g., X and Y coordinates of a point in a rectangular coordinate system) in the image relative to an assumed origin of coordinates. A second example of a feature is an angular orientation of a line in the image relative to a reference direction. For example, see infra FIG. 9B showing angles $\phi_1$, $\phi_2$, and $\phi_3$ which are features relating to a blood-vessel landmark 56 and angles $\phi_4$, $\phi_5$, and $\phi_6$ which are features relating to a blood-vessel landmark 57, said angles being with respect to axis 58 connecting the landmarks 56 and 57. A third example of a feature is the distance between two points or between two parallel lines in the image. For example, see infra FIG. 9A showing blood-vessel widths $w_1$, $w_2$, and $w_3$ of blood vessels 51, 52, and 53, respectively, which may be considered as features relating to a blood-vessel landmark 50. A fourth example of a feature is the ratio of any two linear dimensions in the image. For example, the ratios $w_1/w_3$ and $w_2/w_3$ in the preceding third example may be considered as features relating to the blood-vessel landmark 50 of FIG. 9A. A fifth example of a feature is the radius of a circular shape in the image. A sixth example of a feature is the area encompassed by any given geometrical shape (e.g., circular, elliptical, triangular, rectangular, etc.) in the image.

The $F_1$ and $F_2$ features in the images $I_1$ and $I_2$, respectively, may be determined by any method known to a person of ordinary skill in the art. In relation to the retinal imaging application, the feature-extracting algorithm may find the bifurcation points, their coordinates, and the angles of blood vessel centerlines (i.e., angular orientations in two-dimensional space), resulting in a set of landmarks and a set of blood vessel points from each image $I_1$ and $I_2$. The initialization may be based solely on said landmarks characteristics, or on any other characteristics in the images $I_1$ and $I_2$. The overall algorithm of the present invention finds the image pixels in the second image plane $I_2$ corresponding to each pixel in the first image plane $I_1$, which is called a "correspondence". The initialization in step 100 guesses at this correspondence, which may be a manual guess or by an automatic technique. As an example of an automatic technique, for each landmark in the first image $I_1$ the algorithm finds the three landmarks in the second image $I_2$ having the smallest Mahalanobis distance, which is a function of the five components of a five-component vector (see infra FIG. 9A and discussion thereof). The landmark with the smallest such Mahalanobis distance, in consideration of all potential landmark correspondences, is used. If this initial correspondence guess should prove to be wrong, then the next best correspondence (i.e., next smallest such Mahalanobis distance) may be used as the initial guess. The same procedure may be used for the initial guess when a six-component vector is used (see infra FIG. 9B and discussion thereof). Each landmark in the first image $I_1$ is processed in that manner and an invariance signature is generated for each landmark. The invariance signature is a five-component vector for each landmark, and a six-component vector for each pair of landmarks.

The flow chart of FIG. 12 has an inner loop 190 beginning a step 115 and ending at step 165, and an outer loop 195 beginning at step 105 and ending at step 165. The inner loop 190 is an "iteration loop" that iterates in accordance with the dual bootstrap ICP algorithm, using an iteration index "t". The outer loop 195 is a "re-initialization loop" that abandons the initializations selected for the current outer iteration and selects new initializations for the next outer iteration.

The initializations are performed in steps 105 and 110. Step 105 sets an initial value of "1" for the iteration index "t". In step 110, the algorithm establishes an initial bootstrap region $R_1$ in the first image and an initial model $M_1$. The subscript "1" in $R_1$ and $M_1$ denotes the current value of the iteration index t, since the bootstrap region and the model may each change from inner iteration to inner iteration.

The inner iteration loop 190 in FIG. 12 begins at step 115 and ends at step 165. Step 115 estimates the parameter vector $\theta_t$ by minimizing the objective function, as described in Section 4.1 and 4.2. The parameter vector $\theta_t$ may change in form and definition from iteration to iteration, because the parameter vector $\theta_t$ comprises the parameters of the model $M_t$, which may change from iteration to iteration. Additionally, the parameter vector $\theta_t$ may improve in numerical accuracy from iteration to iteration, reflecting the approach by the procedure to convergence.

Step 120 calculates the covariance matrix $\Sigma_t$ of the estimate of the parameter vector $\theta_t$ (see supra Equation (1)).

Step 125 determines whether to change the model $M_t$ (see infra Section 3.3) in the next iteration t+1. If step 125 determines that the model $M_t$ will not change in iteration t+1, then $M_{t+1}=M_t$ (step 135). If step 125 determines that the model $M_t$ will change in iteration t+1, then $M_{t+1} \neq M_t$ (step 130). After execution of step 135 or step 130, the procedure next executes step 140.

Step 140 determines whether to increase the bootstrap region $R_t$ (see infra Section 3.4) in the next iteration t+1. If step 140 determines that the bootstrap region $R_t$ will not change in iteration t+1, then $R_{t+1}=R_t$ (step 150). If step 140 determines that the bootstrap region $R_t$ will change (i.e., increase) in iteration t+1, then $R_{t+1} \neq R_t$ (step 145). After execution of step 150 or step 145, the procedure next executes step 155.

Step 155 determines whether the procedure has converged (see infra Section 5). Upon convergence, the bootstrap region $R_t$ includes and exceeds the initial bootstrap region $R_1$. If step 155 determines that the procedure has converged, then the procedure terminates in step 160. If step 155 determines that the procedure has not converged, then the procedure goes to step 165.

Step 165 determines whether to break out of the inner iteration loop 190 and perform the next outer loop 195 iteration by returning to steps 105 and 110 to reset t to 1 and re-initialize $R_1$, $M_1$, or both $R_1$ and $M_1$. The outer loop 195 takes into account that the prior values of $R_1$ and/or $M_1$ may have been unsatisfactory for any reason such as, inter alia, failure of the inner iteration loop 190 to converge. For example, the initially established bootstrap region $R_1$, or the features selected within the initially established bootstrap region $R_1$, may have been unsatisfactory (as demonstrated during execution of the inner iteration loop 190) and need to be changed during re-execution of step 110 in the next iteration of the outer iteration loop 195.

If step 165 determines that re-intialization should not occur, then the iteration index t is incremented by 1 in step 170 and the procedure loops back to step 115 to perform the next inner iteration. If step 165 determines that re-intialization should occur, then the procedure loops back to step 105 to perform the next outer iteration.

The procedure described by the flow chart in FIG. 12 may be varied in any manner that would be apparent to a person of ordinary skill in the art. For example, the test for convergence can be performed in a beginning portion of the inner iteration loop 190 instead of at the end of the iteration loop 190, as illustrated in the flow chart of FIG. 13 in accordance with embodiments of the present invention. The steps in FIGS. 13 and 12 are essentially the same steps in accordance with the following (FIG. 13 step→FIG. 12 step) correspondences: step 200 →step 100, step 205→step 105, step 210→step 110, step 215→step 115, step 220→step 120, step 225→step 155, step 230→step 160, step 235→step 170, step 240→step 125, step 245→step 130, step 250→step 135, step 255→step 140, step 260→step 145, step 265→step 150, and step 270→step 165.

Figure 13:
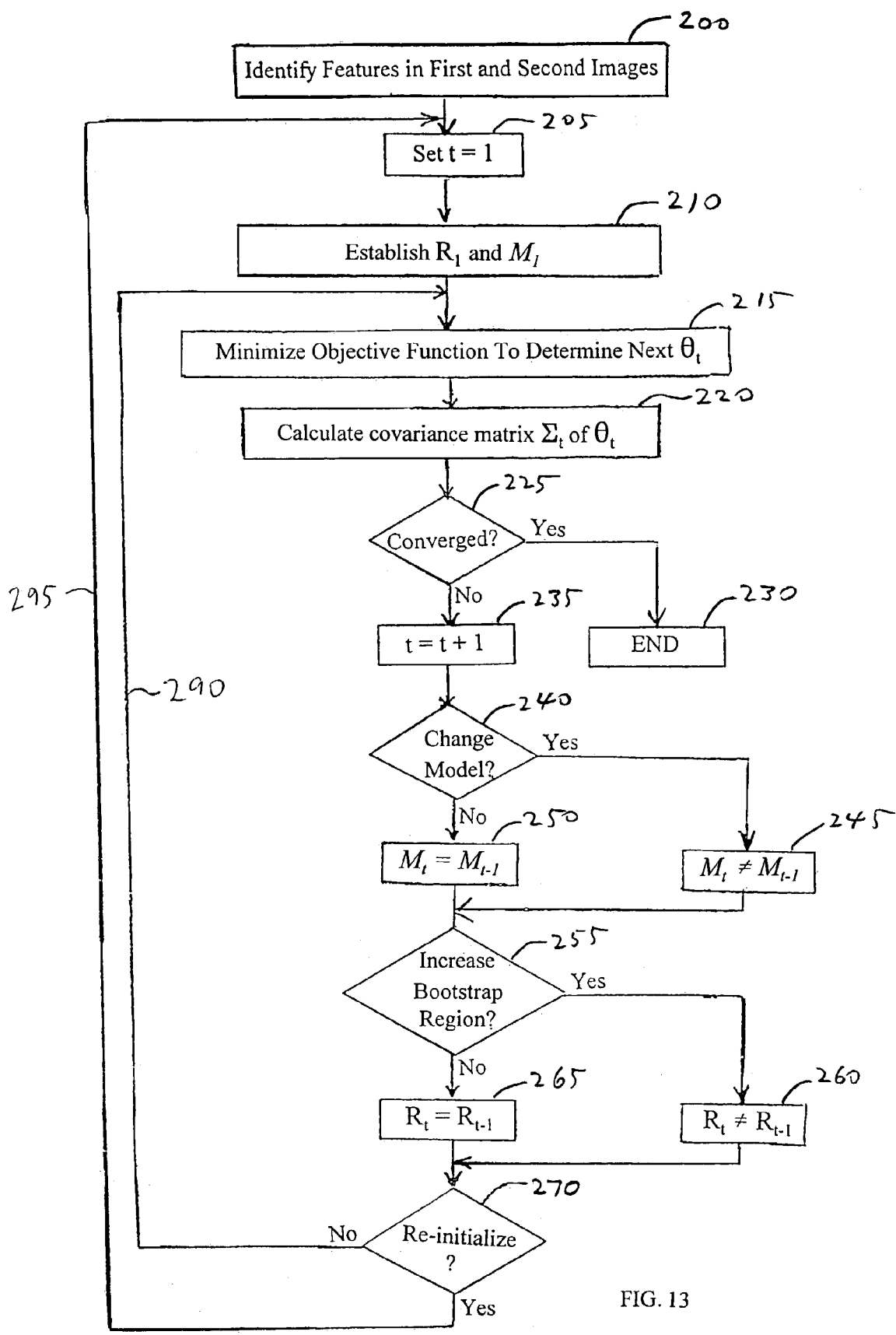

In FIG. 13, the inner iteration loop 290 begins at step 215 and ends at step 270, and the outer iteration loop 295 begins at step 205 and ends at step 270. The primary difference between FIG. 12 and FIG. 13 is that in FIG. 12 the test for convergence (step 155) is performed at the end of the inner iteration loop 190, while in FIG. 13 the test for convergence (step 225) is performed in a beginning portion of the inner iteration loop 290 prior to the test for changing the model (step 240) and prior to the test for increasing the bootstrap region (step 255).

Figure 14:
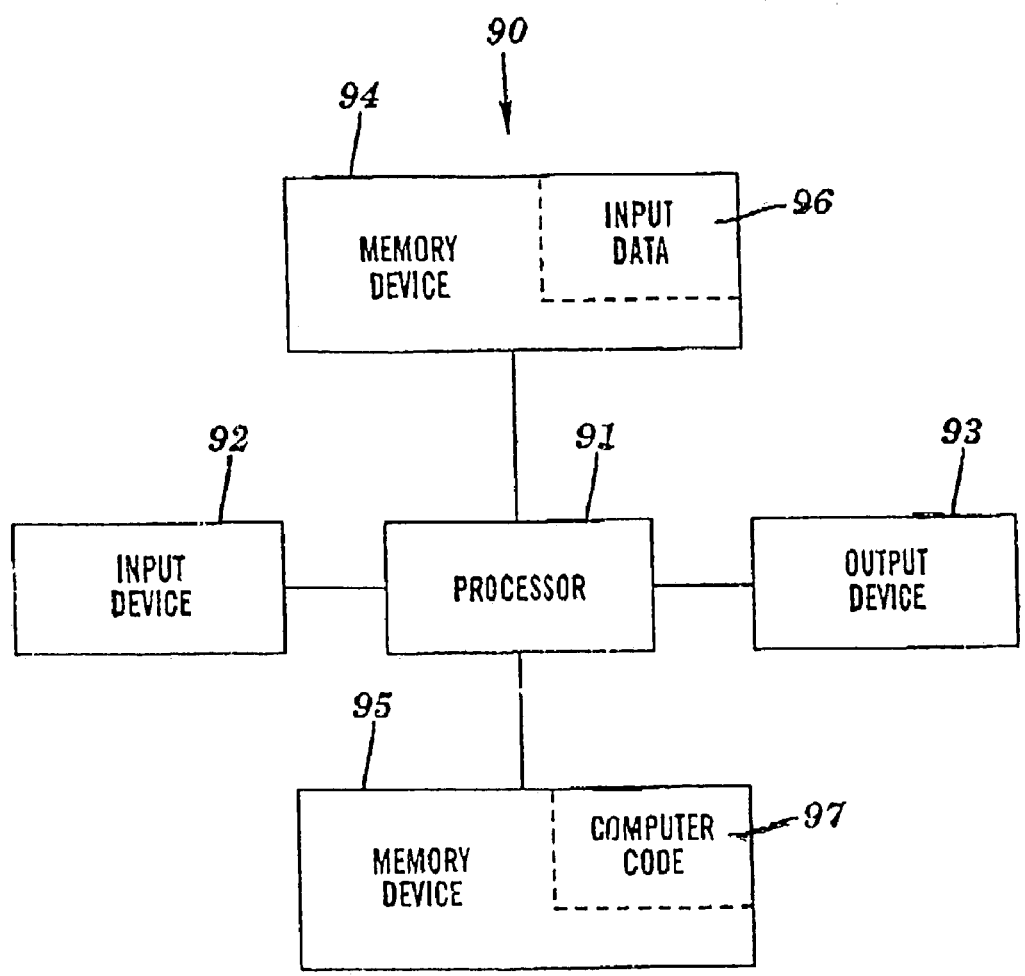
FIG. 14 illustrates a computer system for implementing the Dual-Bootstrap ICP algorithm, in accordance with embodiments of the present invention.

FIG. 14 illustrates a computer system 90 for implementing the Dual-Bootstrap ICP algorithm, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes the Dual-Bootstrap ICP algorithm. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 14) may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

While FIG. 14 shows the computer system 90 as a particular configuration of hardware and software, any configuration of hardware and software, as would be known to a person of ordinary skill in the art, may be utilized for the purposes stated supra in conjunction with the particular computer system 90 of FIG. 14. For example, the memory devices 94 and 95 may be portions of a single memory device rather than separate memory devices.

3.3 Bootstrapping the Model

Increasing complexity models can and should be used as the bootstrap region, $R_t$, increases in size and includes more constraints. Table 1, depicted supra, shows the models used in retinal image registration. Changing the model order must be done carefully, however. Switching to higher order models too soon causes the estimate to be distorted by noise. Switching too late causes modeling error to increase, which increases the alignment error. This can cause misalignments on the boundaries of $R_t$, sometimes leading registration into the wrong domain of convergence. To select the correct model for each bootstrap region, statistical model selection techniques are applied.

Automatic model selection chooses the model that optimizes a trade-off between the fitting accuracy of high-order models and the stability of low-order models. The Dual-Bootstrap ICP model selection criteria is adapted from: K. Bubna and C. V. Stewart, "Model selection techniques and merging rules for range data segmentation algorithms", *Computer Vision and Image Understanding*, 80:215–245, 2000. The model selection criteria comprises maximizing the following expression:

$$\frac{d}{2}\log 2\pi - \sum_i w_i r_i^2 + \log \det(\Sigma), \qquad (2)$$

where d is the degrees of freedom in the model, $$\sum_i w_i r_i^2$$

is the sum of the robustly-weighted alignment errors (based on the estimate $\hat{\theta}$), and $\det(\Sigma)$ is the determinant of the parameter estimate covariance matrix $\Sigma$. Note that the t subscripts have been dropped in Equation (2). If $\Sigma_\theta$ is not full-rank, then the third term (i.e., log $\det(\Sigma)$) goes to $-\infty$. For techniques having no explicit measure of alignment error a different measure, other than $$\sum_i w_i r_i^2$$

will be needed.

Equation (2) is evaluated for the current model $M_t$ and for other candidate models from the set M. For each other model in the set M, the objective function $E(R_t, M, \theta)$ is minimized to produce the weighted alignment errors and the covariance matrix. At worst, the cost of this could be as bad as requiring a complete run of the minimization procedure for each model M. At best, constraints (such as correspondences) from the minimization of $E(R_t, M_t, \theta_t)$, can be used to reach an approximate minimum for each M rapidly. Also, for simplicity, the algorithm can just evaluate $M_t$ and the next more complex model in M, especially since region growth is monotonic. Overall, the model that results in the greatest value of the expression in Equation (2) is chosen at $M_{t+1}$.

Typically as the iterations increase, the model increases in complexity (i.e., in increasing number of degrees of freedom). If the model set in Table 1 is employed, the full quadratic transformation model may be the final model when convergence of the iterative procedure occurs.

While the present invention generally allows for varying the model for each iteration, the scope of the present invention includes the special case in which the model is held constant throughout the iterations while region bootstrapping is occurring.

3.4 Bootstrapping the Region—Region Expansion

The region is expanded based on transfer error, which captures the uncertainty of the mapping at the boundaries of $R_t$. Lower transfer error, implying more certainty in the mapping, leads to faster bootstrap region growth. In the current algorithm, region $R_t$ is rectilinear. Each side of $R_t$ is expanded independently, allowing more rapid expansion where there is less ambiguity. This can be seen in FIGS. 5A–5E, where horizontal expansion is faster than vertical expansion.

Figure 6:
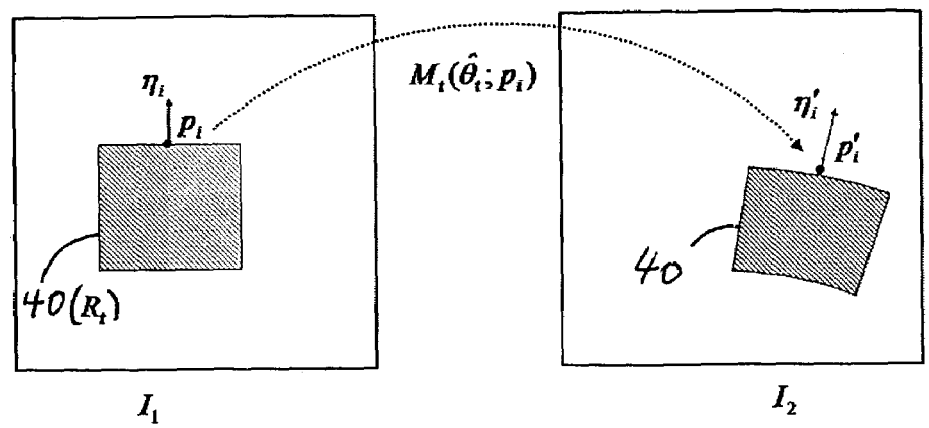
FIG. 6 depicts growth of the bootstrap region, in accordance with embodiments of the present invention.

Let $p_c$ be the image location in $I_1$ in the center of one side of $R_t$, as shown in FIG. 6 described infra. The coordinate system origin should be shifted to the center of $R_t$. Let $p'_c = M_t(\hat{\theta}_t; p_c)$ be the mapping of $p_c$ onto image $I_2$ based on the estimate. This mapped point is a random variable because of its dependence on the transformation. Its covariance matrix, denoted by $\Sigma_{p'_c}$, can be approximated using $\Sigma_t$ and the Jacobian of the transformation evaluated at $p_c$:

$$\Sigma_{p'_c} = \left( \frac{\partial M(\hat{\theta}_t; p)}{\partial p}(p_c) \right)^T \Sigma_t \left( \frac{\partial M(\hat{\theta}_t; p)}{\partial p}(p_c) \right) \quad (3)$$

Equation (3) expresses the transfer error.

Growing the side of $R_t$ involves pushing $p_c$, the center of the side, out along its normal direction, $\eta_c$, as illustrated in FIG. 6 in which the bootstrap region 40, denoted as $R_t$, is expanded by moving out perpendicular to each side in image $I_1$, in accordance with embodiments of the present invention. In FIG. 6, the bootstrap region 40 and its mapping (never explicitly computed) onto $I_2$ are shaded. Point $p_c$ is in the center of one side of $R_t$ and $\eta_c$ is the outward normal to $R_t$ at $p_c$. The transfer error of mapping $p_c$ onto $I_2$ helps determine the growth of the bootstrap region. Direction vector $\eta_c$ must therefore be transferred into $I_2$ and rescaled to produce the mapped direction, $\eta'_c$. The transfer error variance in this direction is $$\eta_c'^T \Sigma_{p'_c} \eta'_c.$$

Thus, the growth $\Delta p_c$ in $p_c$ is computed as:

$$\Delta p_c = \beta \frac{(p_c^T \eta_c)}{\max(1, \eta_c'^T \Sigma_{p'_c} \eta'_c)} \eta'_c \quad (4)$$

This growth $\Delta p_c$, in normal direction $\eta_c$, is proportional to the current distance $(p_c^T \eta_c)$ of the side $p_c$ lies on from the center of $R_t$ and is inversely proportional to the transfer error in the normal direction. The lower bound of 1 in the denominator prevents growth from becoming too fast. Each side of $R_t$ is grown independently using Equation (4). Parameter $\beta$ tunes the growth rate. A value of $\beta = \sqrt{2} - 1$ ensures that the area of a two-dimensional region at most doubles in each iteration. Generally $\beta$ should be in a range of 1 to 8. More sophisticated growth strategies are certainly possible, but the one just described has proven to be effective.

The scope of the present invention is not limited to a rectangular-shaped bootstrap region such as the bootstrap region 40 in FIG. 6. Generally, the bootstrap region may be any planar shape bounded by a closed curve. Such a bootstrap region of essentially arbitrary shape may enlarged by applying Equation (6) to each point of a discrete or continuous set of points p on said closed curve. In other words, enlarging the bootstrap region comprises moving each such point p on the closed curve outward and away from the interior of the bootstrap region by a distance $\Delta p$ in a direction $\eta$ normal to the closed curve at the point p, in accordance with Equation (6). For the bootstrap region 40 in FIG. 6, $p = p_c$, $\Delta p = \Delta p_c$, and $\eta = \eta_c$.

4. Robust ICP

Completing the description of Dual-Bootstrap ICP requires specifying the objective function $E(R_t, M_t, \theta_t)$ and an associated minimization technique.

4.1 Objective Function

In specifying the objective function, image $I_1$ is replaced by a set-points P, which could be a uniform sampling of the intensity surface or a set of detected features. Image $I_2$ is assumed to be represented in such a way that the distance from a point to the image can be computed. As examples, $I_2$ might be represented as an intensity surface or a set of feature points and contours. Spatial data structures can then be used to compute distances and find nearest points.

Assuming these representations, the registration objective function becomes $$E(R_t, M_t, \theta_t) = \sum_{p \in P \cap R_t} \rho(d(M_t(\theta_t; p), I_2)/\hat{\sigma}) \quad (5)$$

Details of this objective function are described as follows.

The minimization is restricted to the set of points in P that are also in bootstrap region, $R_t$.

$d(M_t(\theta_t; p), I_2)$ is the distance between the transformation of p and the representation of $I_2$, where p represents a vector of points in $I_1$. The distance metric depends on the types of point vectors, p. For detected corner points, interest points or other image landmarks, the natural metric is the Euclidean distance. See FIG. 7 described infra for a discussion of landmarks. For points that are samples from smooth regions of curves or surfaces, point-to-line or point-to-plane normal distances are generally more appropriate (also, see FIG. 7 described infra).

$\rho(u)$ is a robust loss function, monotonically non-decreasing as a function of |u|. A least-squares loss function is obtained by making $\rho(u) = u^2$, but because mismatches are common, robust loss functions are crucial.

$\hat{\sigma}$ is the error scale, which is the (robust) standard deviation of the error distances.

Figure 7:
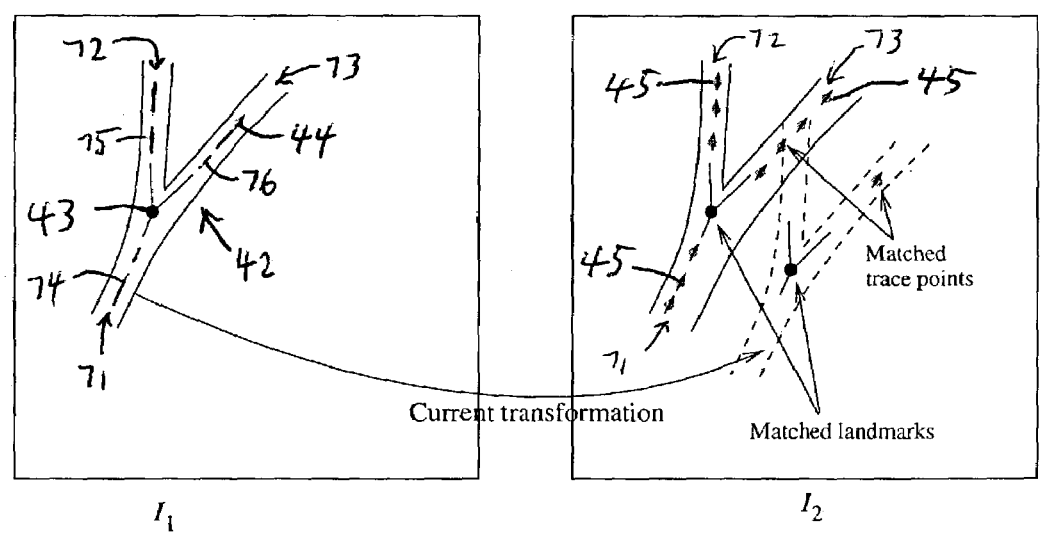
FIG. 7 illustrates distance metrics on landmarks and on trace centerpoints, in accordance with embodiments of the present invention.

FIG. 7 illustrates distance metrics on landmarks and on trace centerpoints (e.g., landmark centerpoints), in accordance with embodiments of the present invention. In FIG. 7, the vascular landmark 42 comprises blood vessels 71, 72, and 73 having centerlines 74, 75, and 76, respectively. The region around the vascular landmark 42 is shown in image $I_1$, including the landmark centerpoint 43 and a separate trace point 44. These features are mapped onto $I_2$ using the current transformation and are matched against the landmark centerpoint 43 and trace points along the centerlines 74, 75, and 76 (e.g, trace point 44 along centerline 76.). The landmark centerpoint 43 match should generate a Euclidean distance constraint, whereas the trace point 44 match, which is in fact mismatched slightly, should generate constraint that measures point-to-line distance. The line is the local, linear approximation to the contour, with tangent vectors 45 shown.

4.2 ICP Minimization

To minimize this objective function, ICP alternates steps of matching and parameter estimation. ICP innovations comprise robust parameter estimation and error scale estimation (see section 4.3, described infra). In matching, the goal is to find the closest point q to each $p' = M_t(\hat{\theta}_t; p)$. Spatial data structures make this efficient. In some cases, the closest point may be constructed using cross-correlation matching. All of the resulting correspondences are placed in the correspondence set $C_t$ for this iteration of ICP (not the outer iteration of the entire Dual-Bootstrap ICP procedure). Given $C_t$, the new estimate of the transformation parameters $\hat{\theta}_t$ is computed by minimizing $$E(C_t, \theta_t) = \sum_{(p,q) \in C_t} \rho(d(M_t(\theta_t; p), q)/\hat{\sigma}) \qquad (6)$$

Equation (6) may be minimized with respect to the transformation parameters $\hat{\theta}_t$ using iteratively-reweighted least-squares (IRLS), with weight function $w(u)=\rho'(u)/u$. The minimization process alternates weight recalculation using a fixed parameter estimate with weighted least-squares estimation of the parameters.

Figure 8A:
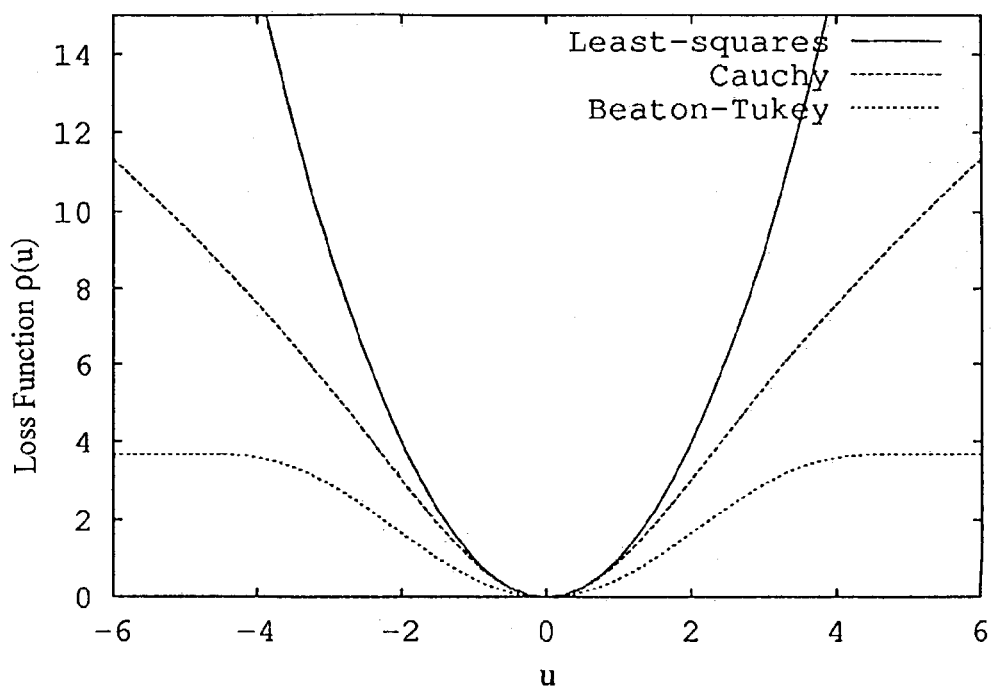
FIG. 8A and 8B depict plots of the robust loss function $\rho(u)$ and the associated weight function $w(u)=\rho'(u)/u$, respectively, for the Beaton-Tukey biweight loss function, the Cauchy loss function, and the quadratic loss function, in accordance with embodiments of the present invention.
Figure 8B:
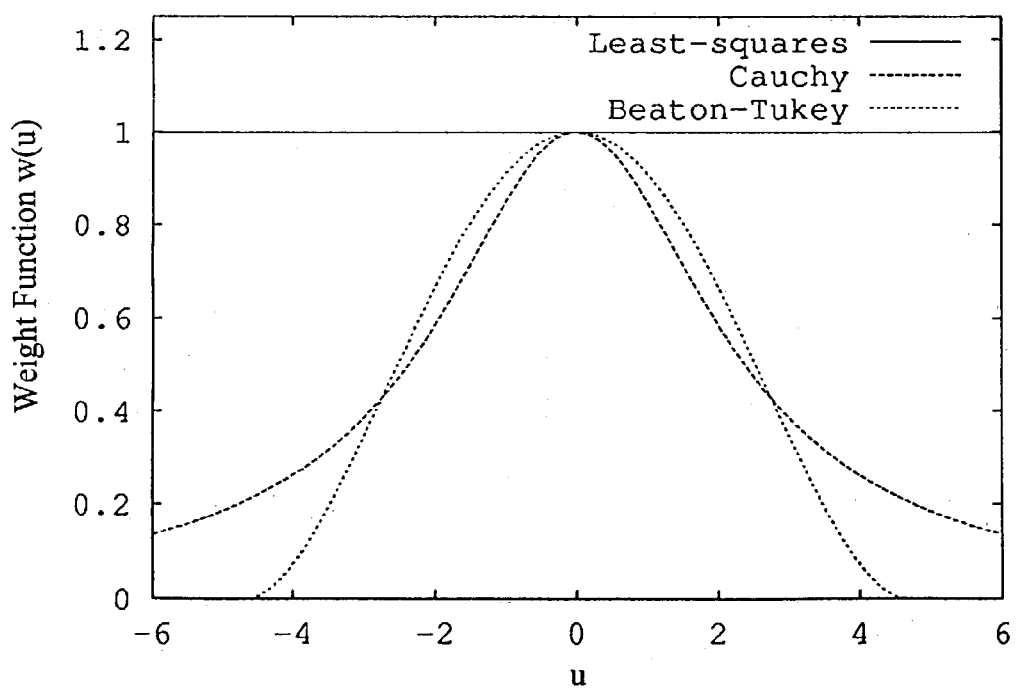

The choice of loss functions $\rho(u)$ is motivated by looking at the associated weight functions illustrated in FIGS. 8A–8B, in accordance with embodiments of the present invention. FIG. 8A and 8B depict plots of the robust loss function $\rho(u)$ and the associated weight function $w(u)=\rho'(u)/u$, respectively, for the Beaton-Tukey biweight loss function, the Cauchy loss function, and the quadratic loss function which equates to least-squares estimation. The weight function is used in the iteratively reweighted least-squares implementation of M-estimators. The Beaton-Tukey biweight loss function is a good choice, because it most aggressively rejects outliers, providing no weight to matches with normalized distances greater than about 4 standard deviations.

The least-squares (i.e., quadratic) loss function has a constant weight, the Cauchy weight function descends and asymptotes at 0, while the Beaton-Tukey biweight function has a hard limit beyond which the weight is 0. This limit is set to about $4\hat{\sigma}$. This is important for rejecting errors due to mismatches. Other loss functions sharing this hard-limit property could also be used. In detail, the weight function is $$w(u) = \begin{cases} \left[1 - \left(\frac{u}{a}\right)^2\right]^2 & |u| \le a \\ 0 & |u| > a, \end{cases} \text{ where } u = d(M_t(\theta_t; p), q)/\hat{\sigma}.$$

4.3 Robust Error Scale Estimation

The foregoing discussion shows that accurately estimating the error scale, $\sigma$, is crucial. Estimation of error scale is done for each set of correspondences, $C_t$, at the start of reweighted least-squares. The present invention uses a Minimum Unbiased Scale Estimate (MUSE) technique that automatically adjusts its estimate by determining the fraction of (approximately) correct matches. This is important because sometimes more than 50% of the feature points in $R_t$ are mismatched. An example of this occurs during the registration process shown in FIG. 5 when $R_t$ covers about half the overlap between images. Let $r_j = |d(M_t(\hat{\theta}_t; p_j), q_j)|$ be the absolute error estimate for the $j$ th correspondence using the current estimate $\hat{\theta}_t$ of the transformation parameters. Let $r_{1:N}, r_{2:N}, \ldots, r_{N:N}$ be a rearrangement of these values into non-decreasing order. Then for any k, $r_{1:N}, r_{2:N}, \ldots, r_{N:N}$ k smallest errors. A scale estimate may be generated from $r_{1:N}, r_{2:N}, \ldots, r_{N:N}$ as $$\sigma_k^2 = \frac{\sum_{j=1}^{k} r_{j:N}^2}{C(k, N)}$$

where C(k,N) is a computed correction factor. This factor makes $\sigma_k^2$ an unbiased estimate of the variance of a normal distribution using only the first k out of N errors. The intuition behind MUSE is seen by considering the effect of outliers on $\sigma_k^2$. When k is large enough to start to include outliers (errors from incorrect matches), values of $\sigma_k^2$ start to increase substantially. When k is small enough to include only inliers, $\sigma_k^2$ is small and approximately constant. Thus, the algorithm can simply evaluate $\sigma_k^2$ for a range of values of k (e.g. 0.35N, 0.40N, . . . , 0.95N), and choose the smallest $\sigma_k^2$. To avoid values of k that are too small, the algorithm may take the minimum variance value of $\sigma_k^2$, not just the smallest $\sigma_k^2$.

5. Retinal Image Registration Using Dual-Bootstrap ICP

In high-quality images of healthy retinas, many landmarks are available to initialize matching. In lower-quality images or in images of unhealthy retinas, fewer landmarks are prominent. Therefore, a useful manner of implementing the Dual-Bootstrap ICP algorithm in retina image registration is to start from a similarity transformation initialized by matching a single pair of landmarks or by matching two pairs of landmarks. The algorithm tests many different initial correspondences, allowing the Dual-Bootstrap ICP to converge for each. It stops and accepts as correct a registration having a stable transformation and a highly accurate alignment.

The following discussion relates to several important implementation details, namely: point sets, initialization, iterative matching, transformation model set, termination and criteria.

5.1 Point Sets

As discussed supra (e.g., see FIG. 3), the points are landmarks—branches and cross-over points of blood vessels—and sampled points along blood vessel centerlines, extracted using an exploratory algorithm. The centerline points, forming the set P in robust ICP, are characterized by location, orientation and width, while the landmarks are characterized by their center location, the orientation of the blood vessels that meet to form them, and the widths of these vessels, as illustrated in FIGS. 9A and 9B and described infra.

5.2 Initialization

Matches between two landmarks, one in each image, or between pairs of landmarks in each image, are generated by computing and comparing invariants. Invariants for a single landmark are blood vessel width ratios and blood vessel orientations, resulting in a five-component invariant signature vector that includes three angles $(\theta_1, \theta_2, \theta_3)$ and two blood vessel width ratios (e.g., $w_1/w_3$ and $w_2/w_3$) depicted in FIG. 9A, in accordance with embodiments of the present invention. FIG. 9A depicts landmark 50 comprising blood vessels 51, 52, and 53. The landmark 50 is characterized by a center locationc. The orientations of the three blood vessels 51, 52, and 53 (as respectively described by the angles $\theta_1, \theta_2$, and $\theta_3$ with respect to the X-axis) that meet to form the center location c, and the widths $w_j$ of the blood vessel. Differences in orientations and the ratios of the blood vessel widths are invariant to rotation, translation and scaling of the image. The orientations themselves are invariant to translation and scaling.

The invariant signature of a set of two landmarks 56 and 57 in FIG. 9B is a six-component vector, in accordance with embodiments of the present invention. The line segment drawn between the two landmarks 56 and 57 forms an axis 58. The orientation with respect to the axis 58 of each of three landmark angles $\phi_1$, $\phi_2$, and $\phi_3$ of the landmark 56, and the orientation with respect to the axis 58 of each of three landmark angles $\phi_4$, $\phi_5$, and $\phi_6$ of the landmark 57, constitute the six components. The invariant signature vectors for one- and two-landmark sets are computed separately for each landmark 56 and 57 (i.e., $I_1$ and $I_2$), and then matched (each set separately). The closest match is found for each signature vector. Additional matches are determined when the Mahalanobis distance between signature vectors is within a chi-squared uncertainty bound. Each signature match produces a set of one or two landmark correspondences. These sets are ordered for testing by chi-squared confidence levels. For each set, a similarity transformation is computed which generates the initial transformation.

5.3 Iterative Matching

The matching constraints during iterative minimization of Dual-Bootstrap ICP are point-to-line matches (as illustrated supra in FIG. 7). The lines are described by a centerline point $q_j$ and its associated normal $\eta_j$. The distance measure d used in Equation (6) is:

$$d(M_t(\theta_t; p_i), q_j) = |(M_t(\theta_t; p_i) - q_j)^T \eta_j|$$

To facilitate matching, the centerline points are stored in a digital distance map. The initial bootstrap region, $R_1$, around a single landmark correspondence is (somewhat arbitrarily) chosen to be a square whose width is 10 times the width of the thickest blood vessel forming the landmark.

5.4 Transformation Model Set

Four transformation models are in the model sequence M depicted in Table 1: similarity, affine, reduced-quadratic and full quadratic. The full quadratic model may be the desired final model. The reduced quadratic model can be derived as the transformation induced in a weak-perspective camera by the motion of a sphere about its center. As seen in Table 1, the reduced-quadratic model has the same number of degrees of freedom as the affine model, but is more accurate. In practice, automatic model selection technique may ignore the affine model.

5.5 Termination Criteria

The termination of a single iteration of Dual-Bootstrap ICP is as described in Section 3.2, although simple heuristics are used for early termination of obviously misaligned bootstrap regions. Overall, the entire registration algorithm for an image pair ends when a transformation is found with sufficiently low median matching error (threshold of 1.5 pixels, as determined empirically) and the transformation parameters (e.g., the full quadratic transformation parameters) are sufficiently stable. The low median matching error criteria is a special case of a more general criteria in which an average or median of the distance measures d (see Equation for d supra in Section 5.3) is less than a predetermined tolerance. Stability of the transformation parameters is satisfied if covariance matrix is stable based on a standard numeric measure of the rank of the covariance matrix. Another necessary condition for convergence criteria that may be used is that the ratio of the area of the bootstrap region to the area of the image plane $I_1$ exceeds a predetermined fixed ratio. The full quadratic transformation may be accepted as correct. If no such transformation is found when all initial bootstrap regions have been tested using Dual-Bootstrap ICP, no transformation is accepted and registration fails.

6. Experimental Analysis

This section presents the results of a large number of experiments using Dual-Bootstrap ICP in retinal image registration. The presentation illustrates the nearly flawless performance of the algorithm and then illustrates the importance of each major component of the dual-bootstrapping process.

6.1 Data and Analysis

The performance of the algorithm of the present invention is demonstrated on two groups of image data sets. One contains images from 18 different healthy eyes, with 15–25 images in each set. These images, which were taken with a TOPCON® digital fundus camera, show a wide range of views of each retinal fundus, and some pairs of images of the same eye have no overlap whatsoever. The data set contains images from 40 different eyes with various pathologies, yielding 300 image pairs. Some of these pairs were taken at the same time, while others were taken with time differences of months or even years. Some of these images are digital, while others are scanned color slides. All images have a resolution of 1024×1024 pixels. Results are presented for the two data sets separately because the second, "pathology" set is more challenging, but much smaller. FIGS. 5A–5D described supra and FIGS. 10A–10D demonstrate example alignments for images of unhealthy retinas.

Figure 10A:
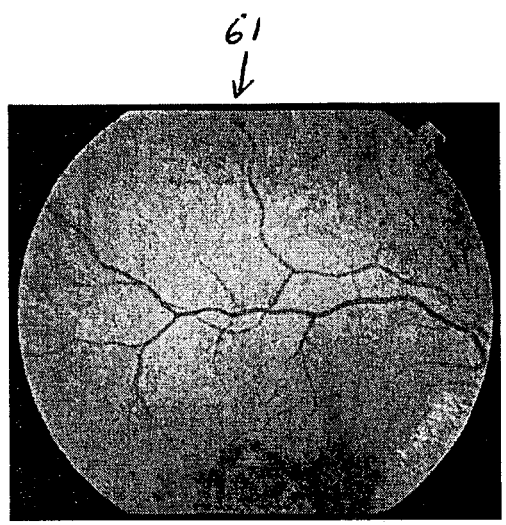
FIGS. 10A–10D depict images showing Dual Bootstrap ICP retinal image registration results on a pair of images taken 3.5 years apart, in accordance with embodiments of the present invention.
Figure 10B:
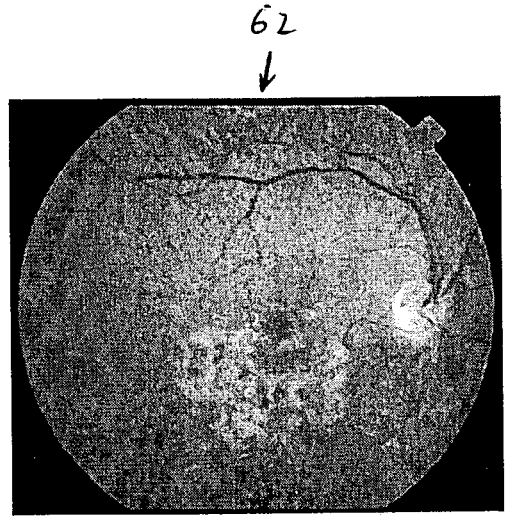
Figure 10C:
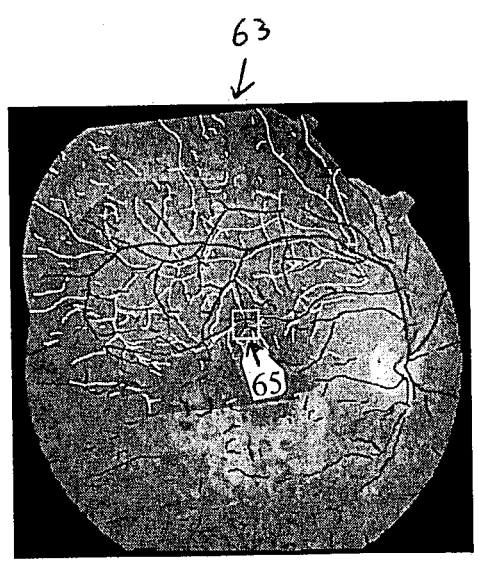
Figure 10D:
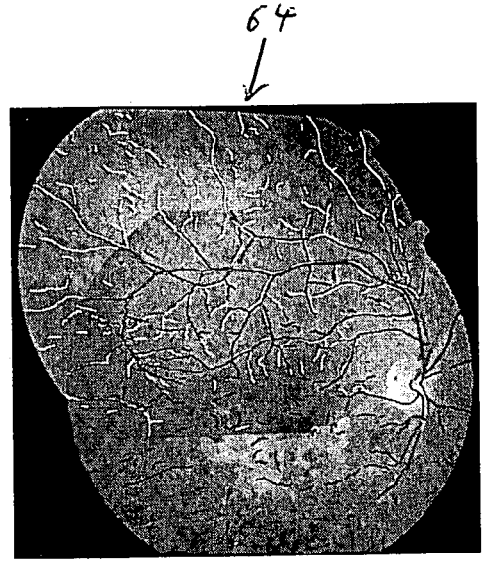

FIGS. 10A–10D, which respectively depict images 61–64 showing Dual Bootstrap ICP retinal image registration results on a pair of images taken 3.5 years apart, in accordance with embodiments of the present invention. The patient has a branch vein occlusion. Substantial changes in the non-vascular regions appear. FIG. 10C shows the image 63 which depicts the alignment of the two images 61–62 based on the initial bootstrap region. Extracted blood vessel centerline points from the two different images are shown in black and in white. The initial bootstrap region 65 is shown as a white box. Clearly the alignment is quite poor image-wide. FIG. 10CD shows the image 64 which shows the final alignment estimated by the Dual-Bootstrap ICP algorithm starting from this initial estimate.

Measuring performance requires a means of validation, preferably ground truth. Manually generated ground truth is extremely difficult for such a large data set, and our experience is that this is less accurate than automatic registration anyway. Fortunately, we have a multipart alternative strategy. First, for the set of images from any given eye, all images can be jointly aligned, including pairs that have little or no overlap, using a joint, multi-image mosaicing algorithm which uses constraints generated from pairwise registration (by using, inter alia, Dual-Bootstrap ICP) to initialize a bundle adjustment procedure that results in full quadratic transformations between all pairs of images, even ones that failed pairwise registration. The resulting transformations are then manually validated by viewing the alignment of the images. The constraints may be manually generated to ensure that all images were included, but this was not necessary. No image in the data set was left out by this technique. Therefore, failures of Dual-Bootstrap ICP registration do not bias these pseudo-ground-truth results.

Having these validated transformations is the basis for the crucial next step: developing approximate upper bounds on the performance of point-based registration. Taking the set of vascular landmarks and centerline points for each image as given and fixed, the following question arises: "what is the best possible performance of an registration algorithm using centerline constraints?" Referring back to the objective function in Equation (5), for any pair of images the procedure can start from the "correct" transformation and therefore find an excellent approximation to the correct set of correspondences (again, with the point sets fixed). Then the covariance of the transformation estimate can be determined. If the condition number of this matrix indicates that the transformation is sufficiently stable, then a point-based registration between these image pairs is possible. Denoting these pairs as $S_h$ and $S_p$ for the healthy and pathology sets respectively, the success rate of the algorithm as a percentage of the sizes of these two sets can be measured. This is a first performance bound. A second, and tighter performance bound, restricts $S_h$ and $S_p$ by eliminating image pairs that have no common landmarks. This can be discovered by using the "correct" transformations to find corresponding landmarks. The reduced sets is referred to as $S'_h$ and $S'_p$. Success rates on these sets separates the performance of initialization from the performance of the iterative minimization of the Dual-Bootstrap ICP algorithm and gives an idea of how well Dual -Bootstrap ICP does given a reasonable starting point. The cardinalities of these sets are $|S_h|$=5,753, $|S_p|$=369, $|S'_h|$5,611, and $|S'_p|$=361.

6.2 Overall Performance

An important measure of overall performance is the success rate—the percentage of image pairs for which a correct (within 1.5 pixels of error) transformation estimate is obtained. This is summarized in Table 2 for the healthy-eye and pathology-eye datasets.

TABLE 2

| | Success Rate of Retinal Image Registration (%) | |
|---|---|---|
| | All Pairs | One Landmark Pair |
| Healthy - $S_h$ (%) | 97.0 | 99.5 |
| Pathology - $S_p$ (%) | 97.8 | 100 |

In Table 2, the first column, labeled "all pairs", is for all "correct" image pairs—the sets $S_h$ and $S_p$, and the second column, labeled "one landmark pairs" is for all "correct" image pairs having at least one common landmark—the sets $S'_h$ and $S'_p$. The percentages in Table 2 are extremely high and show virtually flawless performance of the overall registration algorithm, including initialization, and the Dual-Bootstrap ICP algorithm in particular. The apparently counter-intuitive result that the pathology data set has higher success rate is explained by the pathology image pairs having higher overlap, on average. The healthy-eye images were deliberately taken to obtain complete views of the fundus, whereas the pathology-eye images were taken to capture the diseased region(s). The few failures are due to having few common landmarks or a combination of sparse centerline trace points and low overlap. This is illustrated using a bar chart in FIG. 11.

Figure 11:
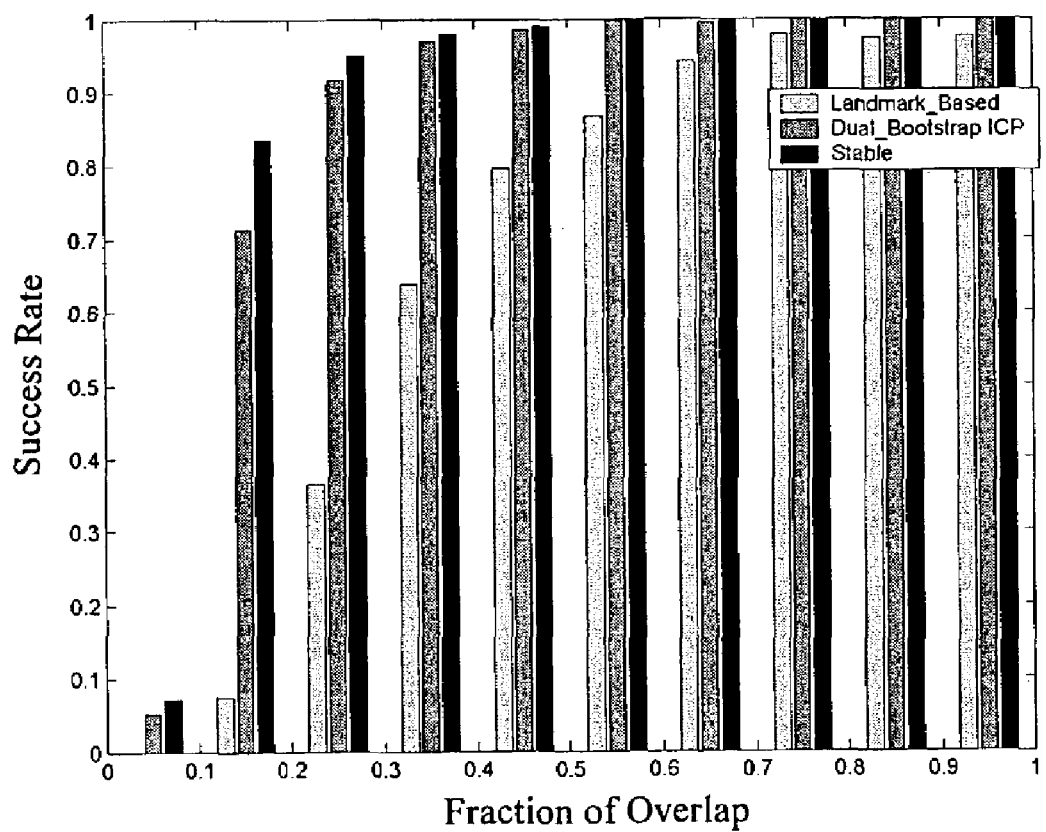
FIG. 11 is a bar chart that plots the percentage of successful retinal image registrations as a function of overlap between images, in accordance with embodiments of the present invention.

FIG. 11 is a bar chart that plots the percentage of successful retinal image registrations as a function of overlap between images, in accordance with embodiments of the present invention. The plots include all image pairs in healthy-eye data set $S_h$, not just those for which a stable transformation is available. The percentage for the Dual-Bootstrap ICP based algorithm, the percentage for an earlier landmark-based algorithm, and the percentage of stable transformations are all shown for each interval. When the height for an algorithm equals that of the height of "stable", 100% success was obtained by the algorithm. Plotting the results this way shows the overall difficulty in obtaining enough information to register at extremely low overlaps. Even here, however, the success rate of the Dual-Bootstrap ICP based algorithm nearly matches the best possible for a fixed set of points. For image pairs that overlap in at least 35% of the pixels and have at least one correspondence, there were no failures. This involved over 4000 image pairs.

As a final indication of the overall performance, here is a summary of some additional experimental details:

- Using matching of single landmarks between images resulted in a 96.7% success rate, whereas matching pairs of landmarks from each image resulted in a 90.4% success rate. Since the overall performance was 97.0%, the combination of both did improve performance, although single landmark matching alone was nearly as effective.
- Over the entire dataset, including both healthy and pathology eye images, the median number of matches tried before the algorithm succeeded was 1 and the average was 5.5. The large difference between the median and the average is caused by a small number of image pairs that required an extremely large number of initial estimates before success. The worst was 746.
- The execution time required by the algorithm varied considerably with the number of initial estimates required before success. On a 933 MHz Pentium III computer running FreeBSD, the median time was 5 seconds.
- In preliminary experiments on multimodal registration of red-free images and fluorescein angiograms, the Dual-Bootstrap ICP has nearly the same performance as the results reported. It fails for extreme cases of retinas where leakage of the dye from the blood vessels is immediate and completely obscures the vasculature, or for angiograms taken long after the injection of the dye, when the dye has slowly perfused the retina. In both cases, failure is largely due to a lack of initial landmarks. FIG. 2, discussed supra, shows an example of multimodal registration.

6.3 Evaluation of the Dual-Bootstrap Procedure

Given the nearly flawless performance of the retinal image registration algorithm of the present invention, the crucial issue is how much of it is due to the Dual-Bootstrap ICP formulation. This is addressed in Table 3, which depicts success rates of retinal image registration when each of the three components of the Dual-Bootstrapping ICP algorithm was removed separately: region growth, model selection, and robust estimation. As seen in Table 3 as compared with Table 2, the success rates with a component removed are significantly lower than the 97.0% and 97.8% numbers for the overall algorithm.

With the bootstrap region growth component removed, the initial similarity estimate was used to generate image-wide correspondences, as in standard ICP, and then the algorithm was run with no bootstrap region growth. As seen in Table 3, the success rates were 89.4% and 82.4%. The drop is most significant—16% relative to the overall algorithm (see Table 2)—in the pathology set.

TABLE 3

| | Success Rate of Retinal Image Registration (%) | | |
|---|---|---|---|
| | No Region Growth | No Model Selection | No Robustness |
| Healthy - $S_h$ (%) | 89.4 | 84.7 | 39.0 |
| Pathology - $S_p$ (%) | 82.4 | 80.5 | 12.5 |

With the bootstrap model selection component removed, a single model was used for the entire process of bootstrap region growth and robust ICP refinement. The natural model to use is the full quadratic transformation. The first set of quadratic parameters was estimated from the correspondences in the initial bootstrap region. Using the full quadratic model only led to a low success rate, as shown in Table 3. On the other hand, when the calculation was initialized with an intermediate model (namely, the reduced quadratic transformation) from the initial bootstrap region, the algorithm ran to convergence and then switched to the full quadratic transformation. As a result, the performance was much better: 94.1% on the healthy-eye set and 94.6% on the pathology-eye set. This is a heuristic form of the dual-bootstrap procedure.

With respect to robust estimation, the dual-bootstrapping process might seem to eliminate the need for robustness in the actual registration estimation technique. This is not true, of course. To illustrate, by simply replacing the Beaton-Tukey ρ function with a least-squares ρ function, the performance became dramatically worse as seen in Table 3. This is because mismatches are still clearly possible. Finally, further experiments showed that the use of MUSE scale estimator over a more common estimator such as median absolute deviation improved the effectiveness of the overall algorithm (93.3% and 88.3%).

The preceding results in Table 3 show that the aforementioned three components (i.e., region growth, model selection, and robust estimation) of Dual-Bootstrap ICP are important, with importance increasing substantially for the more difficult pathology eye data set.

6.4 A Sample of Dual-Bootstrap ICP Iterations

Figure 15A:
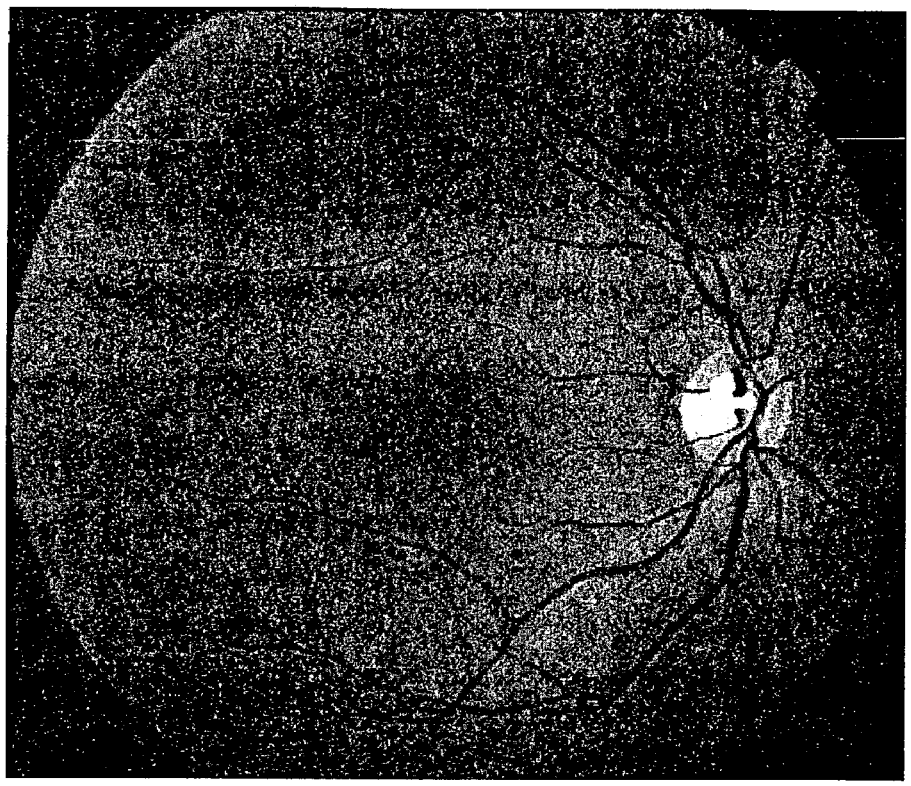
FIG. 15A–15B depict initial images used in a sample problem illustrating the Dual-Bootstrap ICP algorithm, in accordance with embodiments of the present invention.
Figure 15B:
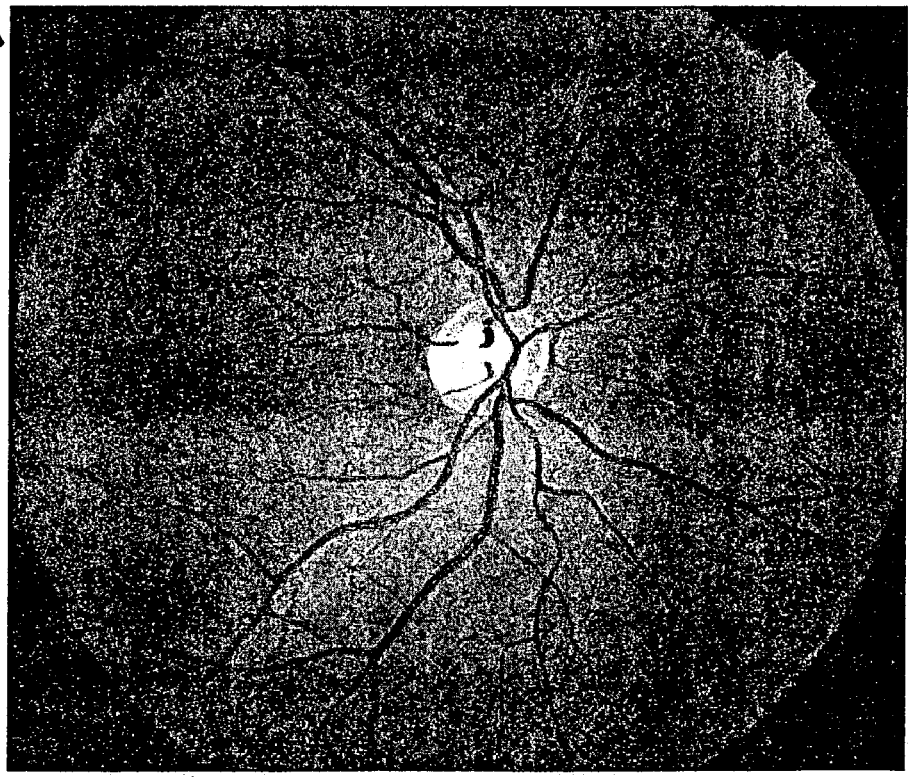
Figure 1A:
Figure 1B:
Figure 1C:
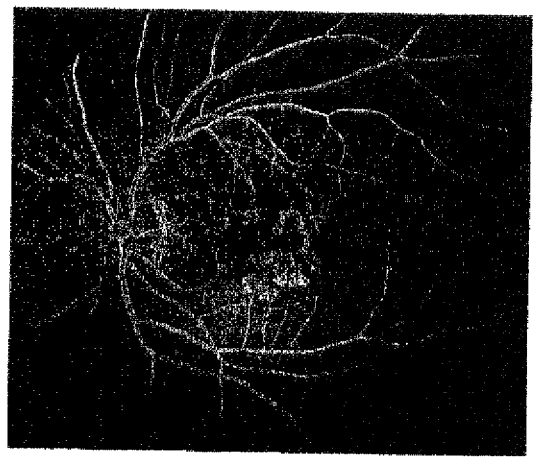
Figure 3A:
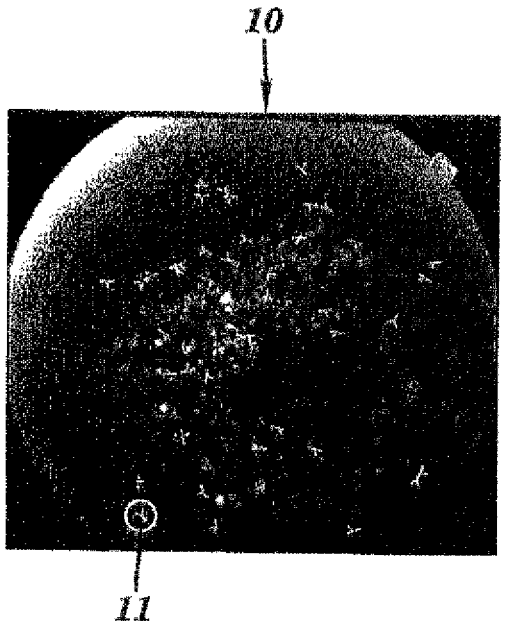
Figure 3B:
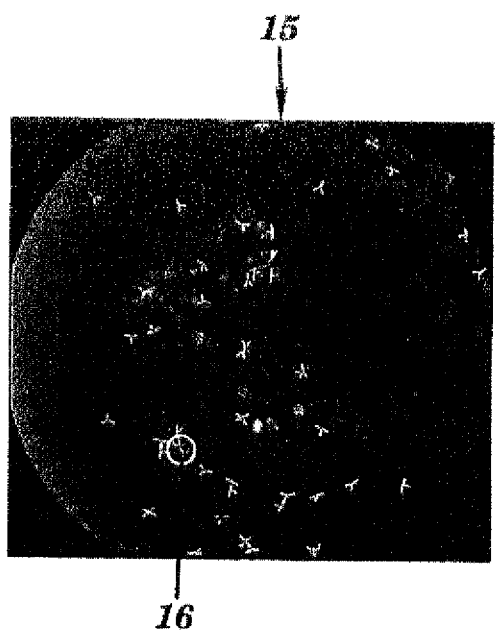
Figure 3C:
Figure 3D:
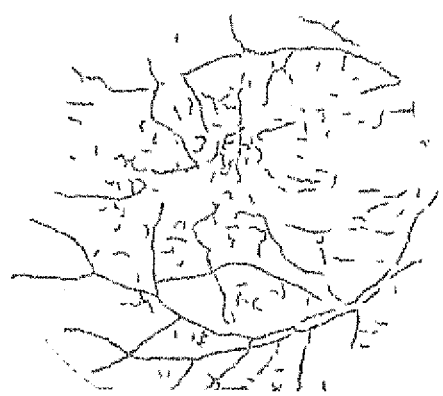
Figure 4A:
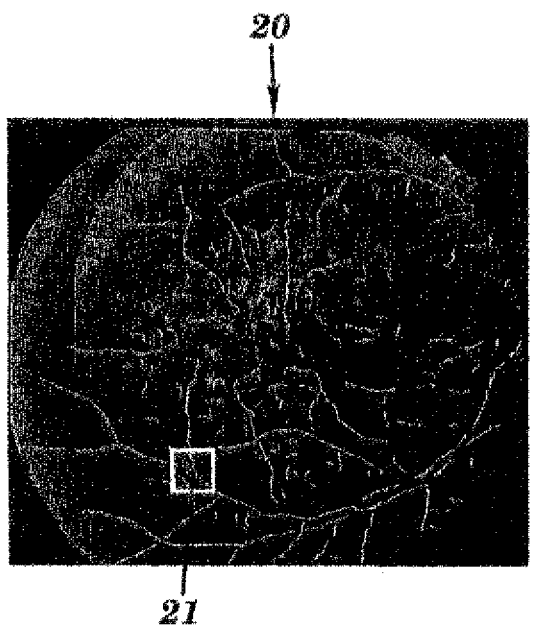
Figure 4B:
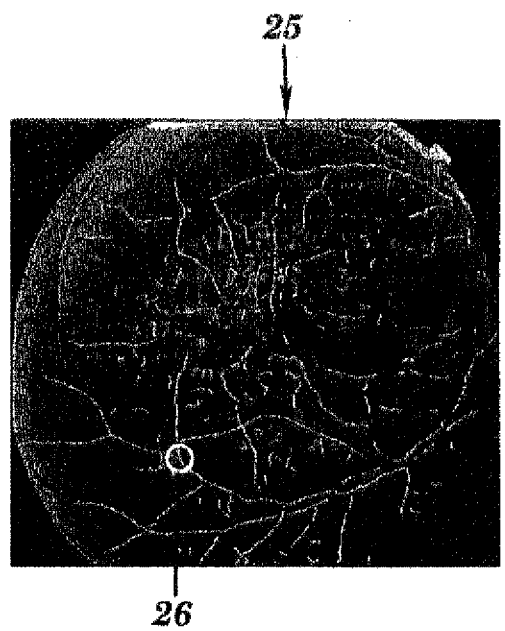
Figure 5A:
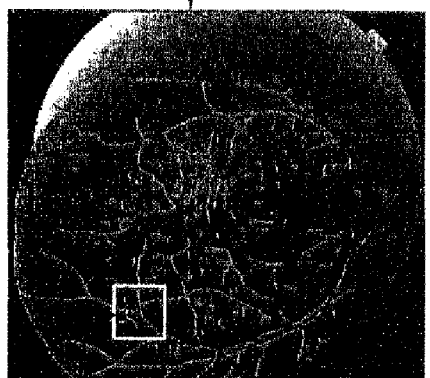
Figure 5B:
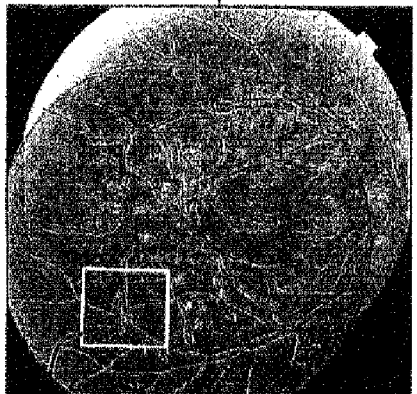
Figure 5C:
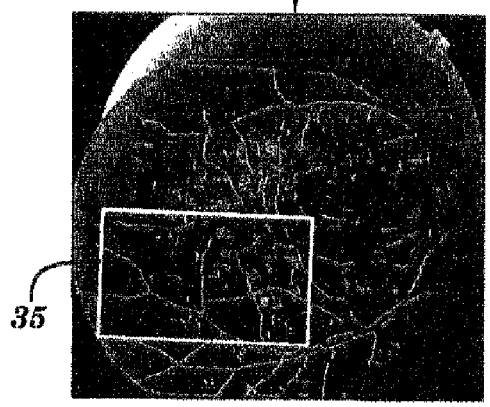
Figure 5D:
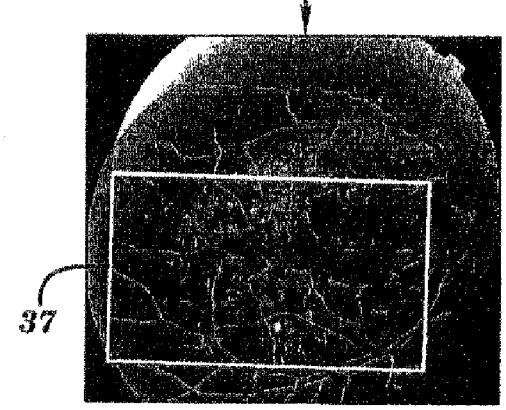
Figure 5E:
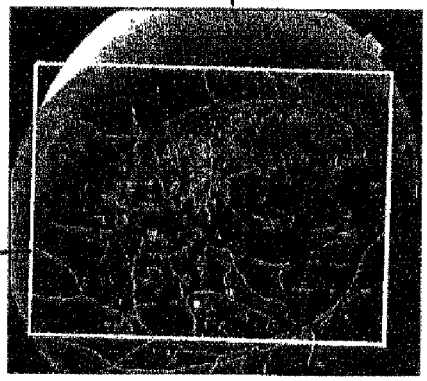
Figure 6:
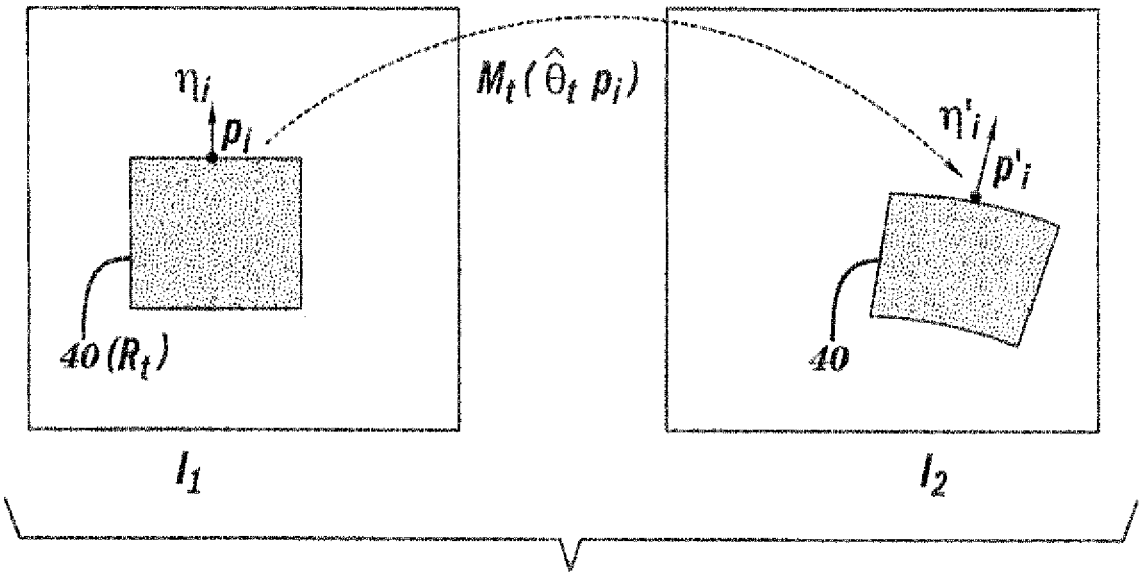
Figure 7:
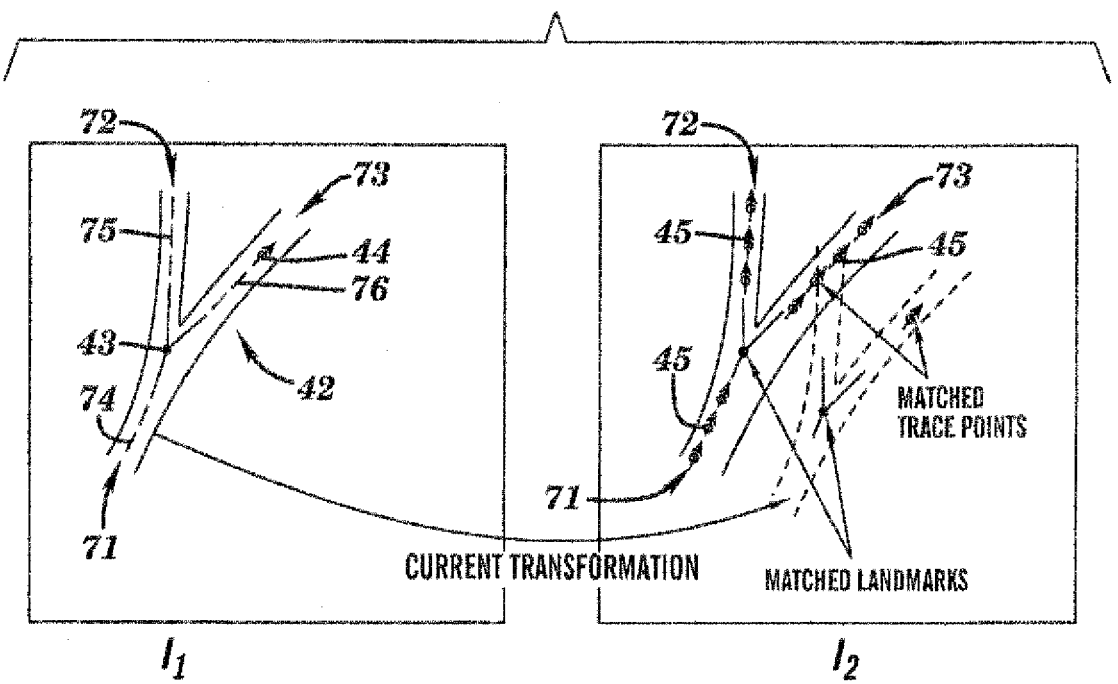
Figure 8A:
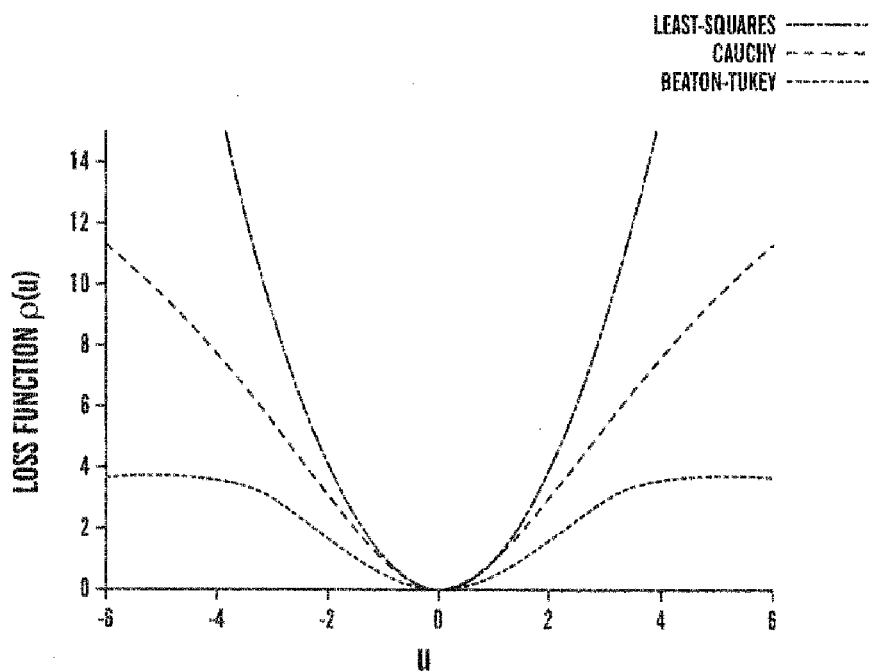
Figure 8B:
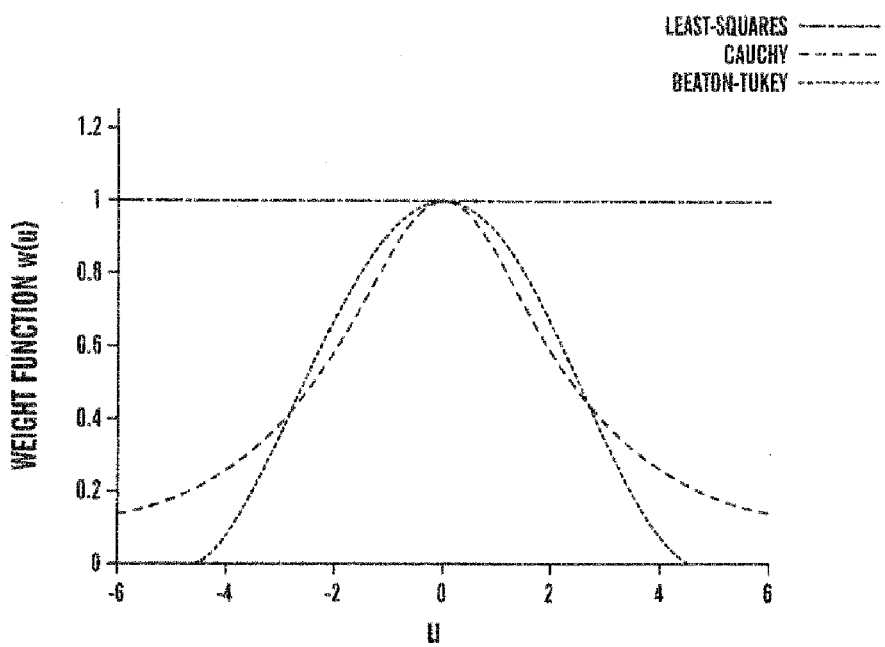
Figure 9A:
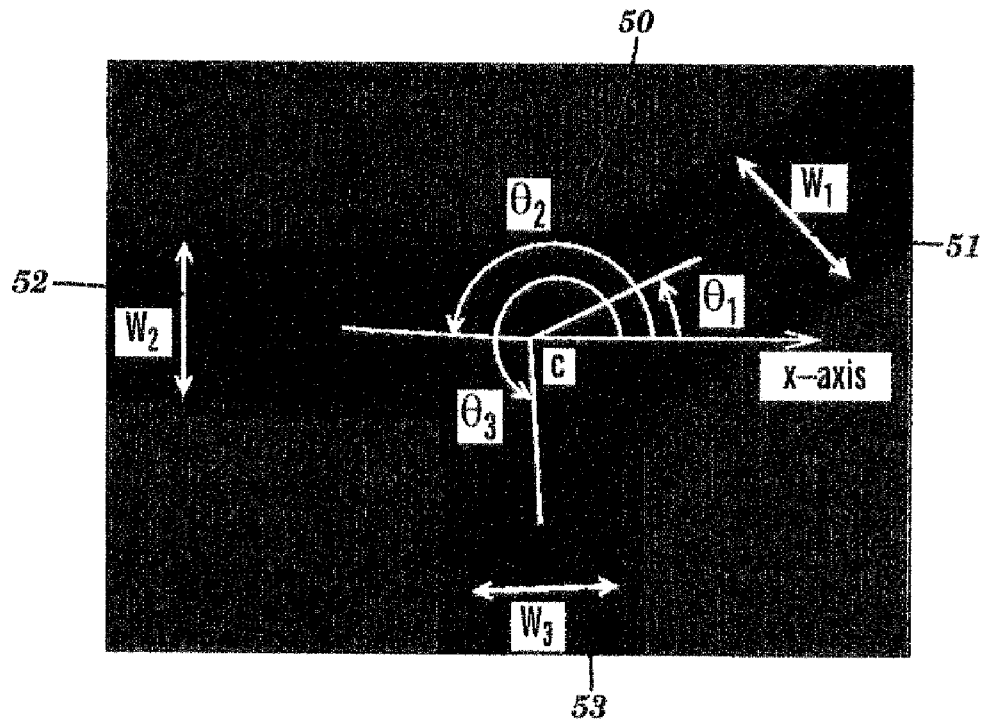
Figure 9B:
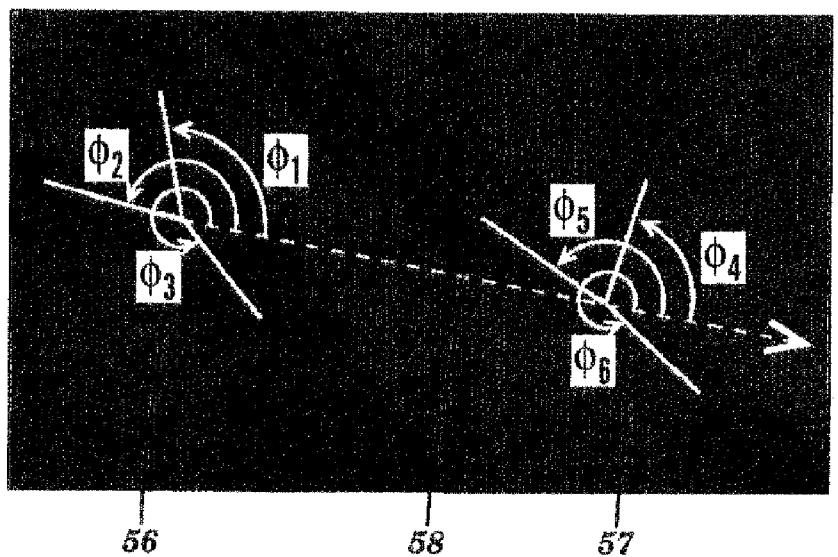
Figure 10A:
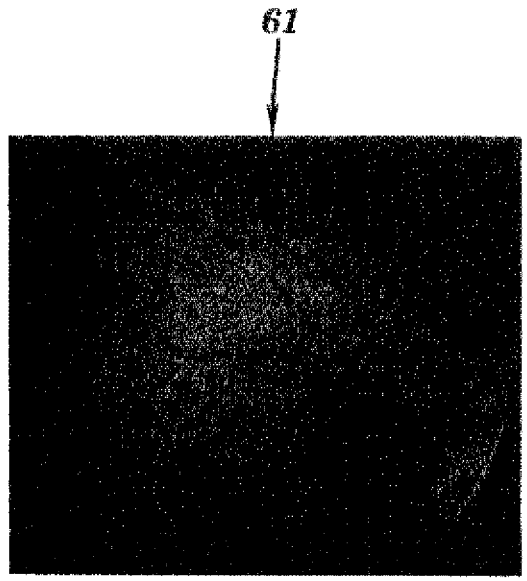
Figure 10B:
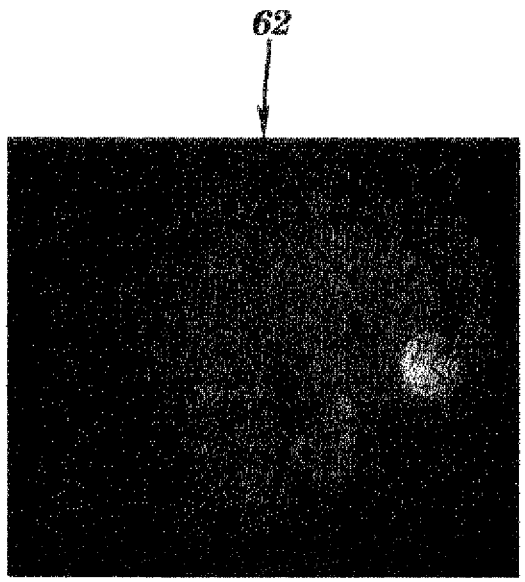
Figure 10C:
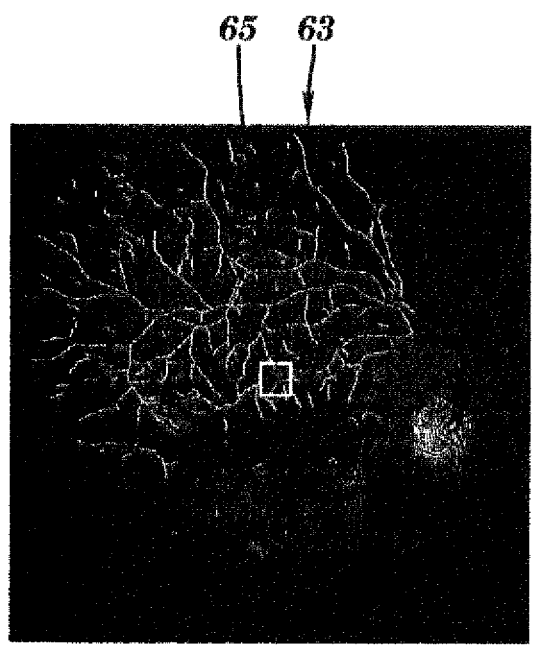
Figure 10D:
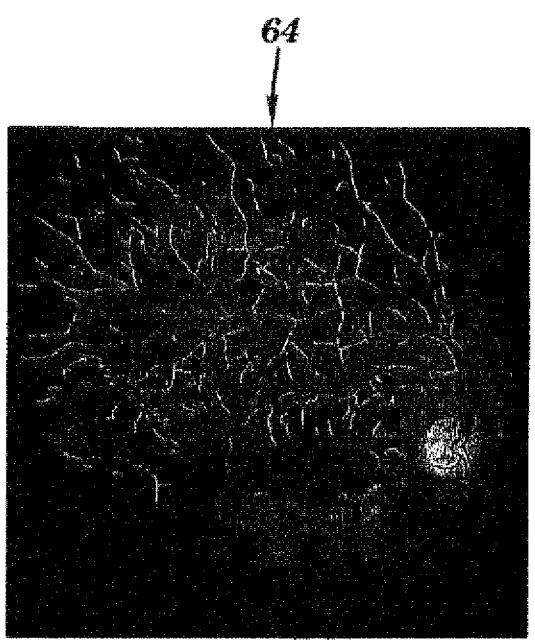
Figure 11:
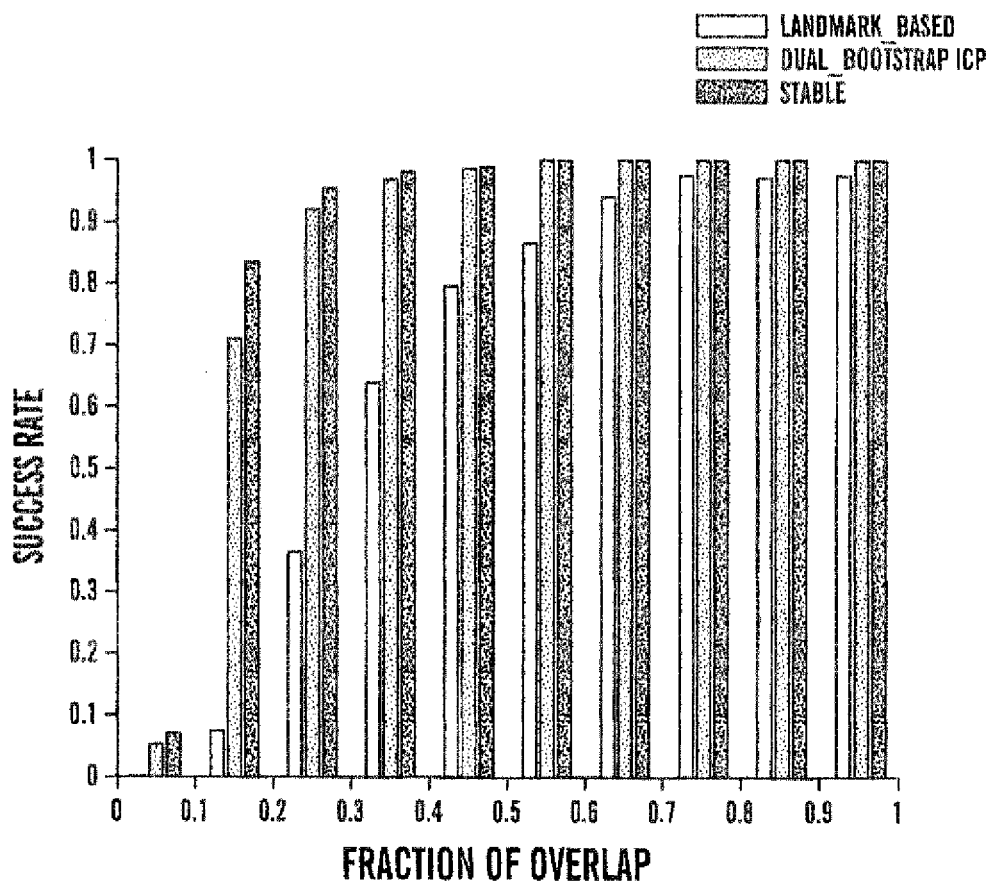
Figure 12:
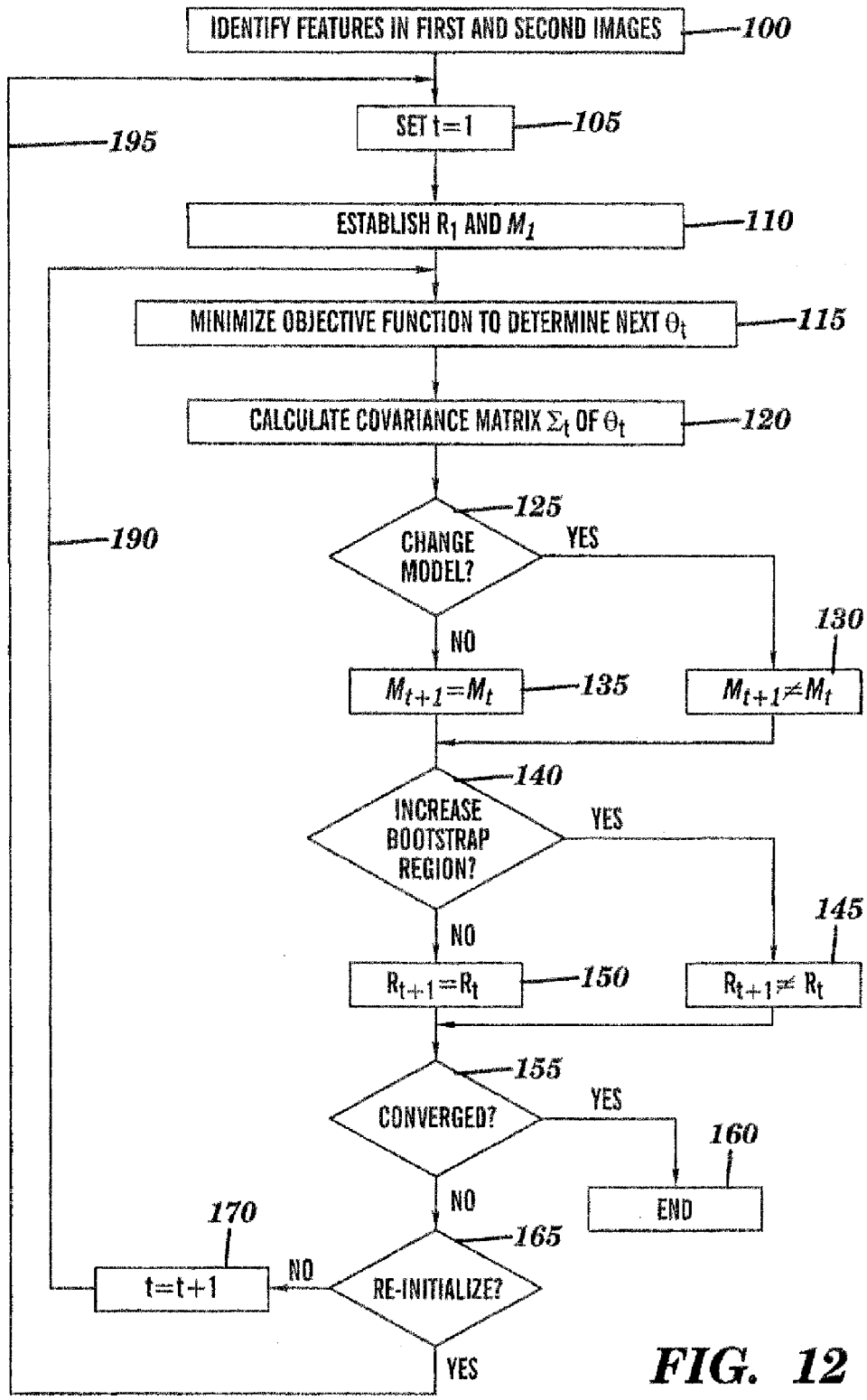
Figure 13:
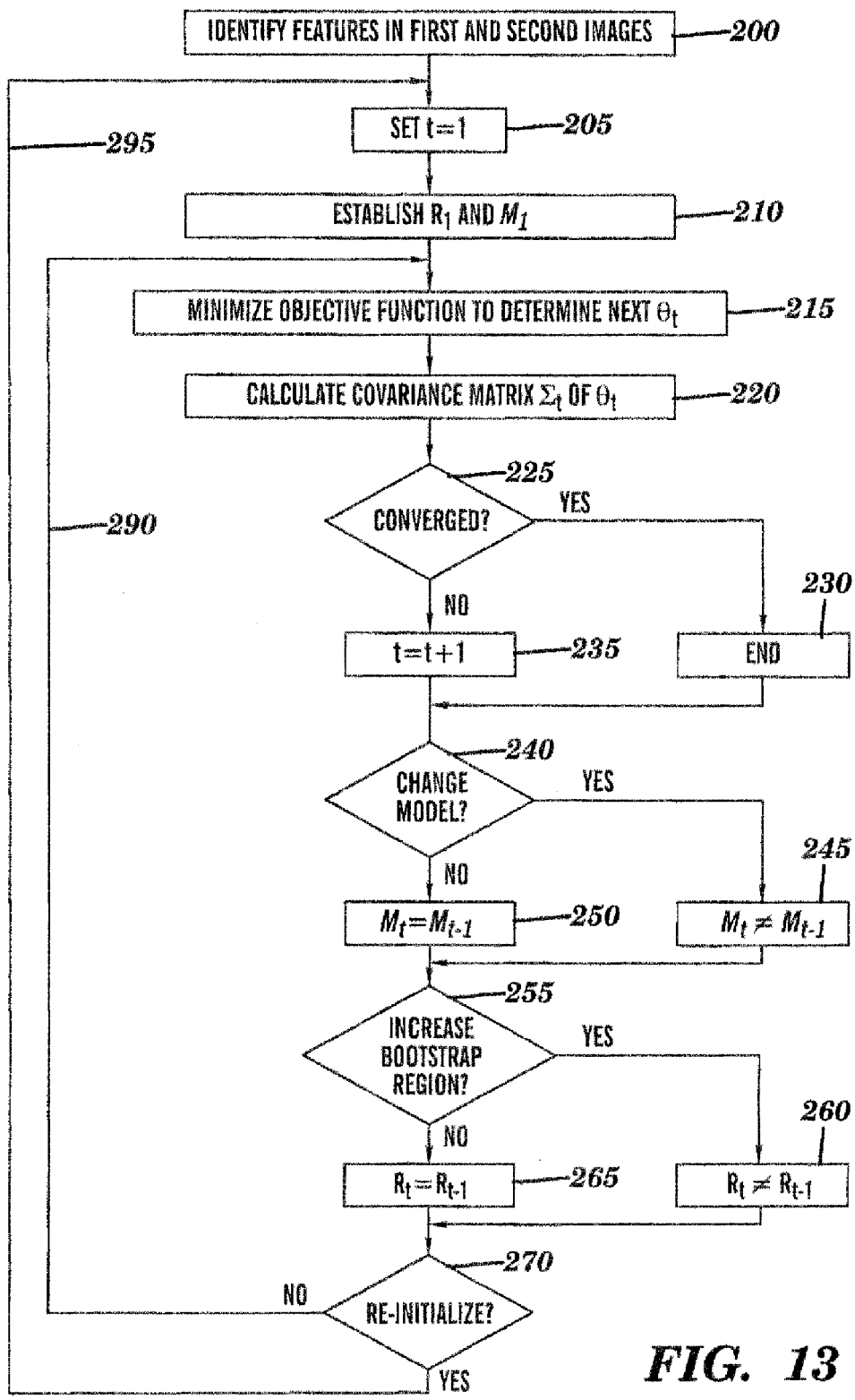
Figure 14:
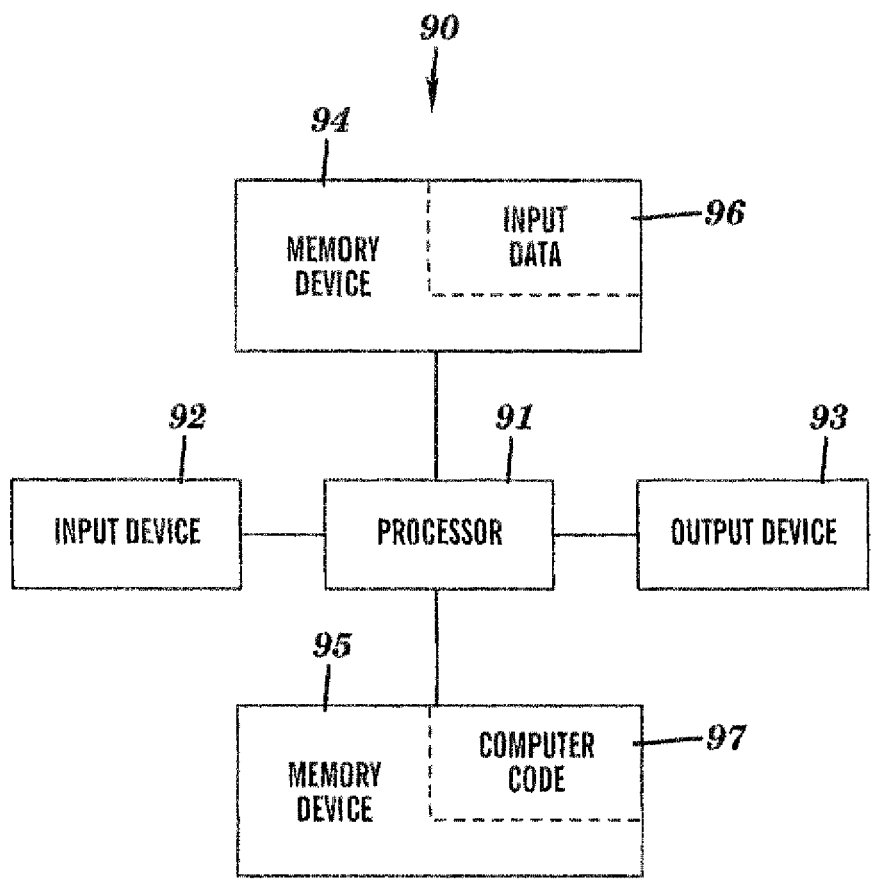
Figure 15A:
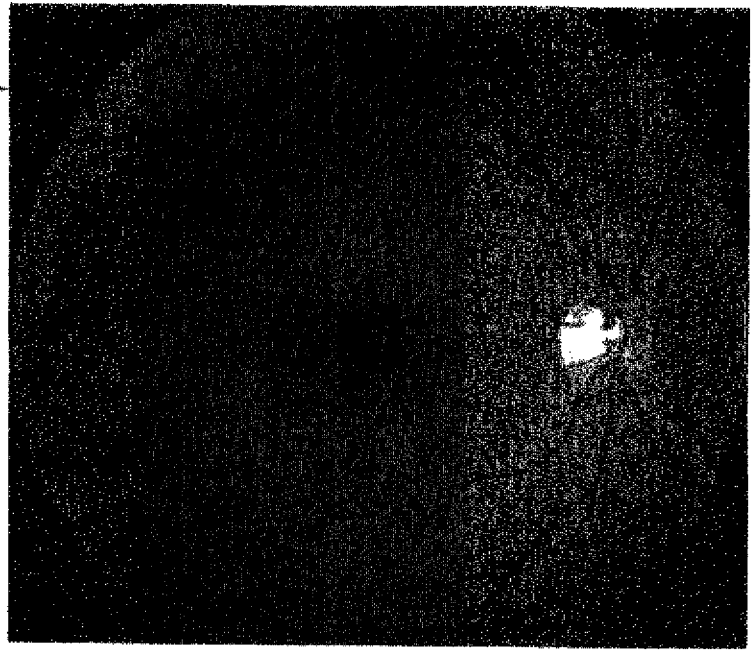
Figure 15B:

FIG. 15A and 15B respectively depict initial images 310 ($I_1$) and 320 ($I_2$) used in a sample problem illustrating the Dual-Bootstrap ICP algorithm, in accordance with embodiments of the present invention. FIGS. 16–25 are tables depicting iterations until convergence of the sample problem of FIGS. 15A–15B, in accordance with embodiments of the present invention. Convergence was achieved in iteration 9. The "Items" appearing in each table are defined as follows. The "Initial Model" is the model used during the iteration. The "Initial Estimate For Model Parameters" is the parameter vector determined in the previous iteration by minimizing the objective function using the Initial Model, as described in Section 4.2, except in iteration 0 for which the "Initial Estimate For Model Parameters" is determined from an initial landmark correspondence. The "Initial Error Scale" is the error scale calculated in accordance with Section 4.3. A purpose of the preceding "Initial" parameters is to find initial trace points correspondences, in accordance with the discussion supra of FIG. 7. The "Bootstrap Region" shows coordinates of two diagonally opposite corner points of a rectangle that defines the bootstrap region used in the iteration. The "Bootstrap Region Size" shows that linear dimensions of the rectangle that defines the bootstrap region used in the iteration (derived from the Bootstrap Region). The "Model Selection" is the model selected for use in the next iteration, wherein the tabulated value for each model type is the value of the function appearing in Equation (2), since the next model selected is the model having the largest such value. Note that in iterations 0, 1, and 2, no model selection explicitly occurred because the bootstrap region was too small, which means that the current similarity transformation model was impliedly selected for use in the next iteration by default. Also note that the model selection did not change until iteration 7 when the reduced quadratic transformation was selected, followed by selection of the full quadratic transformation in iteration 8. The "Objective Function" shows the value of the objective function as defined in Equation (5). The small values of the objective function in the early iterations are meaningless, since the bootstrap region is too small and thus has too few features to contribute very much to the objective function. The magnitude of the objective function as an indicator of the approach to convergence doesn't become meaningful until the final bootstrap region has been established. Also note that the objective function did not change (to six significant figures) in the transition from iteration 8 to iteration 9 (with the same bootstrap region), which confirms the convergence in iteration 9. The "Transfer Error on Bootstrap Region" is the transfer error variance appearing in Equation (4). The "Region Growth" is the parameter β appearing in Equation (4).

7. Discussion and Conclusions

The Dual-Bootstrap ICP algorithm has been successfully applied it to retinal image registration. The idea behind the algorithm is to start from an initial estimate that is only assumed to be accurate over a small region. Using the covariance matrix of the estimated transformation parameters as its guide, the approach bootstraps both the region over which the model is applied and the choice of transformation models. In the Dual-Bootstrap ICP algorithm, a robust version of standard ICP is applied in each bootstrap iteration. Other dual-bootstrap algorithms can be created by replacing this core minimization algorithm with another. In the context of retinal image registration, the Dual-Bootstrap ICP algorithm is combined with an initialization technique based on matching single vascular landmarks from each image or matching pairs of vascular landmarks from each image. The resulting implementation has shown nearly flawless performance on a large set of retinal image pairs.

Two important questions about the dual-bootstrap approach should still be addressed: when is it needed and when might it fail? Answers to these questions based on current understanding and experience in relation to the present invention:

Deciding when it is needed requires analyzing the combination of modeling error and transfer error of initial estimates. If this error, image-wide, is at least half the distance between the structures (e.g. blood vessels) alignment is based on, then the dual-bootstrap approach is needed. Interestingly, this question can be reversed to ask if, by using the dual-bootstrap approach, the initial conditions required for registration can be weakened and therefore more difficult problems addressed.

Other than the obvious case of no valid initial correspondences, the dual-bootstrap approach can fail in two ways. The first is when the initial model is too weak. One example might be use of an initial rigid transformation when significant scaling is present. The second way it can fail is when the images contain two geometrically-separated clusters of features, and the initial transformation is estimated only in a single cluster. As the gap between clusters grows, the transfer error will grow with it, potentially leading to mismatches when the bootstrap region $R_t$ grows to include a second cluster.

While retinal image registration was used to illustrate the method and algorithm of the present invention, any two-dimensional image registration problem is within the scope of the present invention, including inter alia: neuron and vascular alignment problems generally As a concluding remark, in the context of retinal image registration, the success of the Dual-Bootstrap ICP algorithm has thrown the research challenge back to feature extraction. The algorithm so successfully exploits whatever data are available that truly the only cause of failure is extremely poor quality image data, leading to substantial missed or spurious features. Thus, robust, low-contrast feature extraction is substantially useful in retinal image registration.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. An iterative method for performing image registration to map features in a first image to corresponding features in a second image in accordance with a transformation model that includes a parameter vector, said method comprising the steps of:

establishing an initial bootstrap region as a current bootstrap region in the first image;

estimating the parameter vector by minimizing an objective function with respect to the parameter vector, wherein the objective function depends on a loss function $\rho(d/\sigma)$ of $d/\sigma$ summed over selected features in the current bootstrap region, wherein d is a distance measure between $q_1$ and $q_2$, wherein $q_1$ is a feature of the selected features after having been mapped into the second image by the transformation model, wherein $q_2$ is a feature in the second image closest to $q_1$ in accordance with the distance measure, and wherein $\sigma$ is an error scale associated with the distance measures;

calculating a covariance matrix of the estimate of the parameter vector; and testing for convergence of the iterative method, wherein upon convergence the current bootstrap region includes and exceeds the initial bootstrap region, wherein if the testing determines that the iterative method has not converged then performing a generating step followed by a repeating step, wherein the generating step comprises generating a next bootstrap region in the first image, wherein the next bootstrap region minimally includes the current bootstrap region and may exceed the current bootstrap region, wherein the repeating step comprises executing a next iteration that includes again executing the estimating, calculating, and testing steps, and wherein the next bootstrap region becomes the current bootstrap region in the next iteration.

2. The method of claim 1, wherein the transformation model may change during execution of the testing step.

3. The method of claim 2, further comprising during execution of the testing step: selecting the transformation model from a predetermined set of transformation models of higher and lower order in the number of degrees of freedom in the parameter vector, wherein said selecting is in accordance with a selection criterion that optimizes a tradeoff between a fitting accuracy of the higher order transformation models and a stability of the lower order transformation models.

4. The method of claim 2, wherein if the transformation model changes during execution of the testing step then the changed transformation model is characterized by an increase in the number of degrees of freedom.

5. The method of claim 2, wherein the transformation model comprises a transformation selected from the group consisting of a similarity transformation, an affine transformation, a reduced quadratic transformation, and a full quadratic transformation.

6. The method of claim 2, wherein the transformation model changes at least once during performance of the method, and wherein the transformation model comprises a full quadratic transformation when the iterative method has converged.

7. The method of claim 1, wherein the loss function has an associated weight function having a weight of zero when $|d/\sigma|$ exceeds a prescribed finite value.

8. The method of claim 1, wherein the loss function is a Beaton-Tukey biweight function.

9. The method of claim 1, wherein the distance measure d between $q_1$ and $q_2$ comprises a Mahalanobis distance.

10. The method of claim 1, wherein $\sigma$ is computed from the K smallest values of $|d|$ such that K<N, wherein N is the number of selected features, and wherein $\sigma$ is normalized subject to the K smallest values of $|d|$ being distributed in accordance with a normal distribution such that $\sigma$ is a minimum unbiased scale estimate (MUSE) of the variance of the normal distribution.

11. The method of claim 1, wherein the current bootstrap region is bounded by a closed curve, and wherein generating the next bootstrap region comprises enlarging the current bootstrap region by moving each point p on the closed curve outward and away from the interior of the bootstrap region by a distance $\Delta p$ in a direction $\eta$ normal to the closed curve at the point p.

12. The method of claim 11, wherein the distance $\Delta p$ is proportional to a growth parameter $\beta$.

13. The method of claim 12, wherein $\beta$ is within a range of 1 to 8.

14. The method of claim 12, wherein the distance $\Delta p$ is inversely proportional to a transfer error variance in a mapped direction resulting from a mapping, in accordance with the transformation model, of the direction $\eta$ into the second image.

15. The method of claim 14, wherein the transfer error variance is a function of the covariance matrix.

16. The method of claim 15, wherein the closed curve is a rectangle having four sides, and wherein the distance $\Delta p$ is constant along each side of the four sides.

17. The method of claim 1, wherein a necessary condition for said convergence is that the covariance matrix must be stable based on a standard numeric measure of the rank of the covariance matrix.

18. The method of claim 1, wherein a necessary condition for said convergence is that an average of the distance measures is less than a predetermined tolerance.

19. The method of claim 18, wherein the average of the distance measures is the median of the distance measures.

20. The method of claim 1, wherein a necessary condition for said convergence is that the ratio area of the current bootstrap region to the area of the first image exceeds a predetermined fixed ratio.

21. The method of claim 1, wherein a feature in the first image is a spatial location in the first image.

22. The method of claim 1, wherein a feature in the first image is an angular direction at a spatial location in the first image.

23. The method of claim 1, wherein the first image comprises blood vessels with an animal, and wherein a first feature in the first image relates to a subset of the blood vessels.

24. The method of claim 23, wherein the first feature relates to a vascular landmark in the first image, and wherein the vascular landmark is characterized by a branching point or a cross-over point between two overlapping blood vessels of the blood vessels.

25. The method of claim 23, wherein the first image is a retinal image relating to the animal.

26. A computer program product, comprising a computer usable medium having a computer readable program code embodied therein, wherein the computer readable program code comprises an algorithm adapted execute a method of performing image registration to map features in a first image to corresponding features in a second image in accordance with a transformation model that includes a parameter vector, said method comprising the steps of:

establishing an initial bootstrap region as a current bootstrap region in the first image;

estimating the parameter vector by minimizing an objective function with respect to the parameter vector, wherein the objective function depends on a loss function $\rho(d/\sigma)$ of $d/\sigma$ summed over selected features in the current bootstrap region, wherein d is a distance measure between $q_1$ and $q_2$, wherein $q_1$ is a feature of the selected features after having been mapped into the second image by the transformation model, wherein $q_2$ is a feature in the second image closest to $q_1$ in accordance with the distance measure, and wherein $\sigma$ is an error scale associated with the distance measures;

calculating a covariance matrix of the estimate of the parameter vector; and testing for convergence of the iterative method, wherein upon convergence the current bootstrap region includes and exceeds the initial bootstrap region, wherein if the testing determines that the iterative method has not converged then performing a generating step followed by a repeating step, wherein the generating step comprises generating a next bootstrap region in the first image, wherein the next bootstrap region minimally includes the current bootstrap region and may exceed the current bootstrap region, wherein the repeating step comprises executing a next iteration that includes again executing the estimating, calculating, and testing steps, and wherein the next bootstrap region becomes the current bootstrap region in the next iteration.

27. The computer program product of claim 1, wherein the transformation model may change during execution of the testing step.

28. The computer program product of claim 27, further comprising during execution of the testing step: selecting the transformation model from a predetermined set of transformation models of higher and lower order in the number of degrees of freedom in the parameter vector, wherein said selecting is in accordance with a selection criterion that optimizes a tradeoff between a fitting accuracy of the higher order transformation models and a stability of the lower order transformation models.

29. The computer program product of claim 27, wherein if the transformation model changes during execution of the testing step then the changed transformation model is characterized by an increase in the number of degrees of freedom.

30. The computer program product of claim 27, wherein the transformation model comprises a transformation selected from the group consisting of a similarity transformation, an affine transformation, a reduced quadratic transformation, and a full quadratic transformation.

31. The computer program product of claim 27, wherein the transformation model changes at least once during performance of the method, and wherein the transformation model comprises a full quadratic transformation when the iterative method has converged.

32. The computer program product of claim 26, wherein the loss function has an associated weight function having a weight of zero when $|d/\sigma|$ exceeds a prescribed finite value.

33. The computer program product of claim 26, wherein the loss function is a Beaton-Tukey biweight function.

34. The computer program product of claim 26, wherein the distance measure d between $q_1$ and $q_2$ comprises a Mahalanobis distance.

35. The computer program product of claim 26, wherein $\sigma$ is computed from the K smallest values of $|d|$ such that K<N, wherein N is the number of selected features, and wherein a is normalized subject to the K smallest values of $|d|$ being distributed in accordance with a normal distribution such that $\sigma$ is a minimum unbiased scale estimate (MUSE) of the variance of the normal distribution.

36. The computer program product of claim 26, wherein the current bootstrap region is bounded by a closed curve, and wherein generating the next bootstrap region comprises enlarging the current bootstrap region by moving each point p on the closed curve outward and away from the interior of the bootstrap region by a distance $\Delta p$ in a direction $\eta$ normal to the closed curve at the point p.

37. The computer program product of claim 36, wherein the distance $\Delta p$ is proportional to a growth parameter $\beta$.

38. The computer program product of claim 37, wherein $\beta$ is within a range of 1 to 8.

39. The computer program product of claim 37, wherein the distance $\Delta p$ is inversely proportional to a transfer error variance in a mapped direction resulting from a mapping, in accordance with the transformation model, of the direction $\eta$ into the second image.

40. The computer program product of claim 39, wherein the transfer error variance is a function of the covariance matrix.

41. The computer program product of claim 40, wherein the closed curve is a rectangle having four sides, and wherein the distance $\Delta p$ is constant along each side of the four sides.

42. The computer program product of claim 26, wherein a necessary condition for said convergence is that the covariance matrix must be stable based on a standard numeric measure of the rank of the covariance matrix.

43. The computer program product of claim 26, wherein a necessary condition for said convergence is that an average of the distance measures is less than a predetermined tolerance.

44. The method of claim 43, wherein the average of the distance measures is the median of the distance measures.

45. The computer program product of claim 26, wherein a necessary condition for said convergence is that the ratio area of the current bootstrap region to the area of the first image exceeds a predetermined fixed ratio.

46. The computer program product of claim 26, wherein a feature in the first image is a spatial location in the first image.

47. The computer program product of claim 26, wherein a feature in the first image is an angular direction at a spatial location in the first image.

48. The computer program product of claim 26, wherein the first image comprises blood vessels with an animal, and wherein a first feature in the first image relates to a subset of the blood vessels.

49. The computer program product of claim 48, wherein the first feature relates to a vascular landmark in the first image, and wherein the vascular landmark is characterized by a branching point or a cross-over point between two overlapping blood vessels of the blood vessels.

50. The computer program product of claim 48, wherein the first image is a retinal image relating to the animal.

* * * * *

UNITED STATES PATENT AND TRADEMARK OFFICE
CERTIFICATE OF CORRECTION

PATENT NO. : 7,177,486 B2  Page 1 of 28
APPLICATION NO. : 10/408927
DATED : February 13, 2007
INVENTOR(S) : Stewart et al.

It is certified that error appears in the above-identified patent and that said Letters Patent is hereby corrected as shown below:

Drawings
A replacement set of 26 drawings, which are MUCH EASIER TO READ, has been included Column 6
Line 32, delete "5B" and insert -- 5E --

Column 13
Line 3, delete "the estimate" and insert -- the current estimate --

Column 14
Line 30, delete "comer" and insert -- corner --

Column 15
Line 65, insert -- are the -- before the second k

Column 16
Line 63, delete "location c" and insert -- location $c$ --

Column 17
Line 6, delete "invetion" and insert -- invention --

Column 21
Line 63, delete "comer" and insert -- corner --

Signed and Sealed this

Fifth Day of January, 2010

David J. Kappos
*Director of the United States Patent and Trademark Office*

United States Patent
Stewart et al.

(10) Patent No.: US 7,177,486 B2
(45) Date of Patent: Feb. 13, 2007

(54) DUAL BOOTSTRAP ITERATIVE CLOSEST POINT METHOD AND ALGORITHM FOR IMAGE REGISTRATION

(75) Inventors: Charles V. Stewart, Clifton Park, NY (US); Chia-Ling Tsai, Troy, NY (US); Badri Roysam, Clifton Park, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 851 days.

(21) Appl. No.: 10/408,927

(22) Filed: Apr. 7, 2003

(65) Prior Publication Data
US 2003/0190091 A1    Oct. 9, 2003

Related U.S. Application Data

(60) Provisional application No. 60/370,603, filed on Apr. 8, 2002.

(51) Int. Cl.
G06K 9/32    (2006.01)

(52) U.S. Cl. ................................................... 382/294
(58) Field of Classification Search ............... 382/293, 382/295
See application file for complete search history.

(56) References Cited

U.S. PATENT DOCUMENTS 5,793,901 A * 8/1998 Matsutake et al. ......... 382/294
5,956,435 A * 9/1999 Buzug et al. ............... 382/283
6,266,452 B1 * 7/2001 McGuire .................... 382/294

OTHER PUBLICATIONS

S. Aylward and E. Bullitt. Initialization, noise, singularities, and scale in height-ridge traversal for tubular object centerline extraction. *IEEE Transactions on Medical Imaging*, 21:61-75, 2002.

S. Aylward, J. Jomier, S. Weeks, and E. Bullitt. Registration and analysis of vascular images. *International Journal of Computer Vision*, (to appear) 2003; 30 pages.

R. Benjemaa and F. Schmitt. Fast global registration of 3D sampled surfaces using a multi-z-buffer technique. *Image and Vision Computing*, 17(2):113-123, 1999.

J. Bergen, P. Anandan, K. Hanna, and R. Hingorani. Hierarchical model-based motion estimation. In *Proceedings Second European Conference on Computer Vision*, pp. 237-252, 1992.

J. Berkow, R. Flower, D. Orth, and J. Kelley. *Fluorescein and Indocyanine Green Angiography, Technique and Interpretation*. American Academy of Ophthalmology, 2nd edition, 1997.

(Continued)

*Primary Examiner*—Joseph Mancuso
*Assistant Examiner*—Alex Liew
(74) *Attorney, Agent, or Firm*—Schmeiser, Olsen & Watts

(57) ABSTRACT

An iterative method and associated algorithm for performing image registration to map features in a first image to corresponding features in a second image in accordance with a transformation model. Upon convergence of a parameter vector associated with the model, a current bootstrap region includes and exceeds an initial bootstrap region that is initially established. During the iterations, the parameter vector is estimated by minimizing an objective function with respect to the parameter vector. Each iteration generates a next bootstrap region that minimally includes the current bootstrap region and may exceed the current bootstrap region. The model may change in successive iterations.

50 Claims, 26 Drawing Sheets

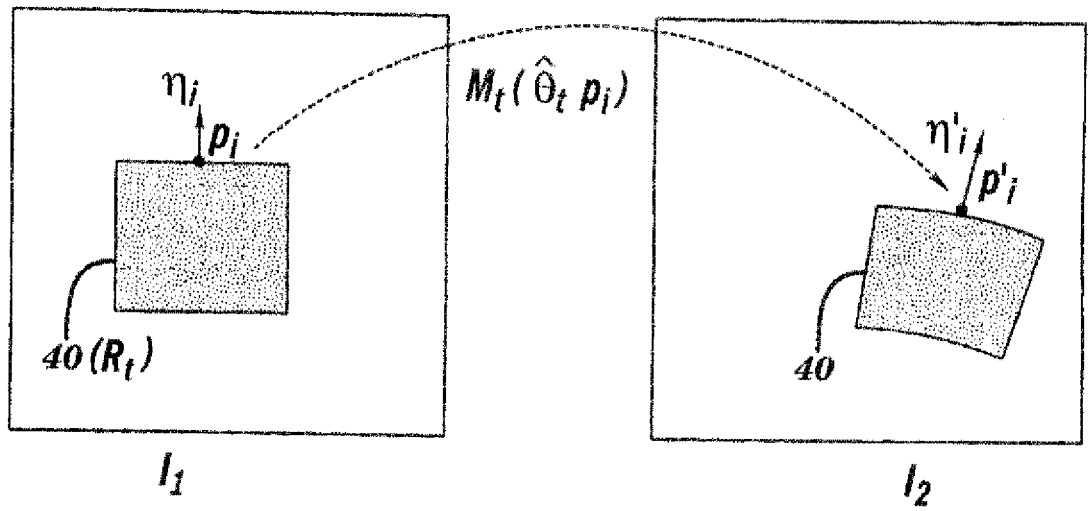

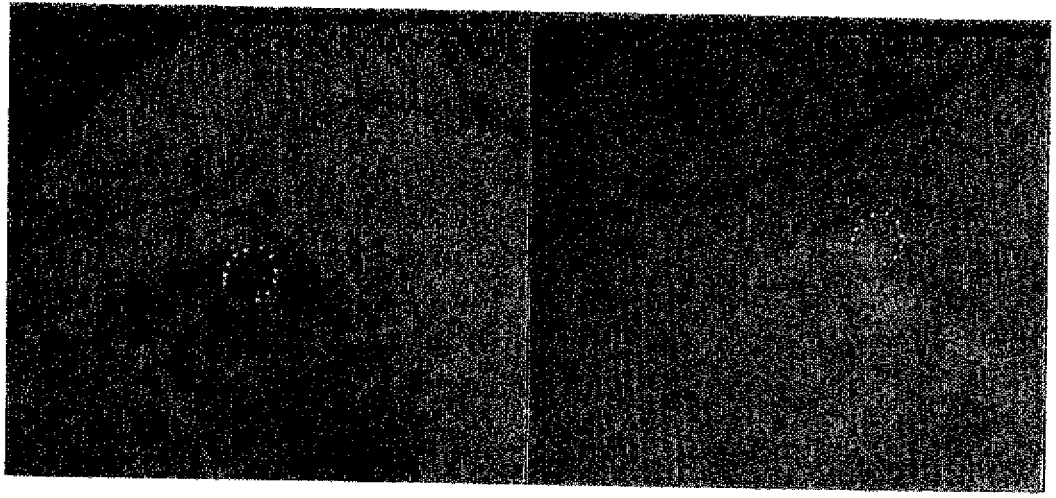
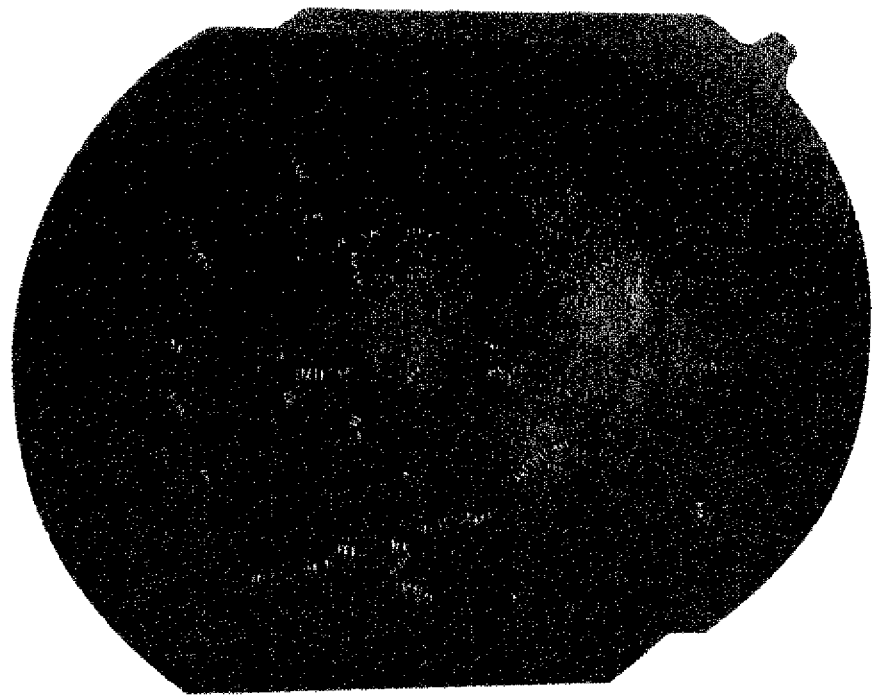
*FIG. 2*
*RELATED ART*

Iteration 0 of Sample Dual-Bootstrap ICP Iterations

| Item | Value | | | | | |
|---|---|---|---|---|---|---|
| Initial Model | similarity | | | | | |
| Initial Estimate For Model Parameters | 266.39 | 1.03137 | -0.013507 | 0 | 0 | 0 |
| | 26.0796 | 0.013507 | 1.03137 | 0 | 0 | 0 |
| Initial Error Scale | 0.49971 | | | | | |
| Bootstrap Region | (364.114, 194.318) to (443.582, 273.786) | | | | | |
| Bootstrap Region Size | 79.5 x 79.5 | | | | | |
| Model Selection | none (bootstrap region too small) | | | | | |
| Objective Function | 5.79 | | | | | |
| Transfer Error on Bootstrap Region | right: 0.129751, left: 0.229904, top: 0.171329, down: 0.108851 | | | | | |
| Region Growth ($\beta$) | 2 | | | | | |
| Covariance Matrix | 0.0903778 | 0.0491476 | -0.000504375 | 0.000619116 | | |
| | 0.0491476 | 0.0562165 | 0.000425188 | 0.000475191 | | |
| | -0.000504375 | 0.000425188 | 5.46426e-005 | 3.68727e-006 | | |
| | 0.000619116 | 0.000475191 | 3.68727e-006 | 3.04537e-005 | | |
| | 0.000619116 | 0.000475191 | 3.68727e-006 | 3.04537e-005 | | |

*FIG. 16*

Iteration 1 of Sample Dual-Bootstrap ICP Iterations

| Item | Value |
|---|---|
| Initial Model | similarity |
| Initial Estimate For Model Parameters | 287.843  0.981229  -0.0185348  0  0<br>35.9854  0.0185348  0.981229  0  0 |
| Initial Error Scale | 0.460696 |
| Bootstrap Region | (347.655 177.859 ) to (460.041 290.245) |
| Bootstrap Region Size | 112.386 x 112.386 |
| Model Selection | none (bootstrap region too small) |
| Objective Function | 12.2356 |
| Transfer Error on Bootstrap Region | right: 0.0810305, left: 0.155654, top: 0.109438, down: 0.0830184 |
| Region Growth ($\beta$) | 2 |
| Covariance Matrix | 0.0607536    0.0426283    -0.000168787    0.00014654<br>0.0426283    0.042362     -1.07982e-005   0.000149709<br>-0.00016878  -1.07982e-005  1.74559e-005   1.82491e-006<br>0.00014654   0.000149709   1.82491e-006   7.44514e-006 |

FIG. 17

Iteration 2 of Sample Dual-Bootstrap ICP Iterations

| Item | Value | | | | |
|---|---|---|---|---|---|
| Initial Model | similarity | | | | |
| Initial Estimate For Model Parameters | 286.697 40.4305 | 0.97753 0.00932075 | -0.00932075 0.97753 | 0 0 | 0 0 |
| Initial Error Scale | 1.01673 | | | | |
| Bootstrap Region | (324.379 154.583 ) to (483.317 313.521) | | | | |
| Bootstrap Region Size | 158.94 x 158.94 | | | | |
| Model Selection | none (bootstrap region too small) | | | | |
| Objective Function | 23 | | | | |
| Transfer Error on Bootstrap Region | right: 0.0786691, left: 0.169627, top: 0.0661901, down: 0.1237 | | | | |
| Region Growth ($\beta$) | 2 | | | | |
| Covariance Matrix | 0.0673051 0.0358447 -0.0002429 -1.05182e-005 | 0.0358447 0.0400279 -0.000157156 9.49852e-006 | -0.0002429 -0.000157156 8.56519e-006 7.85881e-007 | -1.05182e-005 9.49852e-006 7.85881e-007 5.10518e-006 | |

*FIG. 18*

Iteration 3 of Sample Dual-Bootstrap ICP Iterations

| Item | Value | | | | |
|---|---|---|---|---|---|
| Initial Model | similarity | | | | |
| Initial Estimate For Model Parameters | 277.652 | 0.999046 | -0.0106497 | 0 | 0 |
| | 34.944 | 0.0106497 | 0.999046 | 0 | 0 |
| Initial Error Scale | 1.36727 | | | | |
| Bootstrap Region | (291.462 121.666) to (516.234 346.438) | | | | |
| Bootstrap Region Size | 224.772 x 224.772 | | | | |
| Model Selection | similarity (-67.2566 for similarity, -84.9008 for reduced quadratic, -98.6116 for quad) | | | | |
| Objective Function | 77.8436 | | | | |
| Transfer Error on Bootstrap Region | right: 0.0838212, left: 0.122212, top: 0.0892093, down: 0.100242 | | | | |
| Region Growth (β) | 2 | | | | |
| Covariance Matrix | 0.0394515 | 0.0187936 | -7.81294e-005 | 8.12394e-005 | |
| | 0.0187936 | 0.0325252 | 4.81711e-006 | 7.41747e-005 | |
| | -7.81294e-005 | 4.81711e-006 | 4.93099e-006 | -9.10786e-008 | |
| | 8.12394e-005 | 7.41747e-005 | -9.10786e-008 | 2.47671e-006 | |

*FIG. 19*

Iteration 4 of Sample Dual-Bootstrap ICP Iterations

| Item | Value | | | | |
|---|---|---|---|---|---|
| Initial Model | similarity | | | | |
| Initial Estimate For Model Parameters | 277.7<br>38.0998 | 0.995825<br>0.00457081 | −0.00457081<br>0.995825 | 0<br>0 | 0<br>0 |
| Initial Error Scale | 2.42439 | | | | |
| Bootstrap Region | (244.91 86.5621 ) to (562.786 392.99) | | | | |
| Bootstrap Region Size | 317.876 x 304.43 | | | | |
| Model Selection | similarity (−89.9289 for similarity, −110.356 for reduced quadratic, −123.773 for quad) | | | | |
| Objective Function | 77.8436 | | | | |
| Transfer Error on Bootstrap Region | right: 0.140657, left: 0.171685, top: 0.128155, down: 0.169473 | | | | |
| Region Growth (β) | 2 | | | | |
| Covariance Matrix | 0.0488369<br>0.016789<br>−5.74485e-005<br>8.75021e-005 | 0.016789<br>0.0517199<br>2.78966e-005<br>0.000104909 | −5.74485e-005<br>2.78966e-005<br>4.05394e-006<br>−4.00739e-007 | 8.75021e-005<br>0.000104909<br>−4.00739e-007<br>2.62631e-006 | |

FIG. 20

Iteration 5 of Sample Dual-Bootstrap ICP Iterations

| Item | Value |
|---|---|
| Initial Model | similarity |
| Initial Estimate For Model Parameters | 275.865  0.998651  -0.00173591  0  0<br>38.532   0.00173591  0.998651   0  0 |
| Initial Error Scale | 3.03037 |
| Bootstrap Region | (179.076 86.5621) to (628.62 456.453) |
| Bootstrap Region Size | 449.54 x 369.891 |
| Model Selection | similarity (-129.862 for similarity, -144.764 for reduced quadratic, -154.231 for quad) |
| Objective Function | 117.072 |
| Transfer Error on Bootstrap Region | right: 0.109498, left: 0.160186, top: 0.0851769, down: 0.132127 |
| Region Growth ($\beta$) | 2 |
| Covariance Matrix | 0.0405521     0.00784098     -4.46573e-005   4.59599e-005<br>0.00784098    0.0448261      -2.20833e-005   7.40428e-005<br>-4.46573e-005 -2.20833e-005  1.80661e-006    -5.57259e-007<br>4.59599e-005  7.40428e-005   -5.57259e-007   1.9047e-006 |

*FIG. 21*

Iteration 6 of Sample Dual-Bootstrap ICP Iterations

| Item | Value |
|---|---|
| Initial Model | similarity |
| Initial Estimate For Model Parameters | 274.187  1.00339  -0.00383499  0  0  0<br>36.5029  0.00383499  1.00339  0  0  0 |
| Initial Error Scale | 3.71728 |
| Bootstrap Region | (85.9728 86.5621) to (721.723 533.06) |
| Bootstrap Region Size | 635.75 x 446.5 |
| Model Selection | similarity (-185.856 for similarity, -195.88 for reduced quadratic, -201.476 for quad) |
| Objective Function | 172.512 |
| Transfer Error on Bootstrap Region | right: 0.139695, left: 0.165249, top: 0.0716708, down: 0.121417 |
| Region Growth ($\beta$) | 2 |
| Covariance Matrix | 0.0381809    0.000149684   0.0388061    1.24122e-005   -2.85521e-005   3.4847e-005<br>0.000149684  0.0388061     -2.85521e-005 1.12603e-006   -5.19124e-006   -1.68307e-005<br>1.24122e-005 -2.85521e-005 1.12603e-006 -5.19124e-007  1.26362e-006<br>-1.68307e-005 3.4847e-005   -5.19124e-007 1.26362e-006 |

FIG. 22

Iteration 7 of Sample Dual-Bootstrap ICP Iterations

| | Value | | | | | |
|---|---|---|---|---|---|---|
| Initial Model | similarity | | | | | |
| Initial Estimate For Model Parameters | 274.062 | 1.0064 | -0.00842869 | 0 | 0 | 0 |
| | 34.046 | 0.00842869 | 1.0064 | 0 | 0 | 0 |
| Initial Error Scale | 3.66794 | | | | | |
| Bootstrap Region | (23.9827 86.5621) to (756.577 625.532) | | | | | |
| Bootstrap Region Size | 732.6 x 538.97 | | | | | |
| Model Selection | reduced quadratic (-242.058 for similarity, -224.866 for reduced quadratic, -228.372 for quad) | | | | | |
| Objective Function | 187.744 | | | | | |
| Transfer Error on Bootstrap Region | right:0.368925, left:0.244703, top: 1.04318, down: 0.141618 | | | | | |
| Region Growth ($\beta$) | 1.98788 | | | | | |
| Covariance Matrix (columns 1-3) | 0.0981361 | 0.0125362 | -4.81019e-005 | -4.81019e-005 | -1.54294e-006 | 5.85689e-007 |
| | 0.0125362 | 0.0717003 | -1.54294e-006 | -1.54294e-006 | | |
| | -4.81019e-005 | -1.54294e-006 | -4.51173e-006 | -1.818e-007 | | |
| | 6.14229e-006 | -4.51173e-006 | -1.8744e-007 | 1.1428e-009 | | |
| | -1.30481e-006 | -1.8744e-007 | -9.44389e-007 | -2.13738e-010 | | |
| | -1.84753e-007 | -9.44389e-007 | -1.30481e-006 | -1.84753e-007 | | |
| (columns 4-6) | 6.14229e-006 | -1.30481e-006 | -1.8744e-007 | -9.44389e-007 | | |
| | -4.51173e-006 | -1.8744e-007 | 1.1428e-009 | -2.13738e-010 | | |
| | -1.818e-007 | 1.1428e-009 | -3.16684e-010 | 2.26476e-010 | | |
| | 6.07948e-007 | -3.16684e-010 | 2.39457e-011 | 2.84905e-012 | | |
| | -3.16684e-010 | 2.39457e-011 | 2.84905e-012 | | | |
| | 2.26476e-010 | 2.84905e-012 | | 1.97032e-011 | | |

FIG. 23

Iteration 8 of Sample Dual-Bootstrap ICP Iterations (Excluding Covariance Matrix)

| Item | Value |
|---|---|
| Initial Model | reduced quadratic |
| Initial Estimate For Model Parameters | 256.798  1.06532  0.0479104  -7.80579e-005 0  -7.80579e-005<br>26.9907  0.0330083  1.02155  -2.36425e-005 0  -2.36425e-005 |
| Initial Error Scale | 2.68457 |
| Bootstrap Region | (23.9827 86.5621) to (756.577 910.818) |
| Bootstrap Region Size | 732.6 x 824.256 |
| Model Selection | switched to full quadratic (since bootstrap region is the entire overlap region) |
| Objective Function | 442.693 |
| Transfer Error on Bootstrap Region | right: 0.0529027, left: 0.0650301, top: 0.095336, down: 0.116513 |
| Region Growth ($\beta$) | 2 |

*FIG. 24A*

Iteration 8 of Sample Dual-Bootstrap ICP Iterations (Covariance Matrix)

| Item | Value | | | |
|---|---|---|---|---|
| Covariance Matrix (columns 1-4) | 0.00281832 | 2.17947e-007 | 2.15208e-007 | -3.59948e-008 |
| | 2.17947e-007 | 2.02768e-008 | 1.15305e-009 | 1.09186e-011 |
| | 2.15208e-007 | 1.15305e-009 | 1.61828e-008 | -5.50042e-012 |
| | -3.59948e-008 | 1.09186e-011 | -5.50042e-012 | 8.43101e-013 |
| | -3.63578e-009 | -6.10947e-012 | -2.16607e-011 | 7.85605e-014 |
| | -2.25152e-008 | -1.36846e-011 | -1.16672e-014 | 1.65879e-013 |
| | 0.000128243 | 7.67042e-008 | 1.3844e-007 | -2.17721e-009 |
| | -4.56639e-008 | -1.32258e-009 | -1.90263e-009 | 1.42604e-012 |
| | -6.93743e-007 | 2.02821e-009 | 4.58099e-010 | 2.92578e-011 |
| | -2.32739e-009 | 2.50582e-012 | 1.14472e-011 | 3.46889e-014 |
| | -8.34963e-009 | 3.56941e-011 | -6.49882e-012 | 2.15367e-013 |
| | -5.33928e-010 | -6.77574e-012 | -1.51792e-011 | -1.28238e-015 |
| (columns 5-8) | -3.63578e-009 | -2.25152e-008 | 0.000128243 | -4.56639e-008 |
| | -6.10947e-012 | -1.36846e-011 | 7.67042e-008 | -1.32258e-009 |
| | -2.16607e-011 | -1.16672e-014 | 1.3844e-007 | -1.90263e-009 |
| | 7.85605e-014 | 1.65879e-013 | -2.17721e-009 | 1.42604e-012 |
| | 6.80363e-013 | 5.67419e-014 | -4.34996e-009 | 2.78205e-011 |
| | 5.67419e-014 | 3.96326e-013 | -8.5357e-010 | -9.76579e-013 |
| | -4.34996e-009 | -8.5357e-010 | 0.00205716 | -5.89782e-007 |
| | 2.78205e-011 | -9.76579e-013 | -5.89782e-007 | 2.3599e-008 |
| | -1.01321e-011 | -1.08197e-011 | 3.35226e-008 | -5.60996e-011 |
| | 5.08848e-014 | 1.15656e-014 | -2.22545e-008 | -5.24748e-012 |
| | -3.04697e-014 | 6.30926e-015 | -2.21872e-009 | -3.55689e-012 |
| | 7.16582e-014 | 1.62394e-014 | -2.04705e-008 | 1.87512e-011 |
| (columns 9-12) | -6.93743e-007 | -2.32739e-009 | -8.34963e-009 | -5.33928e-010 |
| | 2.02821e-009 | 2.50582e-012 | 3.56941e-011 | -6.77574e-012 |
| | 4.58099e-010 | 1.14472e-011 | -6.49882e-012 | -1.51792e-011 |
| | 2.92578e-011 | 3.46889e-014 | 2.15367e-013 | -1.28238e-015 |
| | -1.01321e-011 | 5.08848e-014 | -3.04697e-014 | 7.16582e-014 |
| | -1.08197e-011 | 1.15656e-014 | 6.30926e-015 | 1.62394e-014 |
| | 3.35226e-008 | -2.22545e-008 | -2.21872e-009 | -2.04705e-008 |
| | -5.60996e-011 | -5.24748e-012 | -3.55689e-012 | 1.87512e-011 |
| | 1.9801e-008 | 3.9313e-012 | 3.84263e-011 | -7.78349e-012 |
| | 3.9313e-012 | 6.01833e-013 | 9.07999e-014 | 1.20034e-013 |
| | 3.84263e-011 | 9.07999e-014 | 1.02874e-012 | -1.94008e-015 |
| | -7.78349e-012 | 1.20034e-013 | -1.94008e-015 | 4.54564e-013 |

*FIG. 24B*

Iteration 9 of Sample Dual-Bootstrap ICP Iterations (Excluding Covariance Matrix)

| Initial Model | full quadratic | | | | |
|---|---|---|---|---|---|
| Initial Estimate For Model Parameters | 243.518<br>20.1457 | 1.08727<br>0.0416426 | 0.08522<br>1.0288 | -0.000103205<br>-1.9797e-005 | -9.87043e-006<br>-1.89973e-006 | -0.000101181<br>-2.32224e-005 |
| Initial Error Scale | 0.467807 | | | | | |
| Bootstrap Region | (23.9827 86.5621) to (756.577 910.818) | | | | | |
| Bootstrap Region Size | 732.6 x 824.258 | | | | | |
| Objective Function | 442.693 | | | | | |
| Model Selection | none (since bootstrap region is the entire overlap region) | | | | | |
| Transfer Error on Bootstrap Region | right: 0.0395772, left: 0.0284771, top: 0.0296053, down: 0.0373404 | | | | | |
| Region Growth ($\beta$) | 2 | | | | | |

*FIG. 25A*

Iteration 9 of Sample Dual-Bootstrap ICP Iterations (Covariance Matrix)

| Item | Value | | | |
|---|---|---|---|---|
| Covariance Matrix (columns 1-4) | 0.00281832 | 2.17947e-007 | 2.15208e-007 | -3.59948e-008 |
| | 2.17947e-007 | 2.02768e-008 | 1.15305e-009 | 1.09186e-011 |
| | 2.15208e-007 | 1.15305e-009 | 1.61828e-008 | -5.50042e-012 |
| | -3.59948e-008 | 1.09186e-011 | -5.50042e-012 | 8.43101e-013 |
| | -3.63578e-009 | -6.10947e-012 | -2.16607e-011 | 7.85605e-014 |
| | -2.25152e-008 | -1.36846e-011 | -1.16672e-014 | 1.65879e-013 |
| | 0.000128243 | 7.67042e-008 | 1.3844e-007 | -2.17721e-009 |
| | -4.56639e-008 | -1.32258e-009 | -1.90263e-009 | 1.42604e-012 |
| | -6.93743e-007 | 2.02821e-009 | 4.58099e-010 | 2.92578e-011 |
| | -2.32739e-009 | 2.50582e-012 | 1.14472e-011 | 3.46889e-014 |
| | -8.34963e-009 | 3.56941e-011 | -6.49882e-012 | 2.15367e-013 |
| | -5.33928e-010 | -6.77574e-012 | -1.51792e-011 | -1.28238e-015 |
| (columns 5-8) | -3.63578e-009 | -2.25152e-008 | 0.000128243 | -4.56639e-008 |
| | -6.10947e-012 | -1.36846e-011 | 7.67042e-008 | -1.32258e-009 |
| | -2.16607e-011 | -1.16672e-014 | 1.3844e-007 | -1.90263e-009 |
| | 7.85605e-014 | 1.65879e-013 | -2.17721e-009 | 1.42604e-012 |
| | 6.80363e-013 | 5.67419e-014 | -4.34996e-009 | 2.78205e-011 |
| | 5.67419e-014 | 3.96326e-013 | -8.5357e-010 | -9.76579e-013 |
| | -4.34996e-009 | -8.5357e-010 | 0.00205716 | -5.89782e-007 |
| | 2.78205e-011 | -9.76579e-013 | -5.89782e-007 | 2.3599e-008 |
| | -1.01321e-011 | -1.08197e-011 | 3.35226e-008 | -5.60996e-011 |
| | 5.08848e-014 | 1.15656e-014 | -2.22545e-008 | -5.24748e-012 |
| | -3.04697e-014 | 6.30926e-015 | -2.21872e-009 | -3.55689e-012 |
| | 7.16582e-014 | 1.62394e-014 | -2.04705e-008 | 1.87512e-011 |
| (columns 9-12) | -6.93743e-007 | -2.32739e-009 | -8.34963e-009 | -5.33928e-010 |
| | 2.02821e-009 | 2.50582e-012 | 3.56941e-011 | -6.77574e-012 |
| | 4.58099e-010 | 1.14472e-011 | -6.49882e-012 | -1.51792e-011 |
| | 2.92578e-011 | 3.46889e-014 | 2.15367e-013 | -1.28238e-015 |
| | -1.01321e-011 | 5.08848e-014 | -3.04697e-014 | 7.16582e-014 |
| | -1.08197e-011 | 1.15656e-014 | 6.30926e-015 | 1.62394e-014 |
| | 3.35226e-008 | -2.22545e-008 | -2.21872e-009 | -2.04705e-008 |
| | -5.60996e-011 | -5.24748e-012 | -3.55689e-012 | 1.87512e-011 |
| | 1.9801e-008 | 3.9313e-012 | 3.84263e-011 | -7.78349e-012 |
| | 3.9313e-012 | 6.01833e-013 | 9.07999e-014 | 1.20034e-013 |
| | 3.84263e-011 | 9.07999e-014 | 1.02874e-012 | -1.94008e-015 |
| | -7.78349e-012 | 1.20034e-013 | -1.94008e-015 | 4.54564e-013 |

FIG. 25B